United States Patent
Hsiao et al.

(10) Patent No.: US 10,894,838 B2
(45) Date of Patent: Jan. 19, 2021

(54) PRODUCTION OF CARBOXYLATED NANOCELLULOSES

(71) Applicant: The Research Foundation for the State University of New York, Albany, NY (US)

(72) Inventors: Benjamin S. Hsiao, Setauket, NY (US); Benjamin Chu, Setauket, NY (US); Priyanka R. Sharma, East Setauket, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 84 days.

(21) Appl. No.: 15/826,882

(22) Filed: Nov. 30, 2017

(65) Prior Publication Data

US 2018/0086851 A1    Mar. 29, 2018

Related U.S. Application Data

(63) Continuation-in-part of application No. PCT/US2015/060261, filed on Nov. 12, 2015.
(Continued)

(51) Int. Cl.
*C08B 15/04* (2006.01)
*B01J 20/24* (2006.01)
(Continued)

(52) U.S. Cl.
CPC ............... *C08B 15/04* (2013.01); *B01J 20/24* (2013.01); *B01J 20/28007* (2013.01);
(Continued)

(58) Field of Classification Search
CPC ... C08B 3/20; C08B 3/22; C08B 15/04; B01J 20/24; B01J 20/28007; B01J 20/28011;
(Continued)

(56) References Cited

U.S. PATENT DOCUMENTS 2,758,112 A * 8/1956 Waning .................. C08B 15/04
                                                    252/186.44
4,100,341 A    7/1978 Brasey et al.
(Continued)

FOREIGN PATENT DOCUMENTS

JP    2005097818 A    4/2005
WO    2008073186 A2   6/2008
WO    2014195971 A1   12/2014

OTHER PUBLICATIONS

De Nooy, A.E.J., Pagliaro, M., van Bekkum, H., Besemer, A.C., "Autocatalytic oxidation of primary hydroxyl functions in glucans with nitrogen oxides", Carbohydrate Research, 1997, 304, 117-123. (Year: 1997).*
(Continued)

*Primary Examiner* — James C Goloboy
(74) *Attorney, Agent, or Firm* — Carter, DeLuca & Farrell LLP

(57) ABSTRACT

The present disclosure provides methods for producing carboxylated nanocelluloses. Compared with conventional methods, the methods of the present disclosure are simple and cost-effective in the production of carboxylated (or carboxy) nanocelluloses, in embodiments nanofibers and/or nanowhiskers, directly from raw biomass, including lignocellulose wood, non-wood sources, non-lignocellulose wood, lignocellulose or pure cellulose. The carboxy groups on the surface of nanocellulose thus produced can then be easily modified into functional derivatives such as amide, acetate, ether, ester, etc. The resulting nanocelluloses may be used to form purifying agents and/or filters to remove impurities from wastewater.

25 Claims, 34 Drawing Sheets

Related U.S. Application Data

(60) Provisional application No. 62/567,450, filed on Oct. 3, 2017, provisional application No. 62/429,255, filed on Dec. 2, 2016.

(51) Int. Cl.
| | | |
|---|---|---|
| *B01J 20/28* | (2006.01) | |
| *B01J 20/30* | (2006.01) | |
| *C02F 1/28* | (2006.01) | |
| *C08H 8/00* | (2010.01) | |
| *C02F 101/20* | (2006.01) | |

(52) U.S. Cl.
CPC ... *B01J 20/28011* (2013.01); *B01J 20/28023* (2013.01); *B01J 20/28059* (2013.01); *B01J 20/28061* (2013.01); *B01J 20/28064* (2013.01); *B01J 20/28066* (2013.01); *B01J 20/3085* (2013.01); *C02F 1/285* (2013.01); *C08H 8/00* (2013.01); *C02F 1/286* (2013.01); *C02F 2101/20* (2013.01); *C02F 2305/08* (2013.01); *Y02P 20/582* (2015.11)

(58) Field of Classification Search
CPC ............ B01J 20/28023; B01J 20/28059; B01J 20/28061; B01J 20/28064; B01J 20/28066; C08H 8/00; C02F 1/285; C02F 1/286; C02F 2101/20; C02F 2305/08; Y02P 20/582

See application file for complete search history.

(56) References Cited

U.S. PATENT DOCUMENTS

| | | | |
|---|---|---|---|
| 5,853,877 A | 12/1998 | Shibuta | |
| 6,627,749 B1* | 9/2003 | Kumar | C08B 15/04 536/123.1 |
| 2007/0203335 A1 | 8/2007 | Huttermann et al. | |
| 2010/0282422 A1* | 11/2010 | Miyawaki | C08B 15/02 162/76 |
| 2013/0180917 A1* | 7/2013 | Chu | A61K 31/74 210/634 |
| 2015/0027648 A1 | 1/2015 | Tsuji et al. | |

OTHER PUBLICATIONS

Besemer, A.C., de Nooy, A.E.J., van Bekkum, H., "Methods for the Selective Oxidation of Cellulose: Preparation of 2,3-Dicarboxycellulose and 6-Carboxycellulose", in Cellulose Derivatives, Heinze and Glasser eds., ACS Symposium Series, 1998, 73-82. (Year: 1998).*

International Search Report issued in Appl. No. PCT/US15/60261 dated Feb. 2, 2016 (2 pages).

Written Opinion of the International Searching Authority issued in Appl. No. PCT/US15/60261 dated Feb. 2, 2016 (6 pages).

Extended European Search Report issued in corresponding Appl. No. EP 15908443 dated Aug. 8, 2019 (10 pages).

Office Action issued in corresponding Japanese Appl. No. JP 2018-523458 dated Sep. 9, 2019 (4 pages) (English Translation not provided).

* cited by examiner

PRODUCTION OF CARBOXYLATED NANOCELLULOSES

CROSS REFERENCE TO RELATED APPLICATIONS

This application is a continuation-in-part of PCT Application No.: PCT/US2015/060261 filed Nov. 12, 2015. This application also claims the benefit of, and priority to, U.S. Provisional Patent Application Ser. No. 62/567,450, filed Oct. 3, 2017 and U.S. Provisional Patent Application Ser. No. 62/429,255, filed Dec. 2, 2016. The entire disclosures of each of the foregoing applications are incorporated by reference herein.

GOVERNMENT RIGHTS

This invention was made with Government Support under grant number DMR-1409507 awarded by the National Science Foundation. The government has certain rights in the invention.

BACKGROUND

The present disclosure relates to novel methods for forming carboxylated nanocelluloses. More specifically, the present disclosure provides for environmentally friendly and cost-effective methods for producing nanocelluloses.

Cellulose, the major constituent of plant cell walls, is the most abundant biopolymer on earth, and thus it is a sustainable and renewable resource for energy and production of various materials. The presence of hydroxyl groups in the cellulose molecule provides a unique platform for molecular modifications to form different useful derivatives. Among these derivatives, oxidized celluloses have been used in biomedical applications due to their unique properties related to biodegradability, biocompatibility and/or bioabsorbability. Consequently, a great deal of research has been carried out to investigate the structure and property relationships of carboxylated cellulose.

For the oxidation process to occur, the —$CH_2OH$ functional group attached to the fifth carbon (C-5) would experience a net gain of an oxygen atom and a net loss of two hydrogen atoms as it is being converted to a carboxyl group (—COOH). Oxidation of C-6 would aid the defibrillation process because the presence of negatively charged carboxyl groups on the surface of the microfibrils would cause the nanofibers to repel each other.

One popular method to prepare oxidized cellulose nanofibers is by the TEMPO-mediated oxidation method. TEMPO (2,2,6,6-tetramethylpiperidine-1-oxylradical)-mediated oxidation is only able to defibrillate chemically treated and processed forms of biomass and does not have any significant morphological effect when applied to native celluloses, such as cotton linter. In the TEMPO method, the raw material (biomass) must be pretreated to extract cellulose therefrom. Methods for pretreatment include, for example, steam explosion, whereby the biomass is treated at a pressure of approximately 140 Pascal, and a temperature from about 200-250° C.; an ammonia explosion method, where the biomass is treated with ammonia under high pressure; or a chemical treatment method, which includes treating the biomass with sodium hydroxide, peroxides, sodium borate, nitric acid, and dimethylsulfoxide. The extracted cellulose is then bleached by treatment with sodium chlorite or a combination of hydrogen peroxide with sodium chlorite while boiling.

The TEMPO and NaBr (sodium bromide) are then added to the cellulose suspension, which is kept at a pH of 10-11 by adding NaOH (sodium hydroxide). The primary oxidant NaClO (sodium hypochlorite) is subsequently added, and it is reduced to NaCl (sodium chloride) in this step. The NaBr is oxidized to NaBrO (sodium hypobromite), but NaBrO is subsequently reduced to form NaBr, forming a cyclic system. The TEMPO radical works in a similar manner, being oxidized and then reduced in order to oxidize the glucose monomers, converting the primary hydroxyl groups to carboxylates via an intermediate step involving the formation of aldehydes.

TEMPO-mediated oxidation is well suited for laboratory use and has a high reaction rate and yield. In addition, only a small amount of cellulose degradation occurs throughout the process. However, TEMPO-mediated oxidation is not an efficient method for the production of oxidized cellulose nanofibers on a larger scale because it requires the use of chlorine-containing chemicals, which are harmful to the environment, and difficult to recycle. In addition, TEMPO-mediated oxidation is a process that is high in energy consumption, requiring extensive mechanical treatments, such as homogenization and sonication.

Improved methods for producing carboxylated nanocelluloses remain desirable.

SUMMARY

The present disclosure provides methods for producing carboxylated nanocelluloses. The methods, utilizing benign materials, are environmentally friendly and cost effective. In embodiments, methods of the present disclosure include contacting plant biomass with an acid component including nitric acid to form a first mixture; contacting the first mixture with an oxidizing agent such as nitrite salts, nitrate salts, and combinations thereof to form a second mixture; holding the second mixture at a temperature from about 25° C. to about 100° C., for a period of time from about 30 minutes to about 72 hours; and recovering carboxycellulose nanofibers from the second mixture.

Sources of plant biomass include lignocellulose wood, non-lignocellulose wood, lignocellulose, pure cellulose, and combinations of thereof. In embodiments, sources of plant biomass include non-wood sources such as jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, eucalyptus, valonia, bacterial celluloses, phytoplanktons, algal celluloses, tunicate celluloses, grasses including *spinifex* grassses, and combinations thereof.

In embodiments, the acid component, in addition to nitric acid, may also include an additional acid such as hydrochloric acid, sulfuric acid, acetic acid, hydrobromic acid, hydrofluoric acid, and combinations thereof.

Suitable nitrite salts for use as the oxidizing agent include sodium nitrite, potassium nitrite, calcium nitrite, magnesium nitrite, lithium nitrite, ammonium nitrite, nitrite esters, and combinations thereof. Suitable nitrate salts for use as the oxidizing agent include sodium nitrate, potassium nitrate, calcium nitrate, magnesium nitrate, lithium nitrate, ammonium nitrate, nitrate esters, and combinations thereof.

The process of the present disclosure may be conducted without any additional mechanical treatments. However, in some cases, the process may include these additional mechanical treatments, including sonication, homogenization, cryocrushing, grinding, steam explosion, ball-milling and combinations thereof.

In other embodiments, a method of the present disclosure includes contacting plant biomass with an acid component including nitric acid, the acid component at a concentration from about 10 mmol to about 300 mmol, to form a first mixture; contacting the first mixture with an oxidizing agent such as nitrite salts, nitrate salts, and combinations thereof, the oxidizing agent at a concentration from about 0.1 mmol to about 60 mmol, to form a second mixture; holding the second mixture at a temperature from about 25° C. to about 100° C., for a period of time from about 30 minutes to about 72 hours; and recovering carboxycellulose nanofibers from the second mixture.

The carboxy groups on the surface of the carboxycellulose nanofibers thus produced can then be easily modified into functional derivatives such as amide, acetate, ether, ester, etc.

Embodiments of the present disclosure also include a method of producing a purifying agent/coagulant/flocculant/adsorbent utilizing raw biomass. In certain embodiments, the raw biomass includes stems, branches, leaves, roots, grasses including *spinifex* grasses, herbs and shrubs including agriculture residues, phytoplanktons, algal celluloses, tunicate celluloses, animal cellulose sources including bacterial cellulose, and combinations thereof.

According to further embodiments, the method includes utilizing waste biomass to generate a prominently non-crystalline purifying agent/coagulant/flocculant/adsorbent by using a nitrogen containing acid and an oxidizing agent at an optimum time and temperature, below 15 hours and 100° C., respectively. In certain embodiments, the generated purifying agent/coagulant/flocculant/adsorbent has nanodimensions, e.g., less than or equal to 10 nm nominal diameter and less than or equal to 10,000 nm length, and including a surface area from about 0.5 $m^2$/g to about 2000 $m^2$/g.

According to further embodiments, the method includes purifying agent/coagulant/flocculant/adsorbent to possess a prominently non-crystalline behavior region, e.g., 30-80% crystallinity. The unique non-crystalline behavior of the purifying agent (30-80% crystallinity) provides high efficiency (10-95%) to remove metal ions, non-metal ions and mixed ion impurities including lead, uranium, cadmium, copper, arsenic, chromium, manganite, iron, mercury, and zinc, including all elements belonging from groups I to VIII of the periodic table, from wastewater.

According to further embodiments, a low concentration of the purifying agent, e.g., 0.001-0.03 wt %, removes several thousand ppm of metal impurities, non-metal ions and mixed ions from wastewater via coagulation, flocculation, nucleation or precipitation, in a time interval of less than or equal to 20 minutes.

According to further embodiments, the purifying agent/coagulant/flocculant/adsorbent is efficient in removing impurities of metal ions, non-metal ions, and mixtures thereof in a short time period of less than or equal to 20 minutes, without using any mechanical or electrical energy, at room temperature and at neutral pH.

According to further embodiments, the purifying agent/coagulant/flocculant/adsorbent is applied in direct suspensions or as a filter component.

According to further embodiments, the purifying agent/coagulant/flocculant/adsorbent is added to wastewater at room temperature and at neutral pH without any pressure or temperature increase.

According to further embodiments, the purifying agent/coagulant/flocculant/adsorbent has nanodimensions of less than or equal to 10 nm nominal diameter and less than or equal to 10,000 nm length, and a high charge density from about 0.25 mmol/g to about 5 mmol/g.

BRIEF DESCRIPTION OF THE DRAWINGS

The accompanying drawings, which are included to provide further understanding of the subject technology and are incorporated in and constitute a part of this specification, illustrate aspects of the disclosure and together with the description serve to explain the principles of the subject technology.

DETAILED DESCRIPTION

Figure 1:
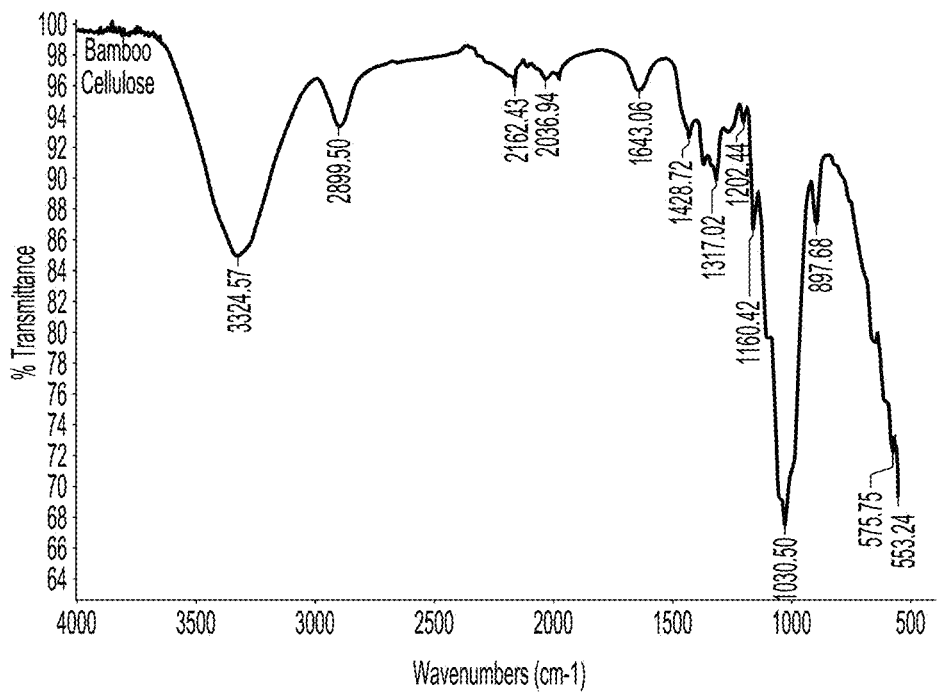
FIG. 1 is a spectra obtained by Fourier transform infrared spectroscopy (FTIR) of bamboo cellulose before treatment in accordance with the present disclosure.

The present disclosure provides a simple and cost-effective method to produce carboxylated (or carboxy) nanocelluloses. These nanocelluloses may be in the form of nanofibers and/or nanowhiskers. The nanocelluloses may be prepared directly from raw biomass, including lignocellulose wood, non-wood sources, non-lignocellulose wood, lignocellulose, pure cellulose, and/or combinations thereof, without the need for conventional extraction/pretreatment steps.

The present disclosure is based on the discovery that, in the presence of an acid and an oxidizing agent, the simultaneous defibrillation of nanocelluloses as well as the oxidation processes to generate carboxycellulose or carboxylated cellulose nanofibers can be enhanced when compared to conventional chemical methods (e.g., hydrolysis, acid-base-organic solvent treatment) in combination with mechanical treatments (e.g., sonication, homogenization, cryocrushing, and the like). As a result, a simple two-chemical method involving only an acid and an oxidizing agent can produce carboxylated celluloses (in the form of nanofibers) having nominal diameters in the range of a few nanometers and fiber lengths in the range of several hundred nanometers. The process of the present disclosure significantly reduces the typical steps used, including significant reduction in chemicals and energy consumption and mechanical treatments such as homogenization and/or sonication, to produce nanocelluloses or carboxylated celluloses.

In addition, as noted above, some prior processes use the TEMPO oxidation agent along with sodium chlorite and sodium hypochlorite and other oxidizing reagents, which makes the process difficult, and leads to problems in recycling the TEMPO agent as well as the other chemicals used in the process. In contrast, the process of the present disclosure uses an acid and oxidizing agent to produce the carboxycellulose or carboxylated cellulose nanofibers, in which both the acid and oxidizing agent can be easily recycled.

The use of these inexpensive and recyclable chemicals allows this process to be more favorable from a cost-benefit perspective and, therefore, more practical for industrial production of carboxycellulose or carboxylated cellulose nanofibers.

The methods of the present disclosure are applicable for use with any and all raw biomasses, including lignocellulosic wood or non-wood sources including, but not limited to, jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, *eucalyptus*, valonia, bacterial celluloses, phytoplanktons, algal celluloses, tunicate celluloses, grasses including *spinifex* grasses, and combinations thereof.

The direct use of biomass from lignocellulose wood or non-wood sources, without the need for conventional extraction/pretreatment steps, can immediately reduce the consumption of many potentially toxic chemicals, in some cases by as much as 50-60%.

Moreover, the process of the present disclosure avoids the consumption of large amounts of electrical energy, which is generally used in conventional processes to extract cellulose from raw biomasses as the starting materials, e.g., steam explosion, or other high pressure explosion processes.

As used herein, a "purifying agent" includes any material capable of removing impurities from liquids, including water, and encompasses various mechanisms for action, including action as a coagulant, a flocculant, an absorbent, an adsorbent, combinations thereof, and the like.

The present disclosure also includes methods for purification of water utilizing purifying agents, including coagulants, flocculant, absorbents and adsorbents, based on the disclosed sustainable nanocelluloses extracted from raw biomass. The raw biomass includes stems, branches, leaves, roots, grasses including *spinifex* grasses, herbs and shrubs including agriculture residues, phytoplankton including algae, animal cellulose source including bacterial cellulose, using nitrogen rich acids and oxidizing agents at optimum time and temperature below 15 hours and 100° C. respectively. A low concentration of purifying agents (0.001-0.03 wt %) can remove several thousand ppm impurities of metals, non-metals ions and mixed ions from wastewater via coagulation, flocculation, nucleation or precipitation phenomenon, in a short time interval of ≤20 minutes. The unique non-crystalline behavior of the purifying agent (30-80% crystallinity) provides high efficiency (10-95%) to remove non-metal ions and mixed ions, including impurities such as lead, uranium, cadmium, copper, arsenic, chromium, manganite, iron, mercury and zinc, as well as all elements belonging to groups I to VIII of the periodic table, from wastewater. The efficiency of the produced nanofibers is 5-40% more efficient than the most effective existing purifying agent.

High surface area (from about 0.5 $m^2/g$ to about 2000 $m^2/g$) and high charge density (from about 0.25 mmol/g to about 5 mmol/g) of developed purifying agent provides suitability as good absorbent, adsorbent, coagulants, ions trapper and filter component. The newly developed purifying agent may be used as a coagulant in the form of suspension and as a filter component, to remove the metal ion impurities.

The methods of the present disclosure include a simple two-chemical method which includes contacting the raw biomass of lignocellulose wood or non-wood sources, including agricultural residues, phytoplanktons, algal celluloses, tunicate celluloses, and/or animal celluloses, including bacterial celluloses, with an acid component and an oxidizing agent. In embodiments, the acid component includes nitric acid ($HNO_3$). Nitric acid may be used by itself as the acid component, or may be combined with an additional acid. Suitable additional acids which may be used with nitric acid as the acid component include, in embodiments, hydrochloric acid (HCl), sulfuric acid ($H_2SO_4$), acetic acid ($CH_3COOH$), hydrobromic acid (HBr), hydrofluoric acid (HF) and combinations thereof. The acid component, which may be nitric acid or a combination of nitric acid with one of the other foregoing acids, may be at a concentration from about 10 mmol to about 300 mmol, in embodiments from about 20 mmol to about 250 mmol.

Suitable oxidizing agents include, in embodiments, nitrite salts, nitrate salts, and combinations thereof. Suitable nitrite salts and nitrate salts include, for example, sodium nitrite ($NaNO_2$), potassium nitrite ($KNO_2$), calcium nitrite ($Ca(NO_2)_2$), magnesium nitrite ($Mg(NO_2)_2$), lithium nitrite ($LiNO_2$), ammonium nitrite ($NH_4NO_2$), nitrite esters, sodium nitrate ($NaNO_3$), potassium nitrate ($KNO_3$), calcium nitrate ($Ca(NO_3)_2$), magnesium nitrate ($Mg(NO_3)_2$), lithium nitrate ($LiNO_3$), ammonium nitrate ($NH_4NO_3$), nitrate esters, and/or combinations of these nitrite salts and nitrate salts. The oxidizing agent may be at a concentration from about 0.1 mmol to about 60 mmol, in embodiments from about 10 mmol to about 30 mmol.

In accordance with the present disclosure, the plant biomass is chopped or otherwise reduced in size and then treated with an acid as described above to wet the plant biomass. In some embodiments, the plant biomass may be washed with acetone, water, sodium hydroxide, potassium hydroxide, ethyl acetate, ethanol, and combinations thereof, prior to addition of the acid. The oxidizing agent(s), such as a nitrite salt described above, is then added thereto, and the materials are held at a temperature from about 25° C. to about 100° C., in embodiments from about 40° C. to about 60° C.

The process can be completed in a short time period, in embodiments from about 30 minutes to about 72 hours, in other embodiments from about 3 hours to about 12 hours, without the aid of mechanical treatments.

Preparation of newly developed purifying agent/coagulant/flocculant/adsorbent is very simple, cost-effective, energy efficient, sustainable, green and one step method, utilized raw biomass (stems, branches, leaves, roots, grasses including *spinifex* grasses, herbs and shrubs including agriculture residues, phytoplanktons, algal celluloses, tunicate celluloses, and/or animal cellulose sources including bacterial cellulose). The preparation include the use of waste biomass to generate prominently non-cystalline purifying agent/coagulant/flocculant/adsorbent by using nitrogen containing acid and oxidizing agent at optimum time and temperature below 15 hours and 50° C. respectively. The generated purifying agent/coagulant/flocculant/adsorbent has nanodimensions (≤10 nm nominal diameter and ≤10000 nm length), which provide high surface area (from about 500 m$^2$/g to about 2000 m$^2$/g). Moreover, the process of preparation includes recycling of effluent as a nitrogen rich fertilizer. Hence, the preparation of developed purifying agent/coagulant/flocculant/adsorbent is much easier, one step, cost-effective, energy efficient (no use of pyrolysis or heating at high temperature; no use of inert gas; minimum mechanical and electrical energy; less consumption of chemicals), sustainable as compared to other current purifying agent/coagulant/flocculant/adsorbent.

While the methods of the present disclosure do not require the use of mechanical steps, in some embodiments, however, additional mechanical treatments may be used with the methods of the present disclosure. Such methods include, for example, sonication, homogenization, cryocrushing, grinding, steam explosion, ball-milling and combinations thereof.

Sonication is a method within the purview of those skilled in the art and includes the use of sound wave energy to break up materials. Commercially available sonicators are available for purchase, and include those sold by Misonix. Times and conditions for sonication may be determined following the manufacturer's directions.

Homogenization is a method within the purview of those skilled in the art. Commercially available homogenizers are available for purchase, and include those sold by APV and/or Gaulin. Homogenization includes shearing, impact and cavitation forces to break up materials. The pressures applied can be about 1000 bar, for example. Times and conditions for sonication may be determined following the manufacturer's directions.

Cryocrushing is a method within the purview of those skilled in the art and includes the use of a cryogenic liquid, such as liquid nitrogen, to cool materials (down to temperatures as low as −196° C.) to the point they become brittle, thereby facilitating their mechanical reduction. Times and conditions for cryocrushing may be determined following the manufacturer's directions.

Steam explosion is a violent boiling or flashing of water into steam, occurring when water is either superheated, or rapidly heated by fine hot debris introduced therein. In general, steam explosion is a process in which biomass can be treated with hot steam (180° C. to 240° C.) under pressure (1 to 3.5 MPa) followed by an explosive decompression of the biomass that results in a rupture of the rigid structure of the biomass fibers.

Where optional extra mechanical treatments such as sonication, homogenization, cryocrushing, and the like are used, the completion time for the reaction can be substantially shortened, in embodiments to from about 1 minute to about 6 hours, in other embodiments from about 5 minutes to about 1 hour.

After the reaction of acid and oxidizing agent is complete, the resulting carboxy or carboxylated nanocelluloses may be collected by means within the purview of those skilled in the art, including, for example, decantation, centrifugation and/or dialysis.

The dimensions of the carboxycellulose nanofibers produced by this method have a fiber length (L) equal to or less than 1000 nm, in embodiments from about 50 to about 1000 nm, in other embodiments from about 150 nm to about 900 nm.

The carboxycellulose nanofibers produced by this method have a nominal diameter (D) from about 2 nm to about 20 nm, in embodiments from about 3 nm to about 10 nm.

The resulting carboxycellulose or carboxylated celluloses nanofibers have a carboxy content from about 5% to about 30%, in embodiments from about 10% to about 25%, and may have aldehyde content from 0-2%. The resulting carboxycellulose nanofibers have a lignin content from about 1% by weight to about 15% by weight, in embodiments from about 2% by weight to about 10% by weight.

The acids and oxidizing agents described herein, in embodiments $HNO_3$ and $NaNO_2$, are inexpensive and recyclable chemicals. The methods of the present disclosure allow the production process to be very cost-effective and environmentally friendly, and avoid the disadvantages associated with other chemical methods, such as the TEMPO-mediated oxidation method. As noted above, the TEMPO method involves high cost chemicals, where the recycling of unused TEMPO reagents or other oxidizing reagents is often problematic.

Carboxylated cellulose nanofibers produced by the methods of the present disclosure have a wide array of applications, ranging from the papermaking industry to water purification and biomedical applications.

The carboxy groups on the surface of the nanocelluloses thus produced can then be easily modified into functional derivatives such as amide, acetate, ether, etc. Methods for modifying the carboxy groups into these functional derivatives are within the purview of those skilled in the art.

Nanofibers formed of oxidized, or carboxylated, or carboxy nanocellulose have many unique physical properties, including being biodegradable, functionalizable, high in strength and low in weight. In addition, as cellulose is the most abundant compound found on earth, its renewability makes this biopolymer an environmentally friendly and viable alternative to the more expensive and synthetic carbon and silicon-based nanostructured materials.

In medicine, carboxylated nanocelluloses can be used as absorbable hemostatic agents to stop bleeding during and after surgical procedures because the materials can easily be degraded by the human body. Their high tensile strength also makes cellulose nanofibers a good material to reinforce polymer composites for structural applications.

Nanofibers of the present disclosure may also be used in forming filtration membranes. For example, a thin-film nanofibrous composite membrane based on oxidized cellulose nanofibers may be formed with the nanofibers of the present disclosure. Ma, Hongyang, et al., "Ultra-fine Cellulose Nanofibers: New Nano-scale Materials for Water Purification," Journal of Materials Chemistry 21 (2011): 7507-10. These thin film composite membranes are efficient in microfiltration, ultrafiltration, and/or nanofiltration for water purification applications and have the potential to be implemented in developing countries because of the low cost and availability of cellulose.

Although cellulose is hydrophilic, chemical modifications can make the fibers hydrophobic. This property change can be accomplished by the addition of functional groups, such as ethers and esters and would, therefore, make carboxylated cellulose (carboxycellulose) nanofibers well suited for membrane distillation that can convert brackish water or seawater to drinking water.

A low concentration of purifying agent (0.001-0.03 wt %) can remove several thousand ppm impurities of metals, non-metal ions and mixed ions from wastewater via coagulation, flocculation, nucleation or precipitation phenomenon, in a short time interval of ≤20 minutes. The unique non-crystalline behavior of purifying agent (30-40% crystallinity) provide high efficiency (10-95%), to remove non-metal ions and mixed ions impurities such as lead, uranium, cadmium, copper, arsenic, chromium, manganite, iron, and zinc, including all elements belonging from I to VIII groups in the periodic table, from wastewater.

The developed purifying agent/coagulant/flocculant/adsorbent is biodegradable, sustainable, and biocompatible, as it is prepared from waste plant biomass.

Efficiency of prepared purifying agent/coagulant/flocculant/adsorbent is higher than the existing water purifying agents/coagulants/flocculants/adsorbents:

(i) The efficiency of purifying agent/coagulant/flocculant/adsorbent for low concentration of lead (250 to 5000 ppm) was 2770 mg/g, as derived from the LSRL coefficient of $3.6 \times 10^{-4}$ in the Langmuir model, which was ~30% more efficient than the most effective absorbent reported in literature (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces 4, 4283-4287 (2012)) and 3 times more efficient than the most effective cellulose based adsorbent (Y. Liu, W. Wang, A. Wang Adsorption of lead ions from aqueous solution by using carboxymethyl cellulose-g-poly (acrylic acid)/attapulgite hydrogel composites. Desalination, 259 (2010), pp. 258-264).

(ii) The removal efficiency of purifying agent/coagulant/flocculant/adsorbent for high concentrations of lead ($4.37 \times 10^4$ ppm to $1.09 \times 10^4$ ppm) before lead insolubility, showed a capacity exceeding 20,000 mg/g, indicating the presence of a non-adsorption based removal mechanism, which was ~6 to 8 times more efficient than the most effective adsorbent reported in the literature (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces, 4, 4283-4287 (2012)). The calculations were based on ICPMS data.

(iii) The efficiency of purifying agent/coagulant/flocculant/adsorbent for cadmium removal was $~1.35 \times 10^4$ mg/g at low concentrations (250 ppm to 5000 ppm) of cadmium. At low concentrations of cadmium, the produced purifying agent/coagulant/flocculant/adsorbent yielding an adsorption capacity of $~1.35 \times 10^4$ mg/g, about 9 times more effective than the most effective absorbent, being the flower like magnesium oxide, with an adsorbent capacity of 1500 mg/g (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces 4, 4283-4287 (2012)).

High surface area (from about 0.5 m$^2$/g to about 2000 m$^2$/g) and high charge density (from about 0.25 mmol/g to about 5 mmol/g) of developed purifying agent provides suitability as good absorbent, adsorbent, coagulants, ions trapper and filter component.

Even a low concentration of purifying agent/coagulant/flocculant/adsorbent is efficient in removing the impurities of metal ions/non-metal ions/mixed in a short time period of ≤20 minutes, without assisting any mechanical or electrical energy at room temperature and at neutral pH, which would enable realistic applications.

The present disclosure is focused on the demonstration of use of waste plant biomass (stems, branches, roots, leaves, grasses, herbs, shrubs), including agricultural waste, phytoplanktons, algal celluloses, tunicate celluloses, and animal celluloses such as bacterial cellulose, as a purifying agent/coagulant/flocculant/adsorbent, to remediate metal ions/non-metal ions/combined impurities. The present disclosure is based on the hypothesis that the generation of non-crystalline, highly charged, nanodimension forms from waste plant biomass, can effectively increase the surface area, porosity and activity of the molecule, which could enable preparation of cost-effective, energy efficient, sustainable purifying agent/coagulant/flocculant/adsorbent.

The preparation include the reaction of waste biomass with nitrogen containing acid and oxidizing agent at optimum time and temperature below 15 hours and 100° C. respectively. The generated purifying agent/coagulant/flocculant/adsorbent has nanodimensions (≤10 nm nominal diameter and ≤10000 nm length), which provide high surface area (from about 500 m$^2$/g to about 2000 m$^2$/g). Moreover, the process of preparation includes recycling of effluent as a nitrogen rich fertilizer. Hence, the preparation of developed purifying agent/coagulant/flocculant/adsorbent is much easier, one-step, cost-effective, energy efficient (no use of pyrolysis or heating at high temperature; no use of inert gas; minimum mechanical and electrical energy; less consumption of chemicals), sustainable as compared to other current purifying agent/coagulant/flocculant/adsorbent.

Here, for the first time, the use of a prominently, non-crystalline nanodimension form is shown to remediate metal ions/non-metal ions/mixed ions from wastewater with efficiency much higher than the current purifying agents.

The use of plant biomass as adsorbent had been already reported in prior art, but none was able to generate highly efficient purifying agent, which can be utilized to remediate the metal ions/non-metal ions/mixed metal, non-metal ions at few ppm to several thousand ppm level.

The developed purifying agent/coagulant/flocculant/adsorbent are 30% more efficient than the most effective adsorbent reported in the literature (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces 4, 4283-4287 (2012)) and 3 times more efficient than the most effective cellulose based adsorbent (Y. Liu, W. Wang, A. Wang Adsorption of lead ions from aqueous solution by using carboxymethyl cellulose-g-poly (acrylic acid)/attapulgite hydrogel composites. Desalination, 259 (2010), pp. 258-264). Notably, activated charcoal with lead adsorption capacity can be extracted from numerous plant materials (Gergel, O. et al. Adsorption of lead(II) ions from aqueous solutions by activated carbon prepared from biomass plant material of *Euphorbia rigida*, Chem. Eng. J. (2007), 132 pp. 289-297), such as sugar cane bagasse (Zhang, W. H. et al. Roles of physical and chemical properties of activated carbon in the adsorption of lead ions, Chemosphere (2005) 60 (8) pp. 1129-1140), shells of nuts (Bansode, R. R. et al. Adsorption of metal ions by pecan shell-based granular activated carbons Bioresour. Technol. (2003) 89 (2) pp. 115-119; Wilson, K. et al. Select metal adsorption by activated carbon made from peanut shells Bioresour. Technol. (2006), 97 (18) pp. 2266-2270; Issabayeva, G. et al. Removal of lead from aqueous solutions on palm shell activated carbon Bioresour. Technol. (2006), 97 (18), pp. 2350-2355; Ahmedna, M. et al. The use of nutshell carbons in drinking water filters for removal of trace metals Water Res. (2004), 38 (4), pp. 1062-1068), and fruit components (Malik, D. J. et al. Characterisation of novel modified active carbons and marine algal biomass for the selective adsorption of lead Water Res. (2002), 36 (6), pp. 1527-1538;

Ferro-Garcia, M. A. et al. Removal of lead from water by activated carbons Carbon (1990), 28 (4), pp. 545-552) have much lower efficiency (1.79 mg/g-50 mg/g) which is ~99% lower than the developed purifying agent/adsorbent/flocculant/coagulant. In addition, chemical precipitation by using toxic chemicals such as calcium oxide, hydrogen sulphide, magnesium oxide, 1,3-benzenediamidoethaneethiolate and 1,3,5-hexahydrotriazinedithiocarbamate etc. have been also used to remove heavy metal ions impurities from waste water. But, the process of chemical precipitation (Fu, F.; Wang, Qi, Removal of heavy metal ions from wastewaters: A review, Journal of Environmental Management, 92 (2011), 407-418) is associated with the problem of disposing the precipitant hence it is not environment friendly. While, the developed purifying agent/coagulant/flocculant/adsorbent is green and environment friendly, and can also recycled by nitric acid treatment.

Moreover, the carbon nanotubes (multi walled, singled walled) have been also utilized to remove the heavy metal ions (Wang, H. J. et al., Mechanism study on adsorption of acidified multi-walled carbon nanotubes to Pb(II). J. Colloid Interface Sci., 316, 277-283 (2007); Chen, C. L. et al, Adsorption behaviour of multiwall carbon nanotube/iron oxide magnetic composites for Ni (II) and Sr(II), J. Hazard. Mater. 164, 923-928 (2009); Hu, J. et al., Removal of Chromium from aqueous solution by using oxidized multi-walled carbon nanotubes, J. Hazard. Mater. 162, 1542-1550 (2009)), however the maximum adsorption capacity observed for lead by carbon nanotube was only 102 mg/g, which is ~63% lower than the developed purifying agent/coagulant/flocculant/adsorbent. Also, the carbon nanotubes are expensive as compared to purifying agent/coagulant/flocculant/adsorbent, disclosed herein.

Additionally, various purification units such as reverse osmosis, nanofiltration also use to filter the metal ions impurities with efficiency ≥90%, but these units require extensive energy usage and is not cost effective (Zhang, L. N. et al., Mechanism of combination membrane and electro-winning process on treatment and remediation of Cu2+ polluted water body. J. Environ. Sci., 21, 764-769 (2009); Mohsen-Nia, M. et al., Removal of Cu2+ and Ni2+ from wastewater with a chelating agent and reverse osmosis processes. Desalination, 217, 276-281 (2007))

Thus, the disclosed purifying agent/adsorbent/flocculant/coagulant has a great potential to provide a sustainable and efficient option to remediate heavy metal ions/non-metal ions/combined impurities from wastewater because these nanofibers provide the best optimized combination of environmental sustainability with efficiency higher than the existing adsorbent.

The following Examples are being submitted to illustrate embodiments of the present disclosure. The Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Comparative Example 1

In this example, bamboo was chosen as the source for an extracted cellulose sample because it is widely available, especially in tropical and temperate regions, and is inexpensive. Bamboo not only has a high tensile strength, but also a high Young's modulus relative to other materials such as jute. This means that applying a large stress only results in a minimal strain on the fibers. In the TEMPO method, only extracted cellulose can be used to prepare oxidized cellulose nanofibers. Thus, the bamboo cellulose sample of this example served as a point of comparison and confirmed whether or not the method of the present disclosure could replace the TEMPO-mediated oxidation in an environmentally friendly and cost-effective way.

The $HNO_3$ and $NaNO_2$ treatment of the present disclosure was first carried on the bamboo sample to determine its efficacy on extracted cellulose, in which lignin, pectin, hemicellulose and impurities had already been removed. The 70% ACS reagent grade $HNO_3$ and the ≥97% ACS reagent grade $NaNO_2$ were both obtained from Sigma Aldrich. The reaction was set up to run under the fume hood. An open cylindrical glass container that was filled with silicon oil (used as the heat transfer fluid) to a height of about 5 cm was placed on top of a magnetic stirrer hotplate. Using a clamp stand, a three neck round bottom flask was placed in a fixed position so that the bottom would be partially submerged in the silicon oil, which was heated to about 50° C. First, about 1 gram of the bamboo cellulose was placed into a three-neck round bottom flask. After this, about 14 mL of $HNO_3$ (nitric acid) were added to the flask. This volume of acid (nitric acid) was found to be appropriate because it was just enough to completely submerge the bamboo cellulose. About 1.96 grams of $NaNO_2$ (sodium nitrite) were then added, creating about 14 weight % solution of $NaNO_2$ and $HNO_3$. A magnetic needle stirrer was added and the mixture of cellulose, $HNO_3$ and $NaNO_2$ was stirred at about 250 rpm for about 12 hours to ensure that the macrofibrils of the bamboo cellulose absorbed the acid and oxidizing agent in a thorough and uniform manner. After about 12 hours of continuous stirring, the reaction was quenched with about 250 mL of room temperature water.

After the $HNO_3$ and $NaNO_2$ treatment, the resulting cellulose fibers were in a suspension. The suspension generally had a pH of approximately 1 to 1.5. The cellulose fibers had to be neutralized in order to prepare the samples for subsequent chemical characterization and morphological studies, as well as to make the fibers more easily implementable in a variety of applications. To separate the fibers from the acidic media and to rinse them free of $NaNO_2$, a process including centrifugation and washing was used. The centrifugation tubes were each filled with the suspension to an equal volume. The suspension then underwent several rounds of centrifugation at about 6500 rpm for about 15-30 minutes each. In between every round, the supernatant, containing $HNO_3$ and $NaNO_2$, was decanted and distilled water was added to replace the lost fluid. After ensuring that every tube was filled with the water to the same volume, the centrifugation and rinsing procedure was repeated until the pH reached approximately 2.5, as the dialysis tubing used in the following procedure could not withstand a pH below 2.

After the suspension reached a pH of about 2.5, the samples were dialyzed in order to quicken the process and decrease the use of centrifugation for extended periods of time, which would lead to greater expenditure of mechanical energy. The suspension was removed from the centrifugation tubes and syringed into the dialysis bags obtained from Sigma Aldrich, which had a 6-8 kDa molecular weight cutoff. The dialysis tubing, now with the oxidized cellulose fibers inside, was placed inside a 1000 mL beaker filled with water and put on magnetic stirring at about 250 rpm for about 24 hours in order for the fibers to return to a more neutral pH of 6-7. The water entered the tubing, neutralizing the cellulose fibers, while the remaining $HNO_3$ and $NaNO_2$ in the suspension left the dialysis tube.

Example 1

The process of Comparative Example 1 was repeated on raw jute fibers. For each of the trials using jute fiber, about 1 gram of the fibers was used. Table 1 below shows the different conditions tested in order to optimize the reactions for jute fibers.

TABLE 1

| Sample | Reaction conditions | $HNO_3$ | $NaNO_2$ | Results |
|---|---|---|---|---|
| 1 | 12 hours/50° C. | 14 ml (22 mmol) | 3.92 grams (57 mmol) | Obtained nanofibers |
| 2 | 12 hours/50° C. | 14 ml (22 mmol) | 1.96 grams (28 mmol) | Obtained Nanofibers |

Example 2

A titration method was used to quantitatively determine the percent carboxyl content of the cellulose nanofibers of Comparative Example 1 and Example 1. About 0.25 grams of the bamboo nanofiber sample from Comparative Example 1 was suspended in a 25 mL 2% calcium acetate w/v solution for about 30 minutes to disperse. The mixture of the nanofibers and the calcium acetate solution was titrated with about 0.1 N NaOH. The indicator used was phenolphthalein. This same process was repeated for the jute nanofibers of Example 1.

The percent carboxyl content was determined using equation (i) below:

$$\text{Carboxyl groups (\%)} = \frac{N \times V \times MW_{COOH}}{\text{Weight of Sample (mg)}} \quad (i)$$

In the above equation, N is the molarity of the NaOH solution (0.1), V is the volume in mL of the NaOH consumed and $MW_{COOH}$ is the molecular weight of —COOH, the carboxyl group (about 45 grams). When the percent carboxyl content was calculated for the bamboo cellulose nanofibers, the result was about 21.6% and when calculated for the raw jute nanofibers, the result was about 17.1%.

Example 3

In order to conduct morphological studies, the neutralized fibers produced in Comparative Example 1 and Example 1 (obtained after dialysis) were first frozen using liquid nitrogen. The neutralized fiber suspensions were transferred to glass vials and the sample was frozen with liquid nitrogen. The vials were then placed into a larger glass jar that was later attached to a cryogenic freezing machine (lyophilizer) at ~43° C. After 12 hours, the samples were prepared for TEM imaging. TEM imaging was then used to determine the average diameter and lengths of the nanofibers.

The average diameter of the oxidized bamboo cellulose nanofibers of Comparative Example 1 was determined to be between about 5 and about 10 nm. The average length was about 97±33 nm. The average length was analyzed using a program called ImageJ used to process multidimensional images. Based on the scale for the TEM image, the lengths of 20 different fibers were measured using ImageJ. The average fiber lengths and standard deviations were also calculated by using the program.

The average diameter for the oxidized cellulose nanofibers obtained from raw jute from Sample 3 of Example 1 was also between about 5 nm and about 10 nm. After 20 fibers were measured in ImageJ, the average length was found to be about 214 nm with a standard deviation of about 19 nm. Therefore, while the diameters of the nanofibers were very similar in size, the average length of the raw jute fibers was more than double that of the bamboo cellulose nanofibers. The TEM images also indicated that the bamboo cellulose nanofibers had a higher degree of agglomeration than the jute nanofibers.

Example 4

Fourier Transform Infrared Spectroscopy (FTIR) is a characterization technique that uses infrared radiation to examine the molecular absorption and transmission of a material. The resulting infrared spectrum can qualitatively analyze the amount of components in the material, as the absorption peaks correspond to the frequencies of vibrations between the bonds that make up the material. This technique was used after cryogenic freezing of the nanofiber samples produced in Comparative Example 1 and Example 1 to confirm the presence of carboxyl groups on the surface of the nanofibers produced. To determine whether the prepared bamboo nanofibers of Comparative Example 1 were carboxylated, the FTIR spectra of the bamboo cellulose before treatment (FIG. 1) and that of the bamboo nanofibers after the $HNO_3/NaNO_2$ treatment (FIG. 2) were compared.

Table 2 below shows which bond each peak indicated on the FTIR spectra corresponds to. The corresponding bond was determined through previous literature that studied the FTIR spectra of cellulose. The primary difference between the two spectra is that in FIG. 2, there is a peak at about 1723.78 $cm^{-1}$, which, as shown in the table below, corresponds to the C=O stretching vibration. This bond is a part of a carboxyl group, and therefore, qualitatively demonstrates that a portion of the bamboo cellulose nanofibers were oxidized.

TABLE 2

Peak Wavenumbers and Corresponding Bonds

Figure 2:
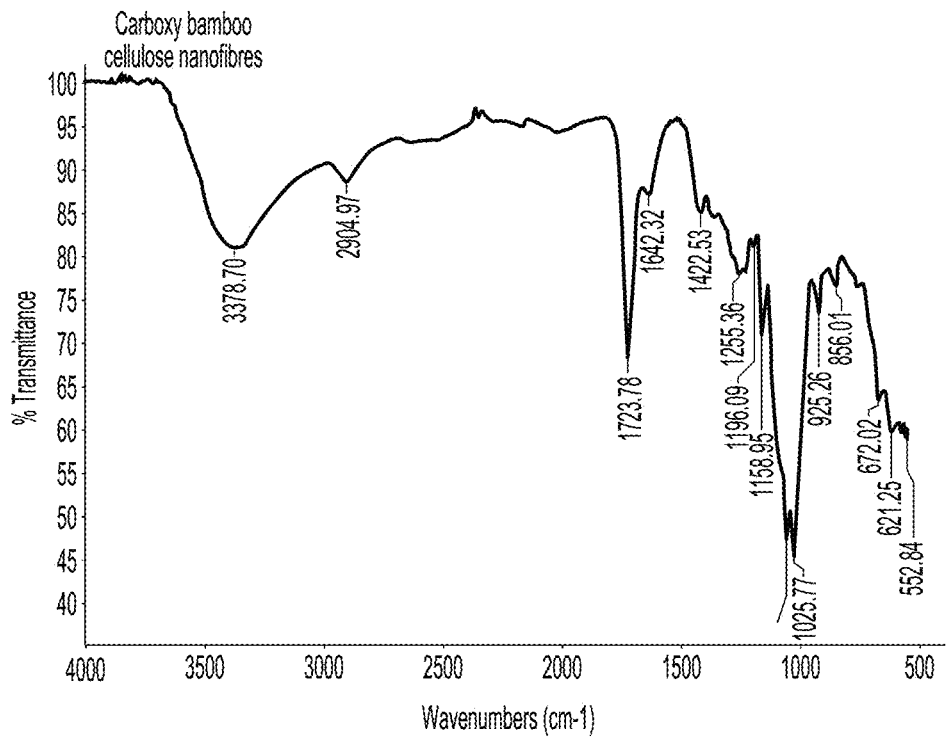
FIG. 2 is an FTIR spectra of carboxylated/oxidized bamboo cellulose nanofibers after treatment in accordance with the present disclosure.

| Peak Wavenumber ($cm^{-1}$) in FIG. 1 | Peak Wavenumber ($cm^{-1}$) in FIG. 2 | Bonds |
|---|---|---|
| 3324.57 | 3378.70 | OH stretching |
| 2899.50 | 2904.97 | C—H symmetrical stretching |
| — | 1723.78 | C=O stretching vibration |
| 1643.06 | 1642.32 | OH bending of absorbed water |
| 1030.50 | 1025.77 | C—C, C—OH, C—H ring & side group vibrations |

FTIR spectra of bamboo cellulose of Comparative Example 1 clearly showed a high cellulose content, represented by the hydroxyl peak at 3324 $cm^{-1}$ (FIG. 1). The appearance of a —C=O peak at 1723 $cm^{-1}$ (FIG. 2) showed the presence of carboxy group in cellulose nanofibers.

Figure 3:
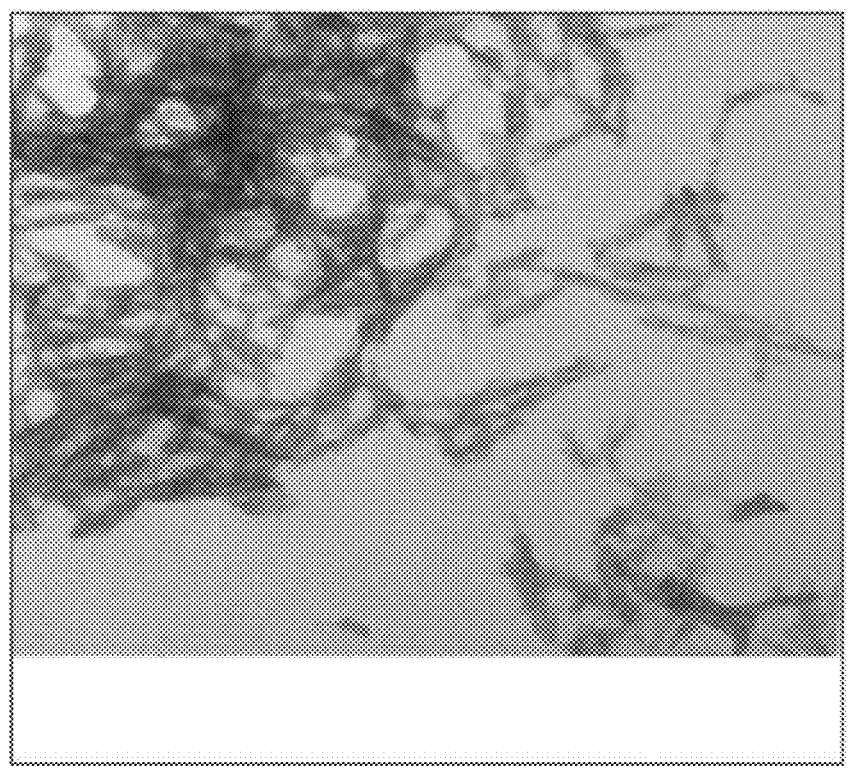
FIG. 3 is an image obtained by transmission electron microscopy (TEM) of carboxylated/oxidized bamboo cellulose nanofibers treated in accordance with the present disclosure.

The TEM image of carboxylated jute fibers of Example 1 shows the fiber diameter from about 4 nm to about 6 nm; and lengths from about 90 nm to about 140 nm as presented in FIG. 3.

Example 5

The calcium titration method was used to quantify the percent carboxyl content of the nanofibers of Comparative Example 1 and Example 1. The cellulose nanofibers were suspended in a calcium acetate solution and the indicator phenolphthalein was added. The mixture was then titrated with NaOH. Using the equation specified in the previous section, the percent carboxyl content for the oxidized bamboo cellulose nanofibers was calculated to be about 21.6%. This means that for every 1000 anhydroglucose units in the bamboo cellulose nanofibers, approximately 216 units contained the functional carboxyl group. The percent carboxyl content of the oxidized raw jute fiber nanofibers was found to be about 17.1%.

Example 6

Raw jute fibers (about 1 gram) were immersed in the beaker containing about 20 ml of 2N NaOH solution. This was allowed to stir at about 25° C. for about 24 hours. The base treated jute fibers were then washed with distilled water until the filtrate became neutral (pH=7-8). The washed jute fibers were then dried in an oven at about 70° C. for about 12 hours. The yield of the treated jute fibers was approximately 76%.

About 0.50 grams of base treated jute fiber was added to a 2-neck round bottom flask. About 14 ml concentrated $HNO_3$ (85%) was then added into the beaker under continuous stirring. Then, about 1.96 grams of sodium nitrite was added to the reaction mixture. On addition of sodium nitrite, red fumes were formed. To prevent the red fumes escaping, both mouths of the round bottom flask were covered by stoppers. The reaction was allowed to continue at about 50° C. for about 12 hours. The reaction was quenched by using about 250 ml of distilled water. The product was washed by using distilled water with the help of centrifugation (about 6500 rpm, for about 15 minutes) as follows. After each round of centrifugation, the supernatant were decanted off and the solid part again stirred with the distilled water for the next round of centrifugation. The above step was repeated several times, until the filtrate became neutral. The yield of the above procedure was about 38%.

Figure 4:
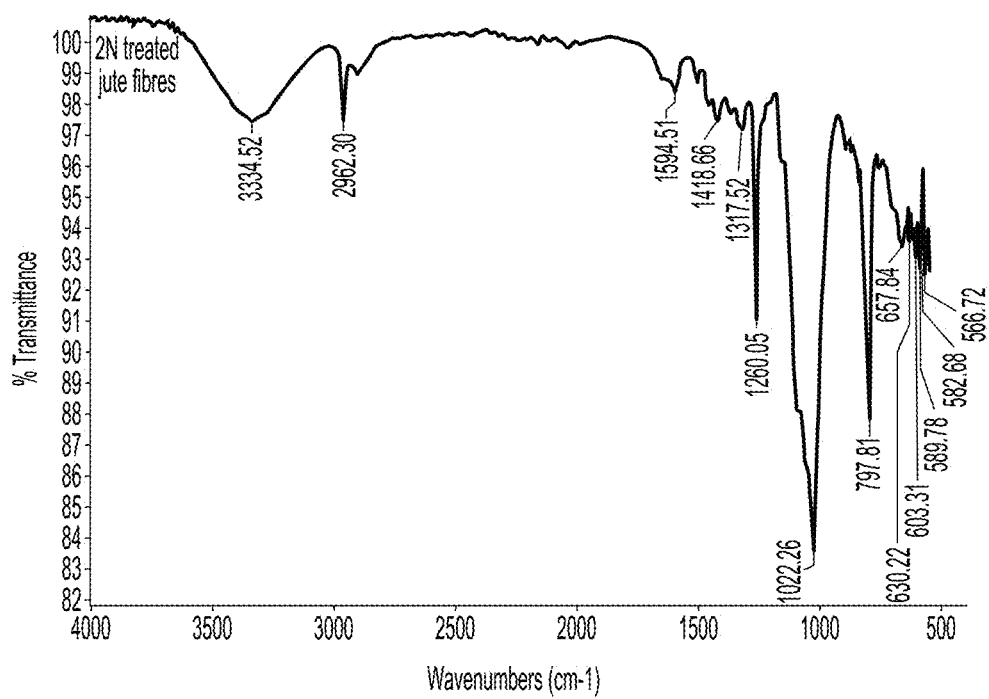
FIG. 4 is an FTIR spectra of 2N NaOH treated jute fibers.
Figure 5:
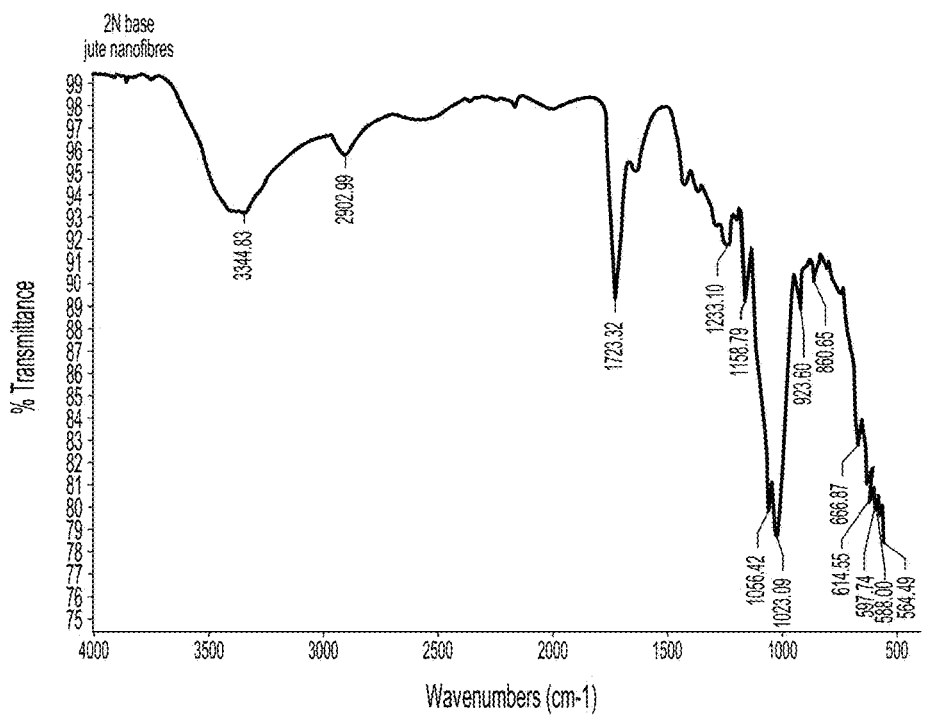
FIG. 5 is an FTIR spectra of carboxylated/oxidized cellulose nanofibers obtained from 2N NaOH treated jute fibers processed in accordance with the present disclosure.
Figure 6:
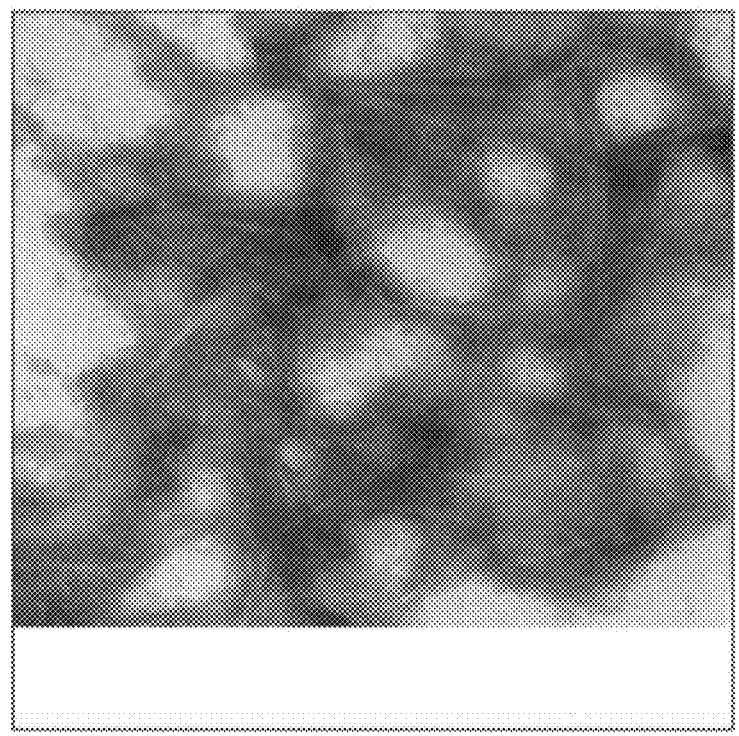
FIG. 6 is a TEM image of carboxylated/oxidized cellulose nanofibers obtained from 2N NaOH treated jute fibers processed in accordance with the present disclosure.

The prepared cellulose nanofibers were characterized using FTIR and TEM. FTIR spectra of 2N treated jute fibers clearly showed a high cellulose content, represented by the hydroxyl peak at 3334 cm$^{-1}$ (FIG. 4). The appearance of a —C═O peak at 1723 cm$^{-1}$ in cellulose nanofibers after the $HNO_3$/$NaNO_2$ (FIG. 5) showed the presence of carboxy groups in cellulose nanofibers. The TEM image of 2N treated jute fibers (FIG. 6) represents that the dimensions of jute fibers with diameters from about 4 nm to about 8 nm; lengths from about 110 nm to about 300 nm.

Example 7

Raw jute fibers (about 1 gram) were mixed in a beaker containing about 20 ml of 4N NaOH solution. The contents were allowed to stir at about 25° C. for about 24 hours. The base treated jute fibers were then washed with distilled water until the filtrate became neutral (pH=7-8). The washed jute fibers were then dried in an oven at about 70° C. for about 12 hours. The yield of the treated jute fibers was about 66%.

About 0.50 grams of base treated jute fibers was added to a 2-neck round bottom flask. About 14 ml concentrated $HNO_3$ (85%) was then added to the beaker under continuous stirring. Then, about 1.96 grams of sodium nitrite was added to the reaction mixture. On addition of sodium nitrite, red fumes were formed. To prevent the red fumes escaping, both mouths of the round bottom flask were covered by stoppers. The reaction continued at about 50° C. for about 12 hours. The reaction was quenched using about 250 ml of distilled water. The product was washed with the distilled water. After each round of centrifugation, the supernatant was decanted off and the solid part again stirred with distilled water for the next round of centrifugation. The above step was repeated several times, until the filtrate became neutral. The yield of cellulose nanofibers obtained was about 25%.

Figure 7:
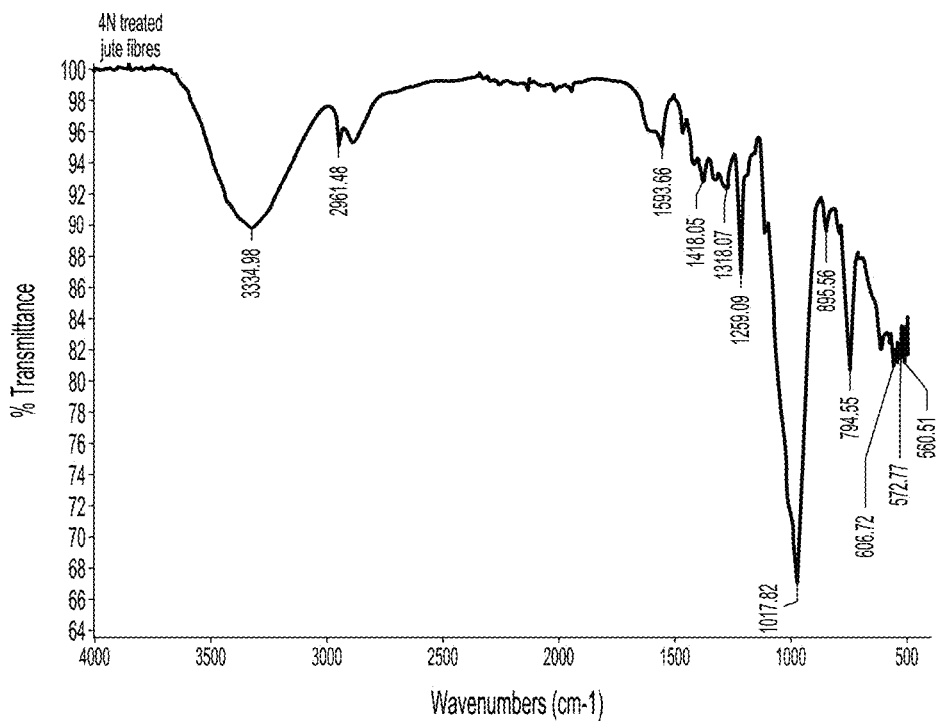
FIG. 7 is an FTIR spectra of 4N NaOH treated jute fibers processed in accordance with the present disclosure.
Figure 8:
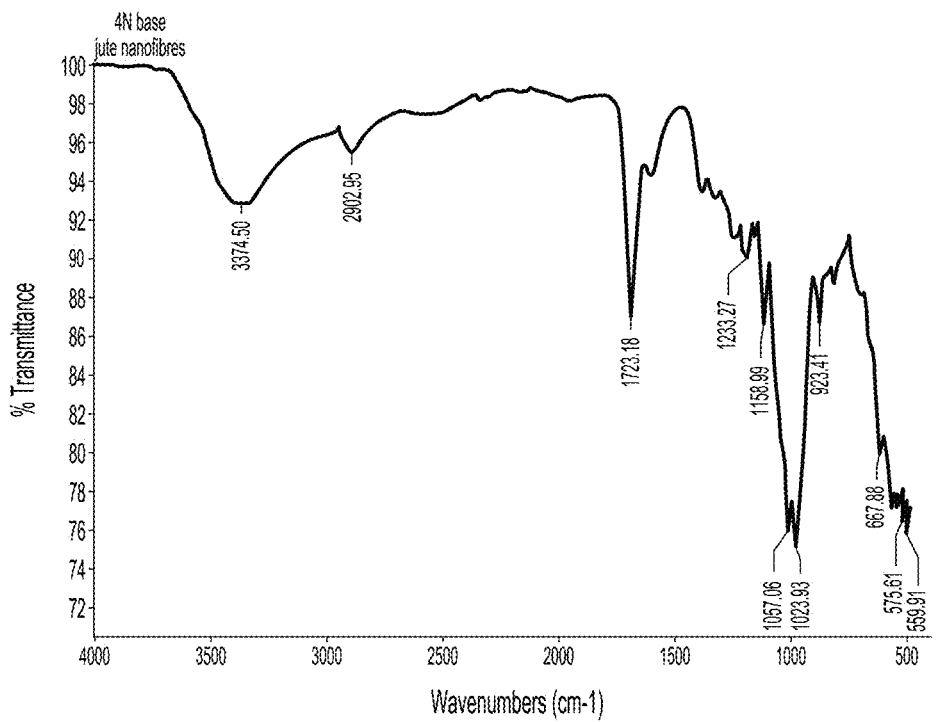
FIG. 8 is an FTIR spectra of carboxylated/oxidized cellulose nanofibers obtained from 4N NaOH treated jute fibers processed in accordance with the present disclosure.
Figure 9:
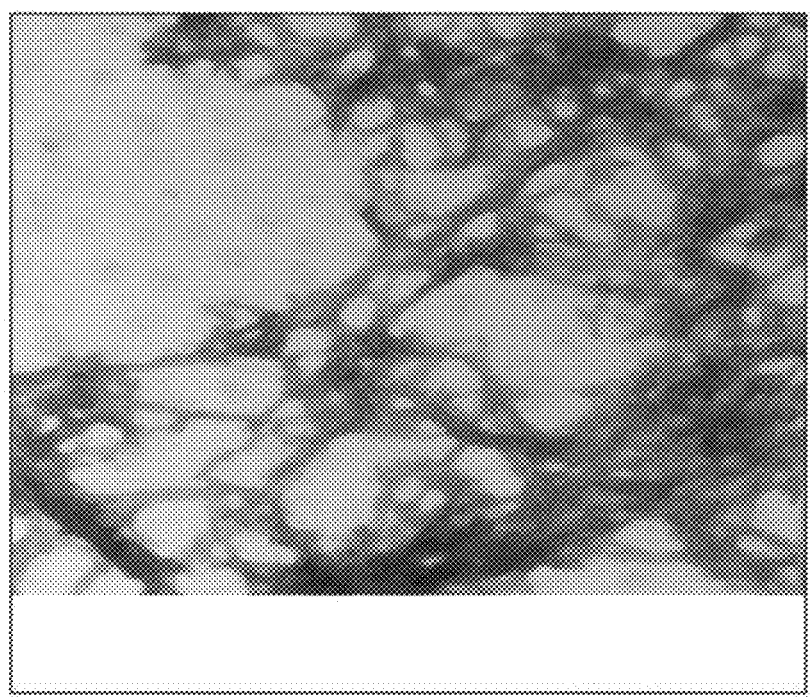
FIG. 9 is a TEM image of carboxylated/oxidized cellulose nanofibers obtained from 4N NaOH treated jute fibers processed in accordance with the present disclosure.

Prepared cellulose nanofibers were then characterized by using FTIR and TEM. The FTIR spectra of 4N treated jute fibers showed a high cellulose content represented by the hydroxyl peak at 3334 cm$^{-1}$ (FIG. 7). The appearance of a —C═O peak at 1723 cm$^{-1}$ after the $HNO_3$/$NaNO_2$ treatment (FIG. 8) showed the presence of carboxy group in cellulose nanofibers. The TEM image of 4N treated jute fibers revealed the dimensions of jute fibers with diameters from about 5 nm to about 6.5 nm, and lengths from about 112 nm to about 250 nm (FIG. 9).

Example 8

Raw jute fibers (about 1 gram) were mixed in a beaker containing about 20 ml of 5N NaOH solution. The contents were allowed to stir at about 25° C. for about 24 hours. The base treated jute fibers were then washed with the distilled water until the filtrate became neutral (pH=7-8). The washed jute fibers were then dried in an oven at about 70° C. for about 12 hours. The yield of the treated jute fibers was about 60%.

About 0.50 grams of base treated jute fibers were introduced to a 2 neck round bottom flask. About 14 ml concentrated $HNO_3$ (85%) was then added into the flask under continuous stirring. Then, about 1.96 grams of sodium nitrite was added to the reaction mixture. On addition of sodium nitrite, red fumes were formed. To prevent the red fumes escaping, both mouths of the round bottom flask were covered by stoppers. The reaction was carried out at about 50° C. for about 12 hours. The reaction was quenched by using the about 250 ml of distilled water.

After each round of centrifugation, the supernatant was decanted off and the solid part again stirred with the distilled water for the next round of centrifugation. The above step was repeated several times, until the filtrate became neutral. The yield of cellulose nanofibers obtained was about 20%.

Figure 10:
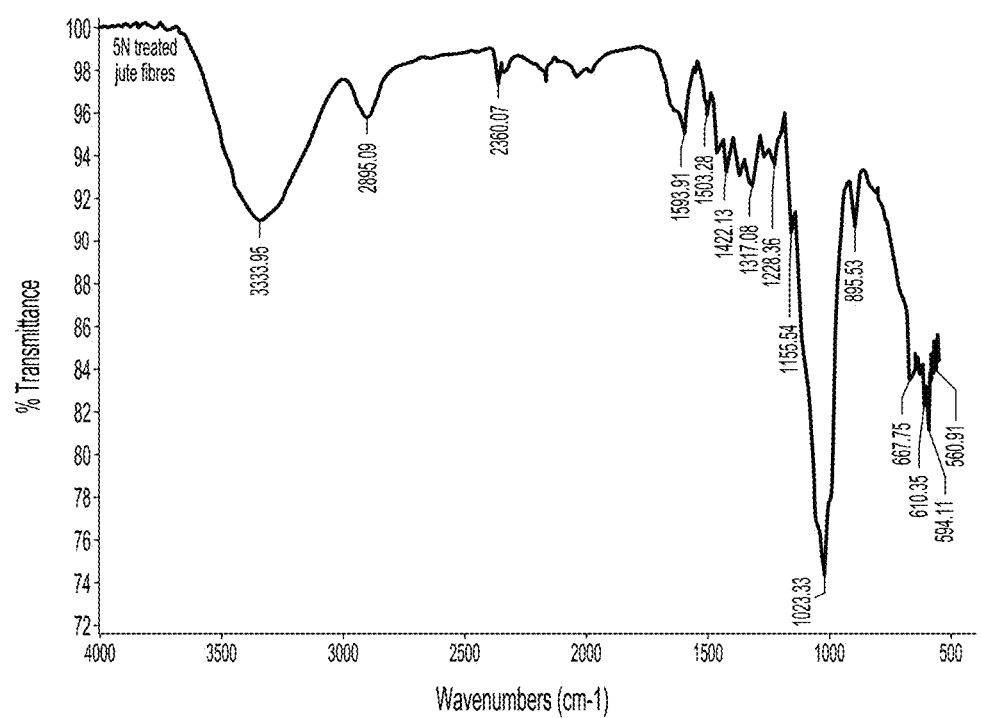
FIG. 10 is an FTIR spectra of 5N NaOH treated jute fibers.
Figure 11:
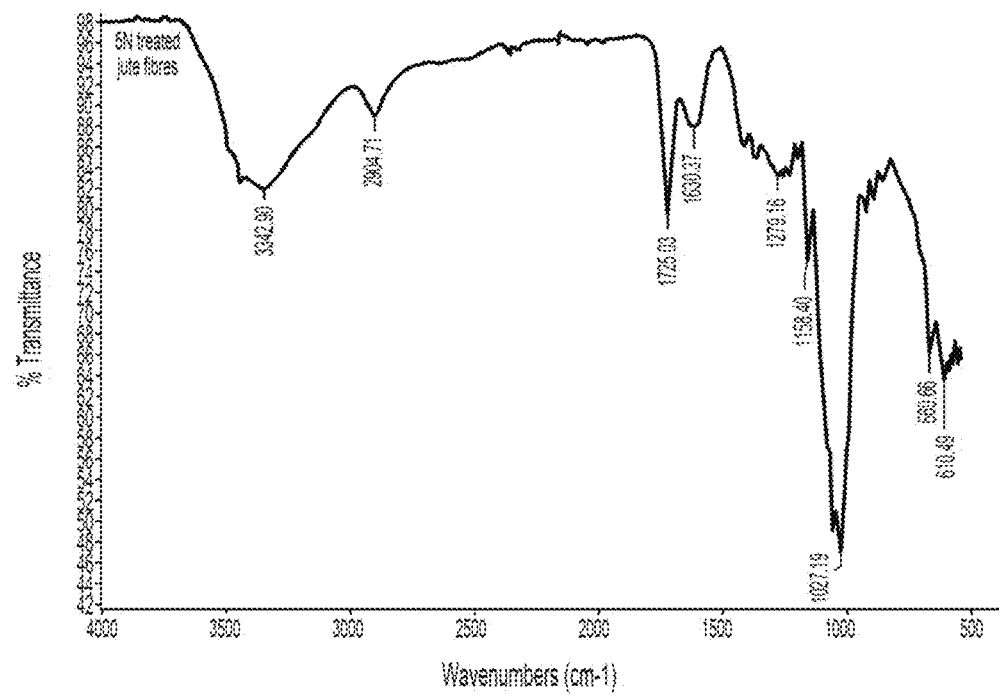
FIG. 11 is an FTIR spectra of carboxylated/oxidized cellulose nanofibers obtained from 5N base treated jute fibers processed in accordance with the present disclosure.
Figure 12:
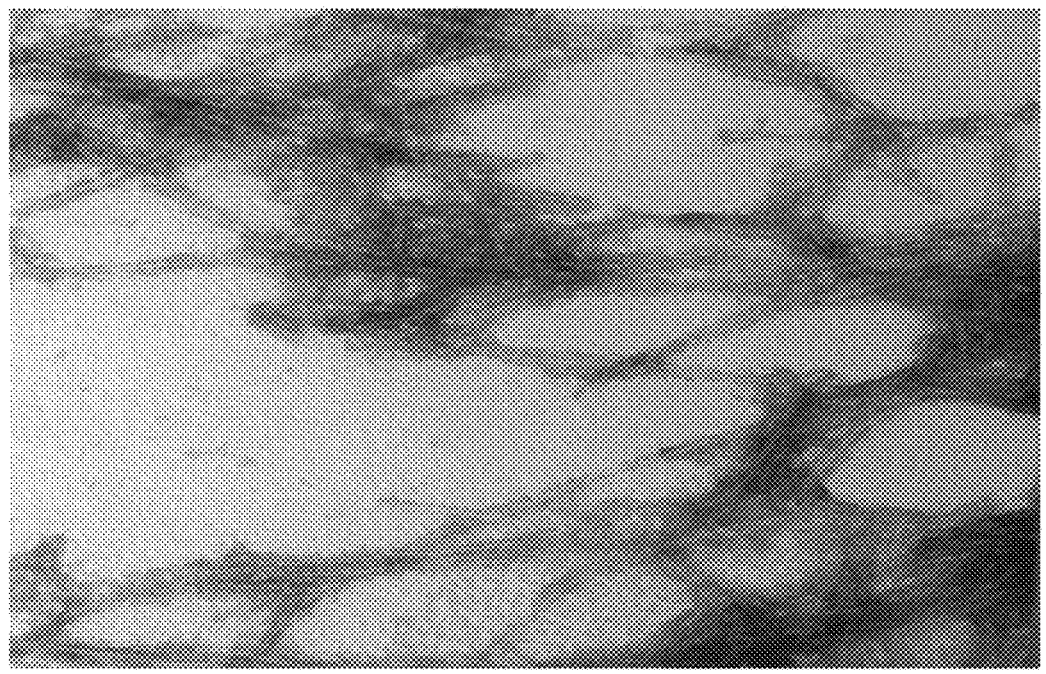
FIG. 12 is a TEM image of carboxylated/oxidized cellulose nanofibers obtained from 5N NaOH treated jute fibers processed in accordance with the present disclosure.

Prepared cellulose nanofibers were then characterized by using FTIR and TEM. FTIR spectra of 5N treated jute fibers clearly showed a high cellulose content, represented by the hydroxyl peak at 3334 cm$^{-1}$ (FIG. 10). The appearance of a —C═O peak at 1725 cm$^{-1}$ (FIG. 11) showed the presence of carboxy group in cellulose nanofibers. The TEM image of 5N treated jute fibers showed the dimensions of jute fibers with diameters from about 4 nm to about 6 nm; lengths from about 100 nm to about 300 nm (FIG. 12).

Example 9

Raw jute fibers (about 1 gram) were introduced to a 2 neck round bottom flask. About 14 ml concentrated $HNO_3$ (85%) was then added into the flask under continuous stirring. Then, about 3.92 grams of sodium nitrite was added to the reaction mixture. On addition of sodium nitrite, red fumes were formed. To prevent the red fumes escaping, both mouths of the round bottom flask were covered by stoppers. The reaction was carried out at about 50° C. for about 12 hours. The reaction was quenched by using about 250 ml of distilled water. After each round of centrifugation, the supernatant was decanted off and the solid part again stirred with the distilled water for the next round of centrifugation. The above step was repeated several times, until the filtrate became neutral.

Figure 13:
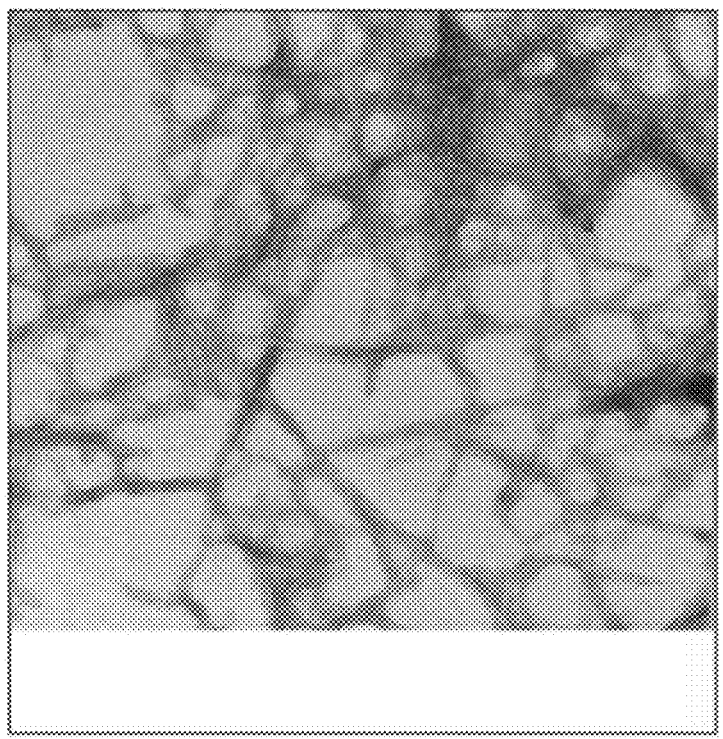
FIG. 13 is a TEM Image of carboxylated/oxidized cellulose nanofibers processed in accordance with the present disclosure from raw jute (TEM at 395000x and 80 kv)

The TEM image of carboxylated jute fiber show the fiber diameter from about 4 nm to about 6 nm; and lengths from about 100 nm to about 300 nm as presented in FIG. 13.

Example 10

Figure 14:
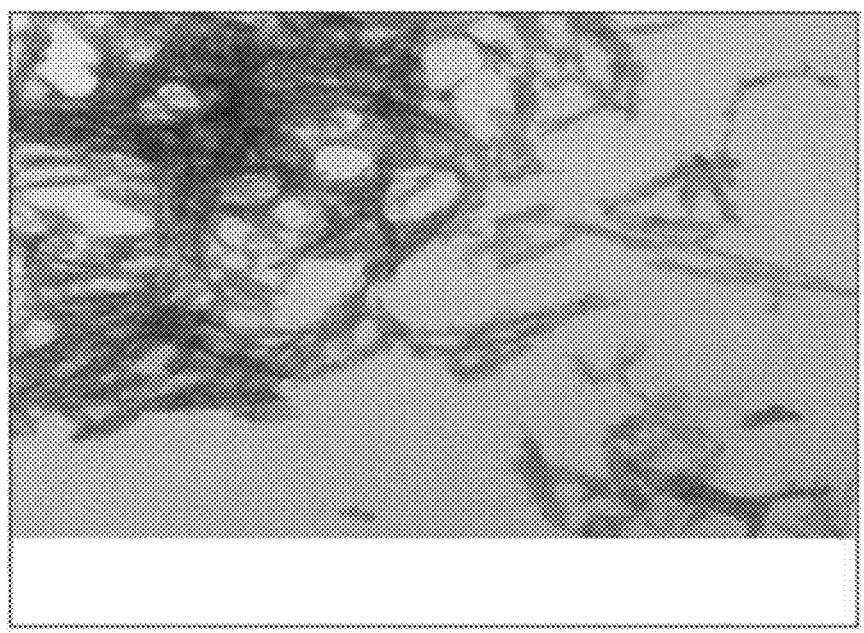
FIG. 14 is a TEM image of carboxylated/oxidized cellulose nanofibers obtained from raw jute fibers by nitric acid treatment processed in accordance with the present disclosure.
Figure 15:
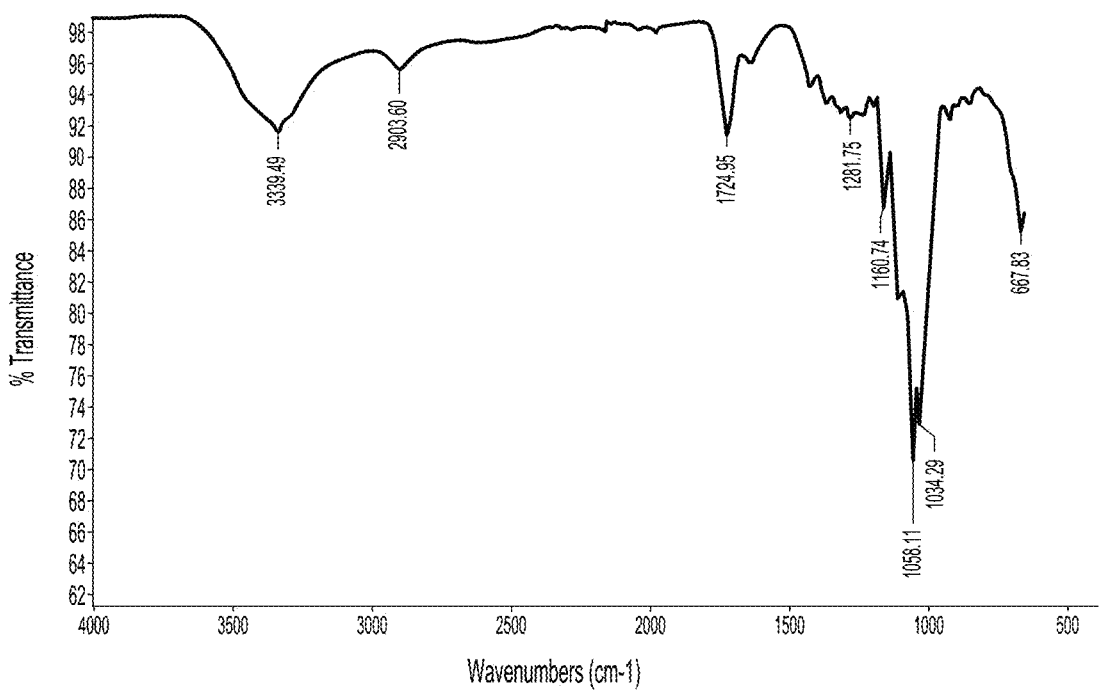
FIG. 15 is an FTIR spectra of carboxylated/oxidized cellulose nanofibers obtained from raw jute fibers by nitric acid treatment processed in accordance with the present disclosure.

Jute fiber (about 1 gram) was introduced to a 2 neck round bottom flask. About 14 ml concentrated $HNO_3$ (85%) was then added into the flask under continuous stirring. On addition of nitric acid, red fumes were formed. To prevent the red fumes escaping, both mouths of the round bottom flask were covered by stoppers. The reaction was carried out at about 50° C. for about 24 hours. The reaction was quenched by using about 250 ml of distilled water. After each round of centrifugation, the supernatant was decanted off and the solid part again stirred with the distilled water for the next round of centrifugation. The above step was repeated several times, until the filtrate became neutral. The morphological studies were done by TEM as shown in FIG. 14 and FTIR spectra of carboxylated/oxidized cellulose nanofibers as shown in FIG. 15.

Example 11

Figure 16:
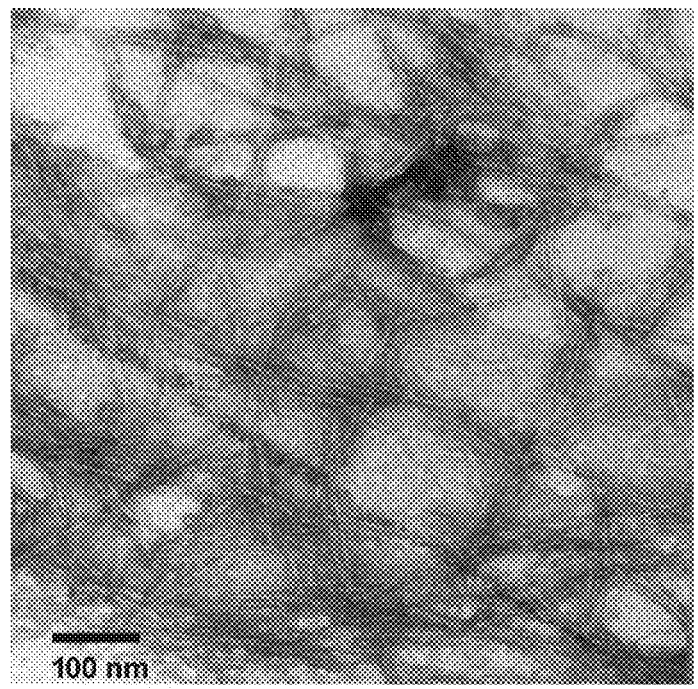
FIG. 16 is a TEM image of carboxylated/oxidized cellulose nanofibers obtained from *spinifex* fibers processed with nitric acid in accordance with the present disclosure.
Figure 17:
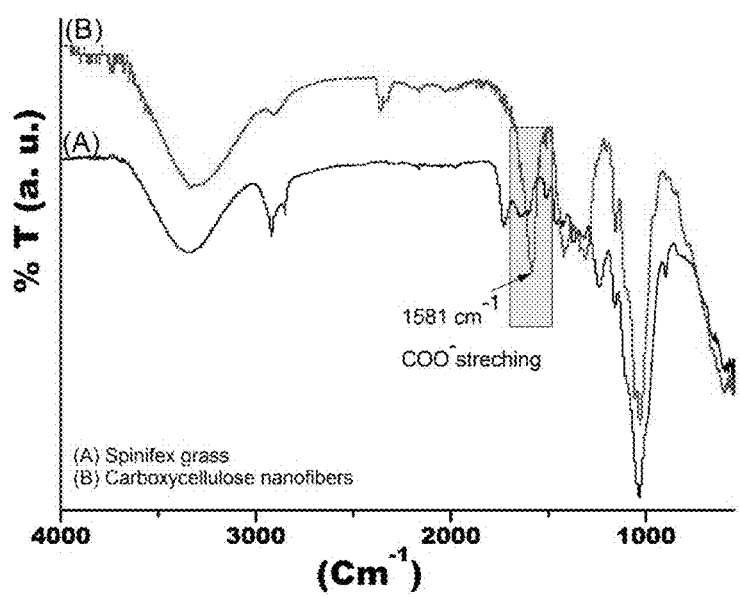
FIG. 17 is an FTIR spectra of carboxylated/oxidized cellulose nanofibers obtained from *spinifex* fibers processed with nitric acid in accordance with the present disclosure.

Spinifex grass (about 1 gram) was introduced to a 2 neck round bottom flask. About 10 ml concentrated HNO3 (85%) was then added into the flask under continuous stirring. On addition of nitric acid, red fumes were formed. To prevent the red fumes escaping, both mouths of the round bottom flask were covered by stoppers. The reaction was carried out at about 60° C. for about 12 hours. The reaction was quenched by using about 250 ml of distilled water. After each round of centrifugation, the supernatant was decanted off and the solid part again stirred with the distilled water for the next round of centrifugation. The above step was repeated several times, until the filtrate became neutral. The morphological studies were done by TEM as shown in FIG. 16 and FTIR spectra of carboxylated/oxidized cellulose nanofibers are shown in FIG. 17.

The UV-visible spectroscopy is a good technique to characterize lignin. Lignin includes p-coumaryl alcohol, coniferyl alcohol and sinapyl alcohol units. These units are UV active at 209, 259 ppm, 254 ppm and 267-287 ppm. The UV spectra of pure de-lignified lignin (procured from Sigma Aldrich) was compared with a UV spectra for the carboxycellulose nanofibers produced from raw jute fibers.

Figure 18:
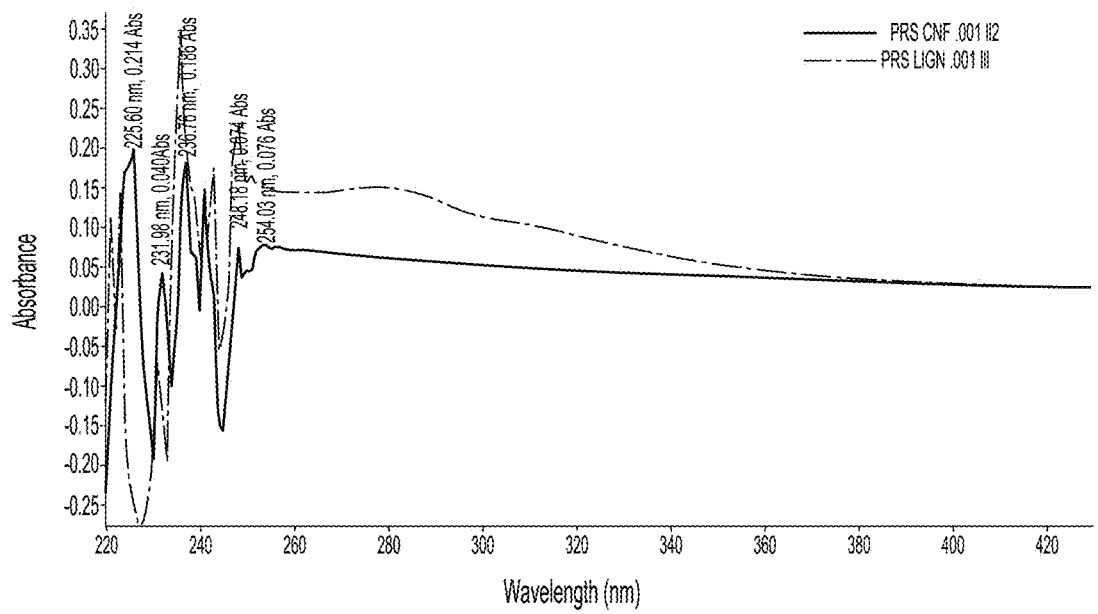
FIG. 18 is an ultraviolet (UV) absorbance spectra of 0.001 wt. % lignin and carboxylated cellulose nanofibers (prepared from jute fiber) processed in accordance with the present disclosure.

As shown in FIG. 18, the UV spectra of carboxycellulose nanofibers (0.001 wt. %) had no absorbance at ~280 nm, which demonstrates the absence of portions of lignin that are acid soluble (the sinapyl alcohol units). The UV spectra also showed some absorbance around 254 and 248 nm, demonstrating the presence of small amounts of coumaryl alcohol and coniferyl alcohol.

Example 12

Raw jute fibers (about 1 gram) were immersed in a beaker containing about 20 ml of 3N NaOH solution. This was allowed to stir at about 25° C. for about 24 hours. The base treated jute fibers were then washed with distilled water until the filtrate became neutral (pH=7-8). The washed jute fibers were then dried in an oven at about 70° C. for about 12 hours. The yield of the treated jute fibers was approximately 75%. About 0.50 grams of base treated jute fiber was added to a 2-neck round bottom flask. About 14 ml concentrated $HNO_3$ (85%) was then added into the beaker under continuous stirring. Then, about 1.96 grams of sodium nitrite was added to the reaction mixture. On addition of sodium nitrite, red fumes were formed. To prevent the red fumes escaping, both mouths of the round bottom flask were covered by stoppers. The reaction was allowed to continue at about 50° C. for about 12 hours. The reaction was quenched by using about 250 ml of distilled water. The product was washed by using distilled water with the help of centrifugation (about 6500 rpm, for about 15 minutes) as follows. After each round of centrifugation, the supernatant were decanted off and the solid part again stirred with the distilled water for the next round of centrifugation. The above step was repeated several times, until the filtrate became neutral. The yield of the above procedure was about 40%. The carboxyl content measured by calcium acetate titration method is 16.9%.

Table 3 below summarizes the reaction conditions, concentration of nitric acid and sodium nitrite to produce nanocellulose: carboxylated/oxidized cellulose nanofibers for Examples 1-11.

TABLE 3

| Source | Reaction condition | Concentrated $HNO_3$ (mmol) | Concentrated $NaNO_2$ (mmol) | Yield (%) | Carboxy content (%) |
|---|---|---|---|---|---|
| Bamboo Cellulose | 50° C./12 hours | 22.2 | 28 | 38 | 21.6 |
| Jute Fiber | 50° C./12 hours | 22.2 | 28 | 30 | 17.1 |
| Jute fiber | 50° C./24 hours | 22.2 | — | 10 | 14.0 |
| 2N NaOH treated Jute fibers | 50° C./12 hours | 22.2 | 28 | 38 | 17.6 |
| 3N NaOH treated Jute fibers | 50° C./12 hours | 22.2 | 28 | 40 | 16.9 |
| 4N NaOH treated Jute fibers | 50° C./12 hours | 22.2 | 28 | 25 | 34.2 |
| 5N NaOH treated Jute fibers | 50° C./12 hours | 22.2 | 28 | 20 | 17.0 |

Example 13

Raw jute fibers and jute fibers treated in accordance with the present disclosure as described above in Example 9 were subjected to thermogravimetric analysis (TGA) and Derivative Thermogravimetric analysis (DTG), and a curve was obtained for each. The resulting curve/graph showed the maximum degradation point during the thermal treatment of the molecule.

Figure 19:
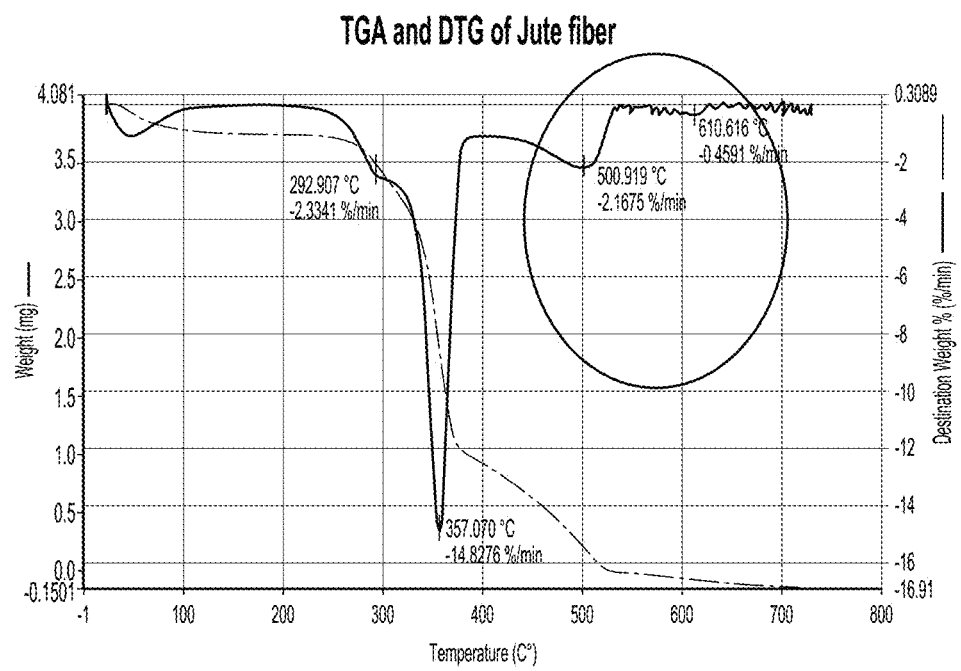
FIG. 19 is a curve generated by thermogravimetric analysis (TGA) and Derivative Thermogravimetric analysis (TGA/DTG) for raw jute fibers.

For raw jute fibers (FIG. 19), the TGA/DTG results showed an initial onset temperature at ~280° C. and a final onset temperature at ~520° C. However, the carboxycellulose nanofibers obtained from jute (FIG. 20) had an onset temperature at ~170° C. and a final temperature at about 481° C. The decrease in onset temperature for the carboxycellulose nanofibers as compared with the raw jute fibers was due to the presence of carboxy group, which had thermally weak bonds.

The DTG of raw jute fiber (FIG. 19) showed a 4-step degradation, with one peak at 292.9° C., corresponding to hemicellulose; a second peak at 357° C. corresponding to anhydroglucose units of cellulose; and a third peak and fourth peak at 500° C. and 610° C., related to the lignin moiety.

The DTG of the carboxycellulose nanofibers (FIG. 20) also showed a 4-step degradation, but at different temperatures. The peaks at 183° C., 241° C. and 322° C. corresponded to cellulose; the peak at 495° C. showed the presence of lignin in the carboxycellulose nanofibers.

Example 14

Additional purifying agents were prepared by one step modification of raw jute fibers and soft spinifex grass following the procedures described above in Example 11.

A Perkin Elmer Spectrum One instrument was used to record FTIR in transmission mode, between 450 and 4,000 cm-1. A total of 6 scans were taken per sample with a resolution of 4 cm-1. The samples were recorded in Attenuated Total Reflectance (ATR) mode by using the solid sample. Samples of raw jute, jute derived purifying agent before and after lead adsorption and uranium adsorption, raw *spinifex*, and *spinifex* derived purifying agent before and after cadmium adsorption were recorded.

The morphological study of purifying agent after metal adsorption was recorded on Zeiss LEO 1550 SFEG-SEM. The SEM consists of an In-Lens Secondary Electron Detector in addition to the standard E-T detector, and a Rutherford Backscatter Electron Detector. It is also equipped with an EDS (energy dispersive X-ray spectroscopy) system using an EDAX detector which provides elemental compositions and X-ray maps of the various phases of the materials examined.

Six key images of surface morphology were taken to observe surface changes in jute derived purifying agent with adsorption. Images were taken after adsorption of both high and low concentrations of lead, cadmium, and uranium. Samples were prepared through oven drying of flocs separated from solution by filtration.

Example 15

First, remediation of high heavy metal concentration with purifying agent was tested. For each trial, 5 mL of purifying agent was added to a clear tube. Solid lead acetate, solid cadmium nitrate, and a 2% solution of uranyl acetate were added directly to the purifying agent suspension. After shaking, coagulation formed visible flocs which settled. Samples from the non-flocculated portion were diluted by a factor of 100, and these samples were preliminarily analyzed using ultraviolet visible spectroscopy.

Second, solutions with lower heavy metal concentrations were remediated. Solutions ranging in metal concentrations from 100 to 5,000 ppm were prepared through serial dilution and were added to the purifying agent to detect remediation at lower levels closer to those present in the environment and test for conformity to adsorption models. For these tests, 2 mL of purifying agent suspension (0.23 wt. % jute derived purifying agent and 0.02 wt. % *spinifex* derived purifying agent separately) were added to 2 mL of heavy metal stock solution produced through preparation of solutions with solid lead acetate, cadmium nitrate and uranyl acetate solution.

Additionally, the effect of pH on adsorption of metals was tested. A constant 10,000 ppm solution of cadmium and lead at pH of 3, 5, 7, 9, and 11 were prepared. Prepared purifying agent suspension was added to these solutions. The concentrations of the metals targeted for removal were calculated before and after in each solution. This allowed us to determine the pH range for optimized efficiency.

Water above the layer of flocculation was initially removed and filtered through a 0.1-micron filter to remove suspension from purifying agent, but not heavy metals ions. The extracted samples required dilution to levels below 100 parts per billion and addition of nitric acid to prepare samples for inductively coupled plasma mass spectroscopy (ICP-MS). Comparing ICP-MS data of concentrations after removal with those calculated theoretically based on mass measurements yielded the removal capacity of the purifying agent at various metal concentrations and pH.

Derivative Thermogravimetric Analysis

Figure 20:
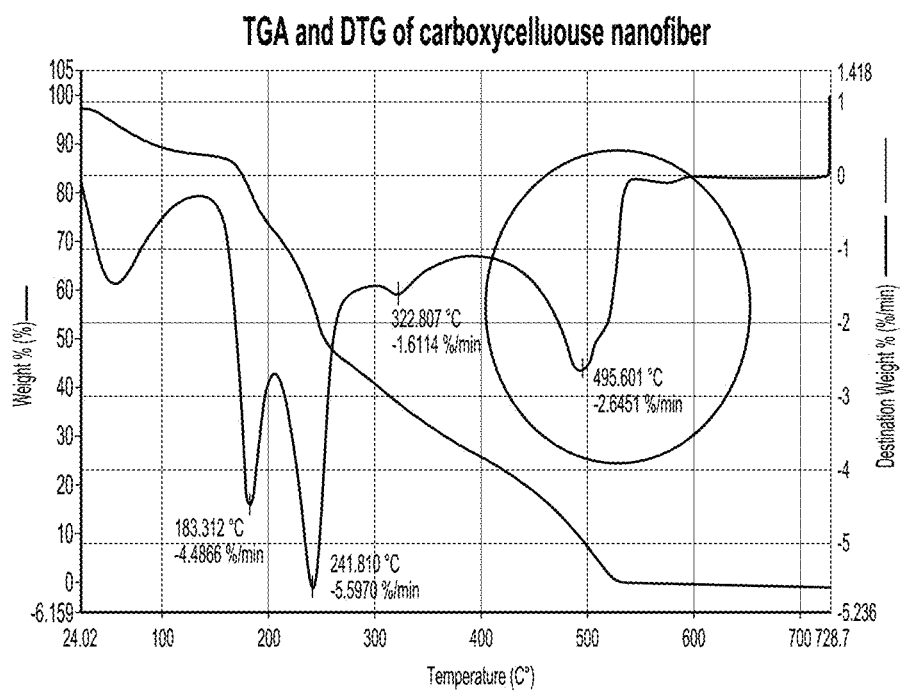
FIG. 20 is a TGA/DTG curve of carboxylated cellulose nanofibers obtained from jute fibers.

The raw jute indicates a principal chemical peak at 359° C. which is associated with crystalline cellulose, and other minor peaks at 300° C. and 469° C. corresponding to hemicellulose and lignin. However, the principal peaks of the jute derived purifying agent are at 182° C. and 240° C. associated with carboxy cellulose and amorphous cellulose respectively. Minor peaks appeared at 325° C. represent the presence of low crystalline region and at 440° C. show the presence of lignin (FIG. 20). The data from DTG clearly indicates that the method disclosed herein has the ability to efficiently defibrillate and carboxylate the jute fiber in one step exemplifying the practical application of the process.

Figure 21:
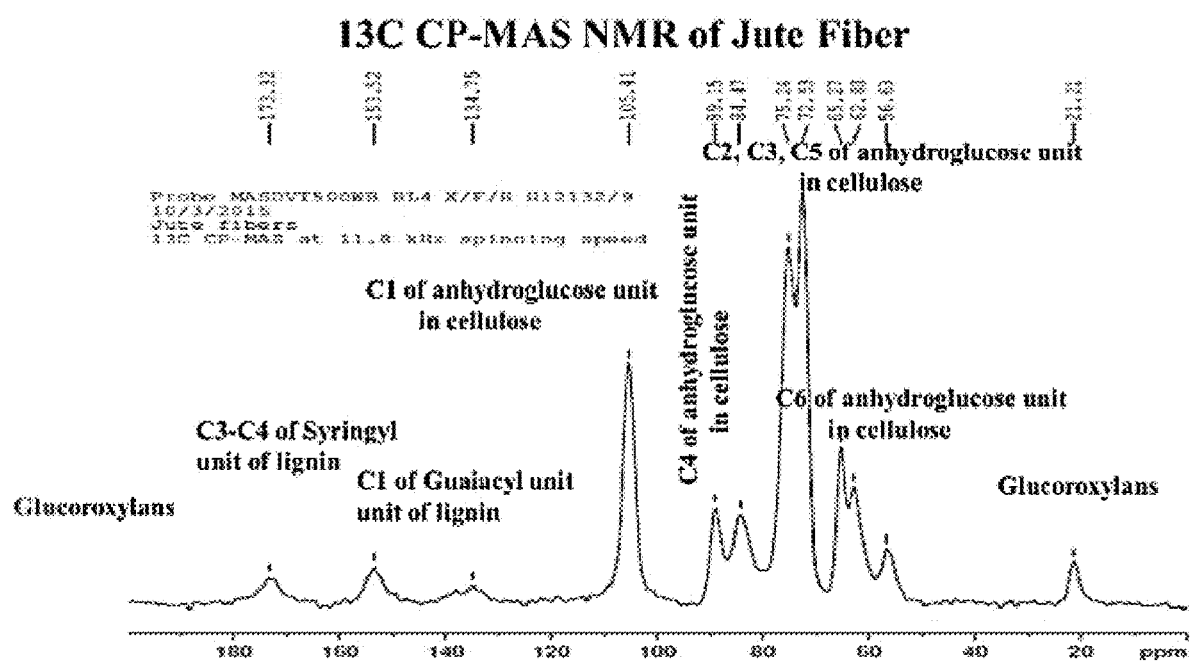
FIG. 21 illustrates a jute fiber $^{13}$C-NMR.
Figure 22:
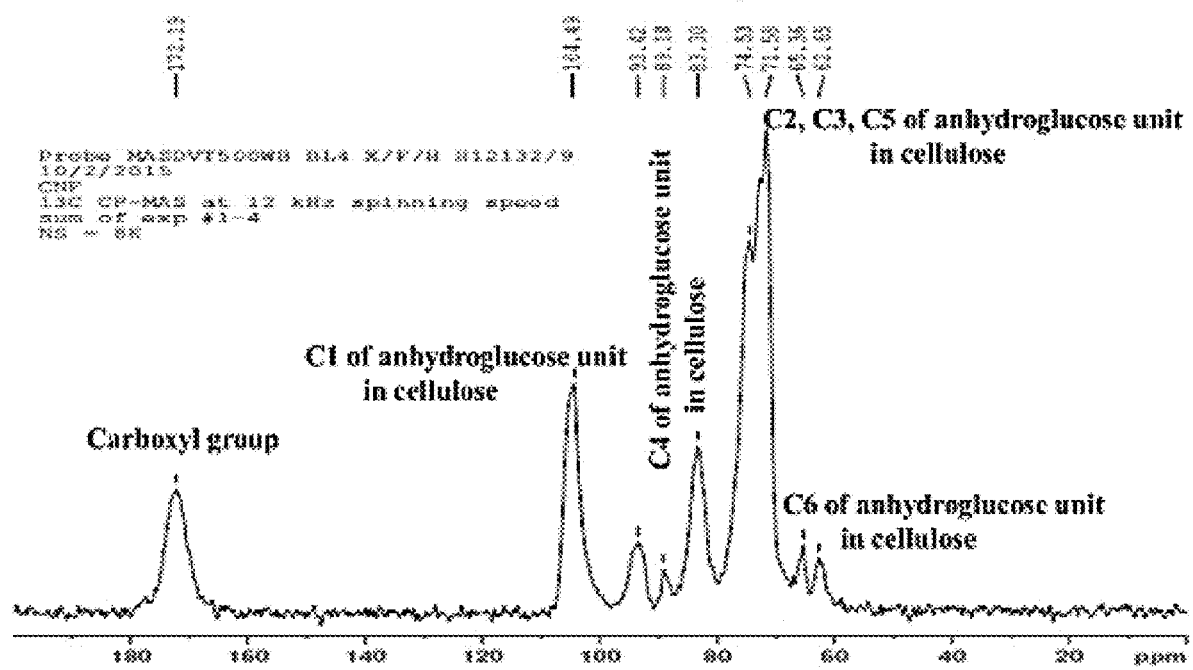
FIG. 22 illustrates a $^{13}$C-NMR jute fiber derived purifying agent.

The solid state $^{13}$C-CPMAS analysis of raw jute fiber demonstrate the presence of hemicellulose indicated by peaks at ~170 and 20 ppm, and lignin represented by peaks at ~139 and 155 ppm. The major peaks of cellulose in jute fibers appeared at ~63 ppm, 70-75 ppm and 104 ppm, representing C6; C2, C3 and C5; and C4 peaks respectively. However, the $^{13}$C CP-MAS spectra of jute derived purifying agent represent the presence of only anhydroglucose units having C6; C2, C3 and C5; and C4 peaks including carboxyl peak at ~179 ppm. The peaks representing C4 and C6 carbons can be used to differentiate the crystalline and amorphous regions in cellulose chains. Here, the major chemical shift is observed for C4 carbon from raw jute fiber, where it was at 84.47 ppm to the carboxy cellulose where it is at 83.30 ppm (FIG. 21 and FIG. 22). This the most prominent shift which indicates the amorphous nature of the purifying agent synthesized through the process.

Figure 23:
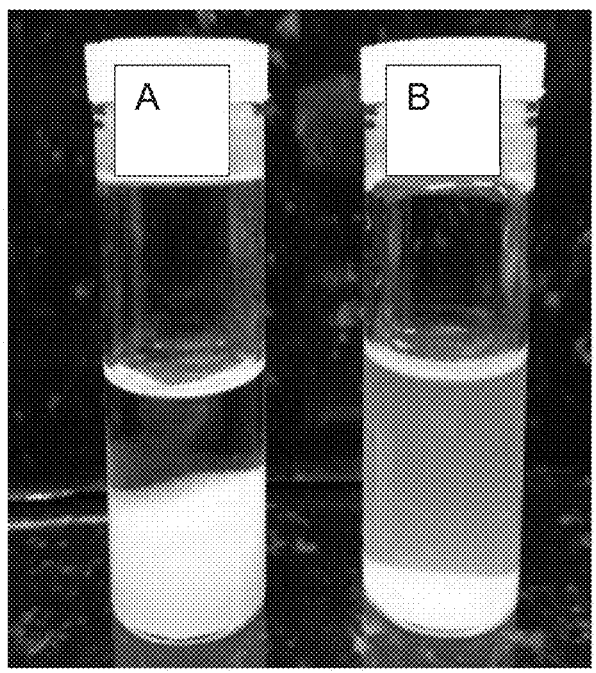
FIG. 23 illustrates photographs depicting two samples (A) after addition of 1 gram of lead acetate in 5 grams of 0.23 wt % jute derived purifying agent and (B) 1 gram of lead acetate in 5 grams of water.
Figure 24:
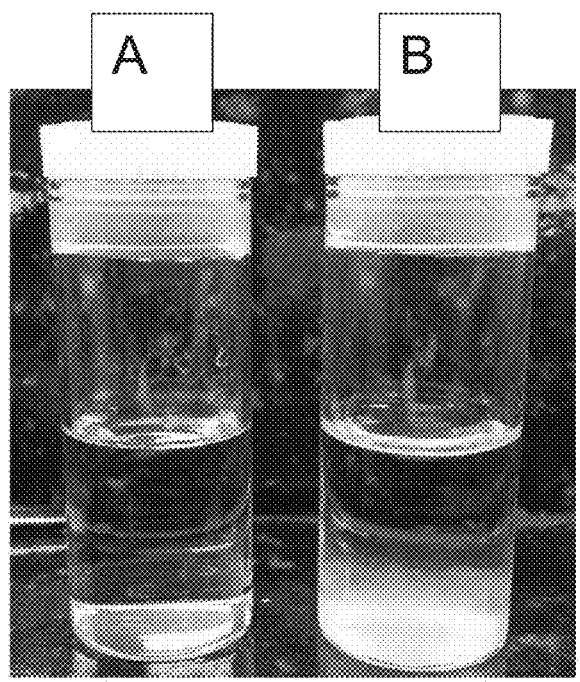
FIG. 24 illustrates photographs depicting two samples (A) 1 gram of cadmium nitrate in 5 grams of water (B) after addition of 1 gram of cadmium nitrate in 5 grams of 0.23 wt % jute derived purifying agent.
Figure 25:
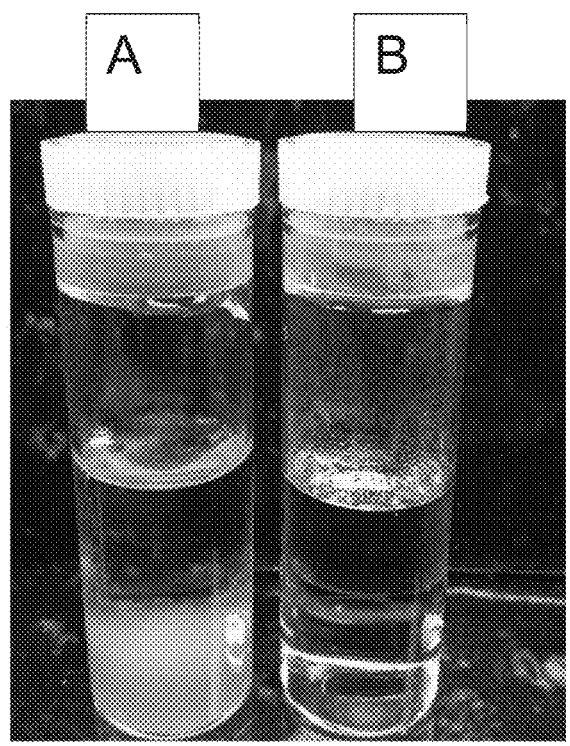
FIG. 25 illustrates photographs depicting two samples (A) after addition of 1 gram of 0.02 wt % uranyl acetate solution (2,120 ppm) in 5 grams of 0.23 wt % jute derived purifying agent; and (B) 1 gram of uranium acetate (2 wt %) in 5 grams of water.

The photographs in FIGS. 23, 24 and 25 clearly depict the efficiency of purifying agent as a coagulant in removing heavy metal ions. On adding metal ions in solid forms or in solution forms, the metal ions immediately coagulated with purifying agent, as presented in FIG. 23(A), FIG. 24(B) and FIG. 25(A).

Comparative photographs of respective metal ions in water, is also shown in FIGS. 23(B), 24(A) and 25(B), differentiated the coagulation with purifying agent.

The coagulation of purifying agent with metal ions occurred over a relatively short time period (less than 5 minutes) at room temperature without any mechanical treatment, such as shaking, from waste water. The supernatant after coagulation was taken for further analysis to measure the remaining amount of metal ions.

Figure 26:
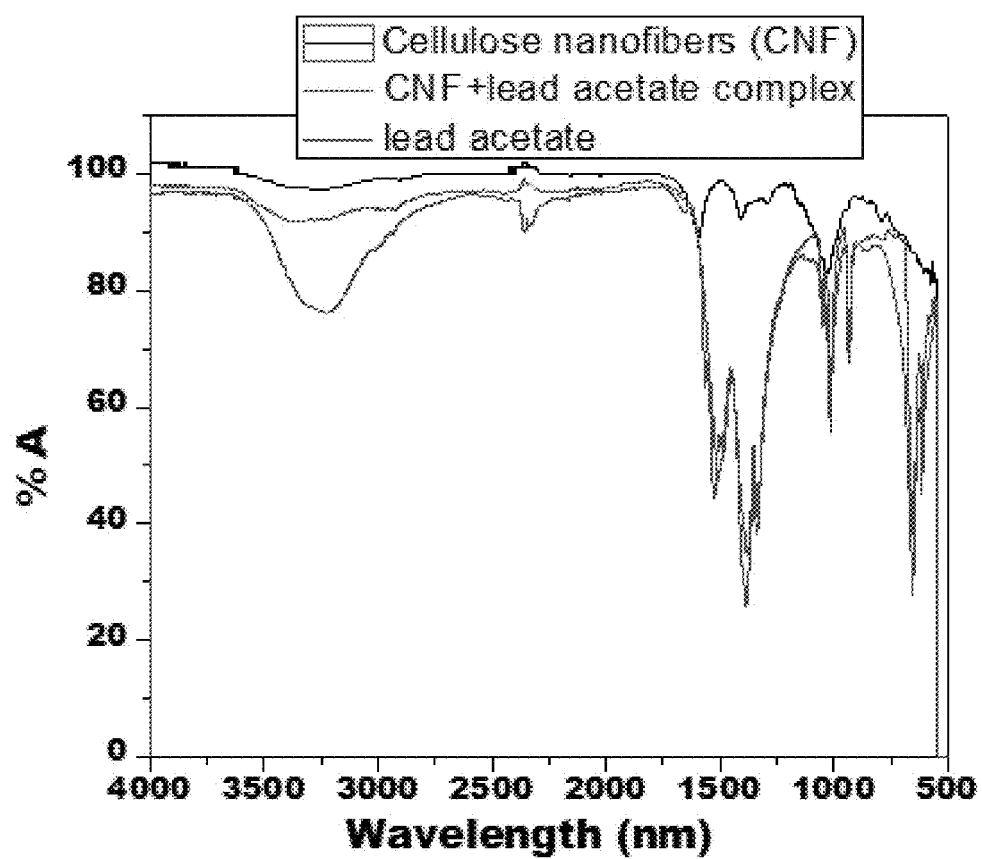
FIG. 26 illustrates FTIR spectra of cellulose nanofibers, cellulose nanofibers (purifying agent)+lead acetate composite after coagulation and lead acetate.

FTIR overlay spectra of purifying agent, lead acetate and purifying agent complex, and lead acetate are shown in FIG. 26. The adsorption efficiency by purifying agent as calculated by using the ICPMS data for lead at high concentrations of lead (up to 29440 ppm) before lead insolubility showed a capacity exceeding 20,000 mg/g, indicating the presence of a 'non-adsorption' based removal mechanism, which was ~86% more efficient than the most effective adsorbent reported in the literature (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces 4, 4283-

4287 (2012)). The high adsorption capacity of purifying agent for lead could be attributed to the unique properties of purifying agent. This important behavior can be attributed to the accessibility of unique fiber structures by metal ions, permitting those ions to enter into the interior space of those fibers (purifying agent) which are assemblies of molecular chains. Hence the sites where those metal ions could enter became the sites of nucleation. As a result, the metal ions could be precipitated out, covering the accessible surface area. FTIR spectra of lead acetate was compared with lead acetate-purifying agent complex to investigate the possible presence of precipitation. The FTIR for lead acetate-purifying agent complex was similar to the spectra of lead acetate.

Figure 27:
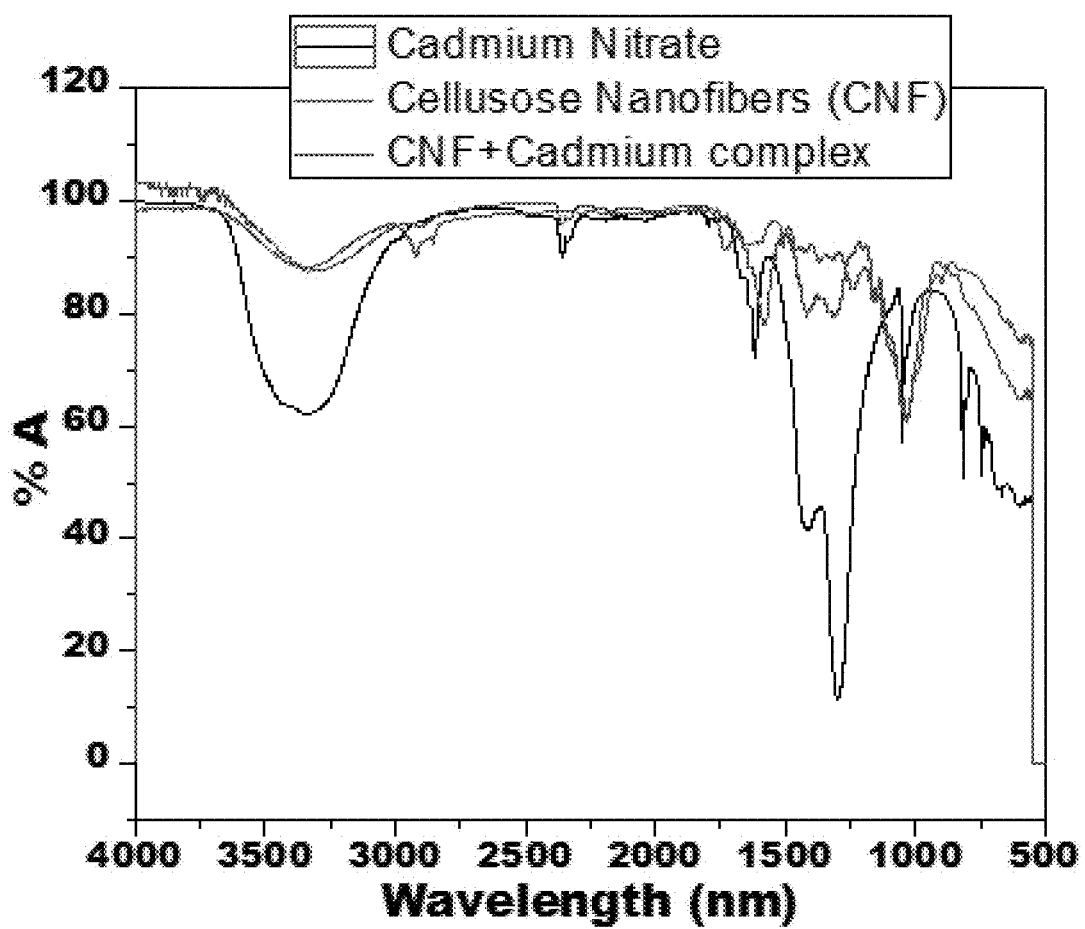
FIG. 27 illustrates FTIR spectra of purifying agent (nanofibers), purifying agent+cadmium nitrate composite after coagulation and cadmium nitrate.

FTIR overlay spectra of purifying agent, cadmium nitrate and purifying agent complex, and cadmium nitrate are shown in FIG. 27.

At low concentrations (up to $4.7 \times 10^4$ ppm) of cadmium, purifying agent demonstrated an adsorption capacity of $1.3 \times 10^4$ mg/g, which is 88% more efficient as compared to the current most effective known adsorbent (Cao, C., Qu, J., Wei, F., Liu, H. & Song, W. Superb adsorption capacity and mechanism of flowerlike magnesium oxide nanostructures for lead and cadmium ions. ACS Appl. Mater. Interfaces, 4, 4283-4287 (2012)). The high adsorption capacity of nanofibers (purifying agent) for lead could be attributed to the unique nature of purifying agent. The structure provided accessibility of metal ions into fibers, confirming the earlier observation.

FTIR spectra of cadmium acetate was compared with cadmium acetate and purifying agent complex. A little difference was observed around the region 1500-1300 cm$^{-1}$, which revealed the complex formation of caboxy groups of purifying agent with Cd$^{2+}$ ions.

Figure 28:
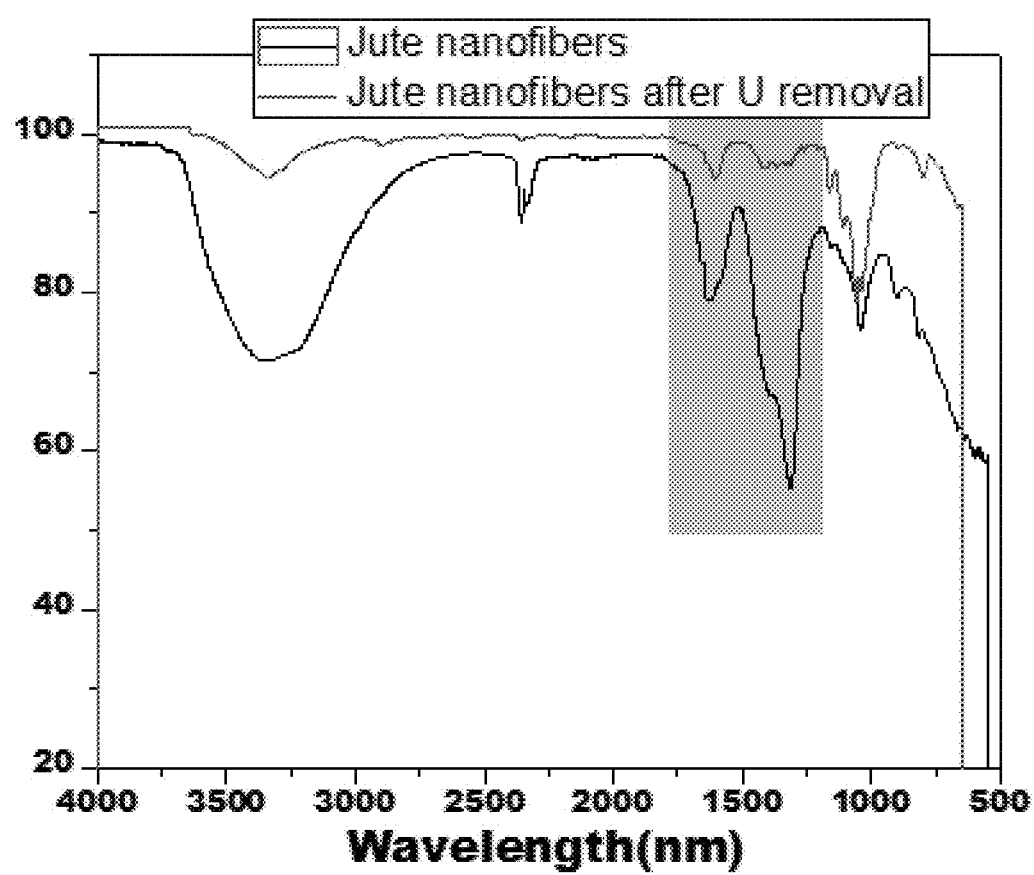
FIG. 28 illustrates FTIR spectra of purifying agent, purifying agent and uranium acetate composite after coagulation.

FTIR overlay spectra of purifying agent, and uranium acetate and purifying agent complex, are shown in FIG. 28. The main difference in both FTIR spectra observed around the region 1500-1300 cm-1 represented the complex formation of purifying agent with UO$_2^{2+}$ ions. Again, the surface contact between purifying agent and metal ions, caused by ionic interactions, resulted in the accumulation of metal ions on the surface. Then, after having reached a critical concentration, nucleation could set-in in the amorphous regions of fibers.

Example 16

Batch Adsorption at High Concentrations

Samples were produced through addition of various masses of lead acetate to 5 grams of 0.23 wt % jute derived purifying agent. The different masses of lead acetate added to the purifying agent were 0.15, 0.25, 0.4, 0.5, 0.6, 0.8, 1.0, and 2.0 grams, respectively.

Example 17

Batch Adsorption at Low Concentrations

Through serial dilution of lead stock solutions, various lead acetate concentrations were produced. Solutions with 150,000; 100,000; 10,000; 5,000; 2,000; 1,000; 900; 750; 600; 500; 400; 250; and 200 ppm of lead (II) were produced and used for static adsorption experiments.

2 ml of the stock lead solution was mixed with 2 ml of a 0.23 wt % purifying agent.

Based on the adsorption rates at the various concentrations of lead adsorption, isotherms could be generated and the maximum adsorption capacity of lead by the purifying agent could be determined through both Langmuir and Freundlich models and the capacity was used to compare with other available adsorbents.

Example 18

Influence of pH on Adsorption (Lead and Cadmium)

A 0.1 M HCl was used to produce 4 solutions with pH values of 2, 3, 4, and 5. For example, 1 ml of 0.1 M solution was added to 9 ml of distilled water to produce 10 ml of HCl solution at pH≈2. This process of serial dilution was repeated using the dilution factor of 10 to produce the four acidic stock solutions. A similar process was repeated starting with a 0.05 M NaOH solution. Only the first dilution was achieved by using a dilution factor of 5 to produce a pH value of about 12. Then a dilution factor of 10 was used to produce solutions with pH values of 11, 10, and 9.

1 ml of 0.23 wt % purifying agent, 1 ml of pH solutions at pH values of 2, 3, 4, 5, 9, 10, 11, or 12, 1 ml of 100,000 ppm Pb solution, and 7 mL of distilled water were mixed to produce 9 samples at pH values of 3, 4, 5, 6, 7, 8, 9, 10, and 11, respectively. The pH=7 solution contained distilled water in place of a pH stock solution. The supernatant above the settled gel-like slurry at the bottom of the tubes was collected and diluted by a factor of 100. The centrifugation was done at 5699×g to make sure all purifying agent containing gel like slurry got settled down. The lead concentration of diluted supernatant was measured in ppm.

Additional studies were conducted to investigate the effects of acidic and basic pH values on the dissolution of lead in solution. A 2 ml of pH stock solutions at pH values of 2, 3, 4, 5, 9, 10, 11, and 12 were mixed with 2 ml of 20,000 ppm lead solution and then added 2 ml of purifying agent (0.23 wt % purifying agent) to test the adsorption capacity of purifying agent with lead (II) in solutions at different pH values.

Figure 29:
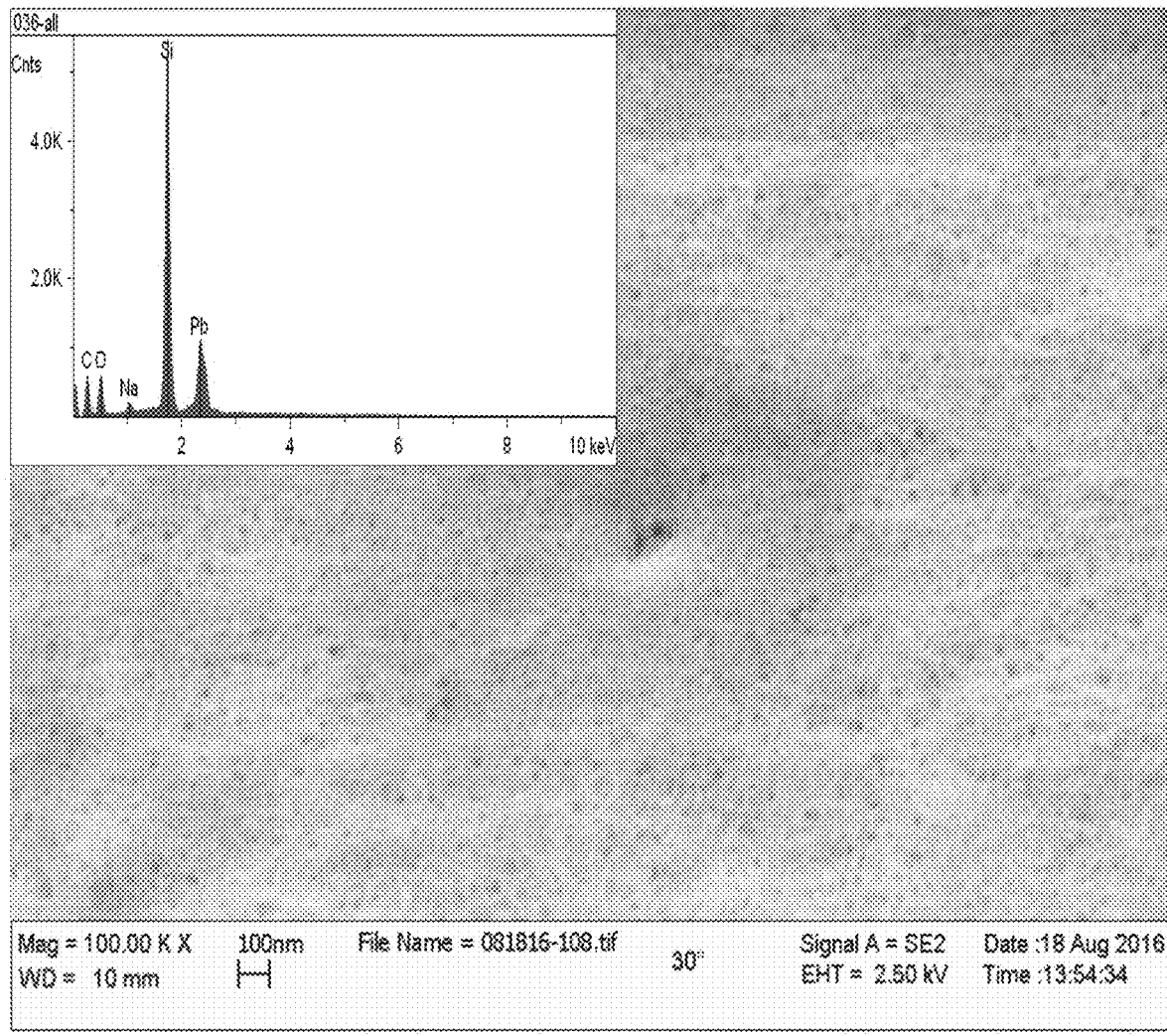
FIG. 29 illustrates an SEM image of coagulant of jute derived purifying agent (2 ml of 0.23 wt. %) with low concentration of lead (2 ml at $7.3 \times 10^3$ ppm lead) at room temperature and pH 7.
Figure 30:
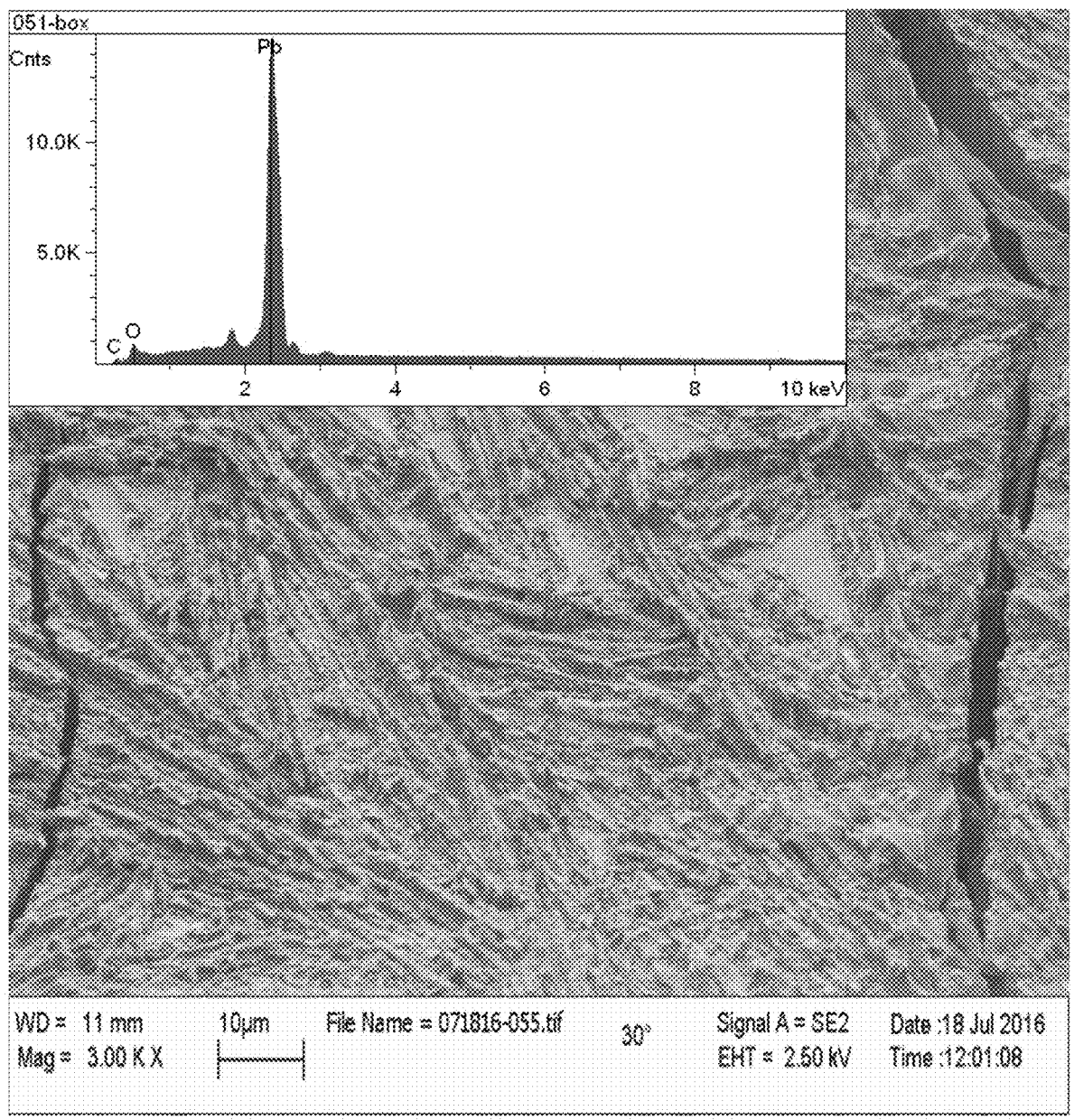
FIG. 30 illustrates an SEM image of coagulant of jute derived purifying agent (2 ml of 0.23 wt %) at a high concentration of lead (2 ml of $2.9 \times 10^4$ ppm lead) at room temperature and pH 7.

Scanning Electron Microscopy of Purifying Agent and Metal Composite after Coagulation SEM images of lead acetate and lead acetate-carboxycellulose nanofiber complex (formed after coagulation) are shown in FIGS. 29 and 30. FIG. 29 was taken at a low concentration ($7.3 \times 10^3$ ppm) of lead acetate and purifying agent (0.23 wt %). In FIG. 29, at low magnification (100 nm), the clusters of fine fibers (~200-300 nm measured by TEM) are clearly visible. The white cloudy appearance on the fibers was deposited lead ion. The EDAX graph of the image is shown in insight left, which represents the presence of carboxynanofibers (purifying agent) (represented by Carbon (C), Oxygen (O) and Sodium (Na) peaks) and lead metal ions (represented by lead (Pb peak).

FIG. 30 was taken at a high concentration of lead acetate ($9.5 \times 10^3$ ppm) and 0.23 wt % purifying agent. Sheets of precipitated lead acetate salt, most probably formed on the surface of purifying agent could be observed. The EDAX graph of the image is demonstrated in insight left, representing the presence of nanofibers (purifying agent) (represent by Carbon (C), Oxygen (O) and Sodium (Na) peaks) and lead metal ions (represent by lead (Pb peak). The peak of lead in EDAX of FIG. 30 was larger when compared with the peak of lead in EDAX of FIG. 29, which clearly showed that at low concentrations lead was embedded into nanofibers (purifying agent) but at high concentration it was also precipitated out on nanofibers.

Figure 31:
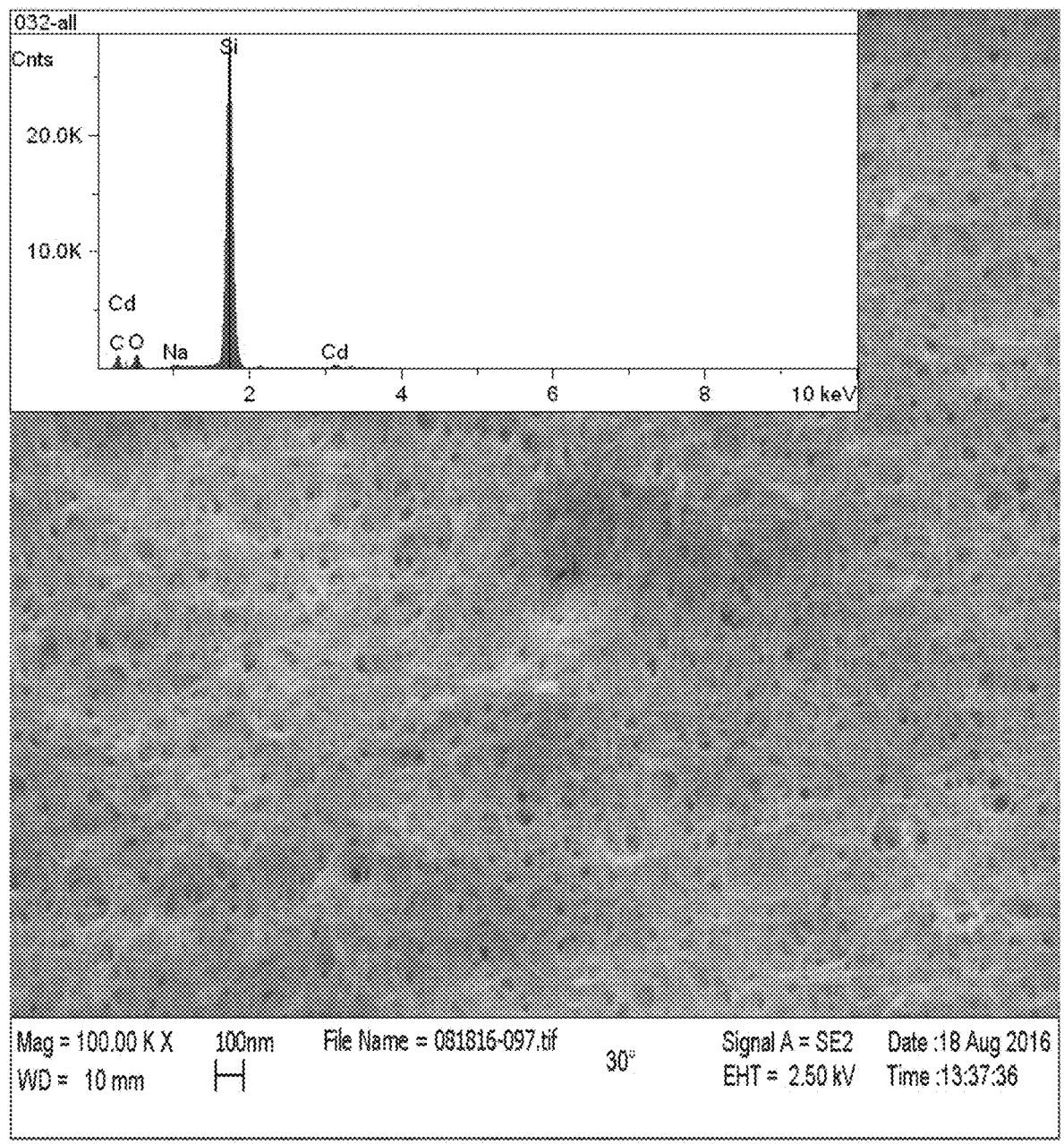
FIG. 31 illustrates an SEM image of coagulant of *spinifex* derived purifying agent (2 ml of 0.02 wt %) at low concentration of cadmium (2 ml of $9.5 \times 10^3$ ppm cadmium) at room temperature and pH=7.
Figure 32:
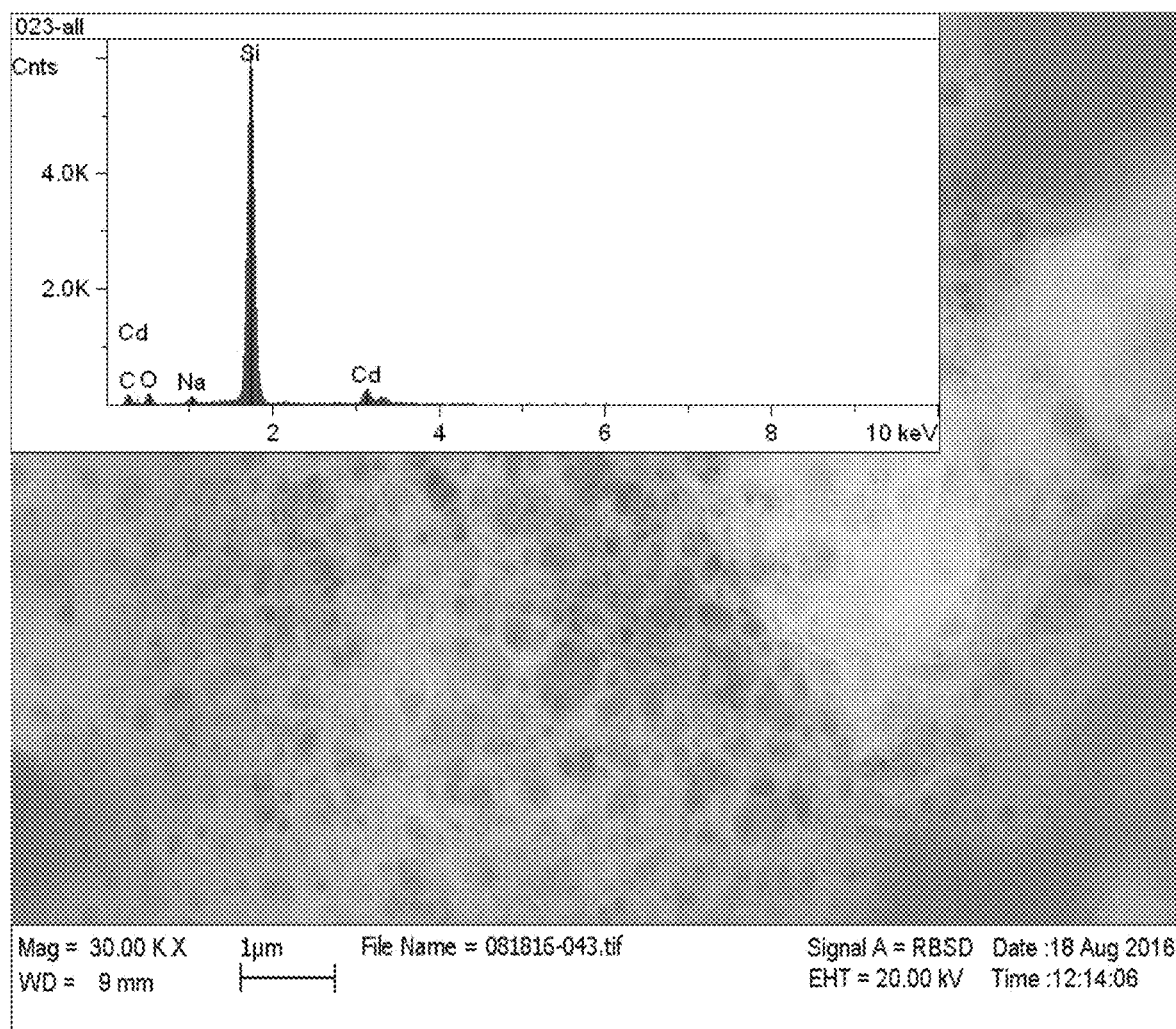
FIG. 32 illustrates an SEM image of coagulant of *spinifex* derived purifying agent (2 ml of 0.02 wt %) with high concentration of cadmium (2 ml of $\sim 2.3 \times 10^4$ ppm Cd) at room temperature and pH 7.
Figure 33:
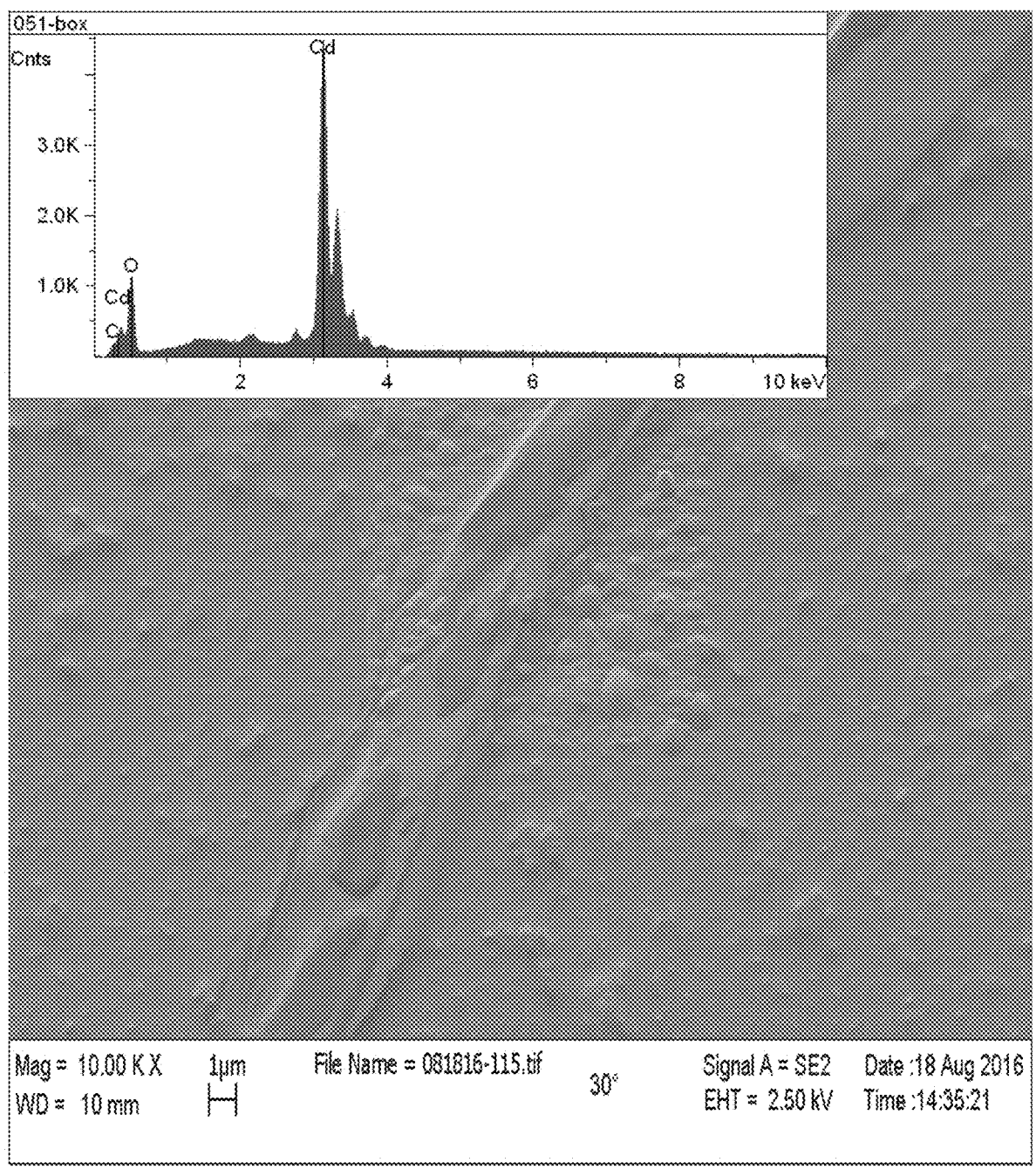
FIG. 33 illustrates an SEM image of coagulant of *spinifex* derived purifying agent (2 ml of 0.02 wt %) with high concentration of cadmium ($9.5 \times 10^4$ ppm of 2 ml) at room temperature and pH 7.

FIG. 31 shows the SEM image of coagulant (purifying agent) in the presence of cadmium at a low concentration ($9.5 \times 10^3$ ppm). The agglomerated purifying agent and the white shadow on the nanofibers (purifying agent) indicated a deposition of cadmium on the *spinifex* fibers. The EDAX graph of the image represented the presence of purifying agent in the form of nanofibers (as represented by Carbon (C), Oxygen (O) and Sodium (Na) peaks) and cadmium metal ions (as represented by Cd, a small peak). In FIG. 32, the SEM image of *spinifex* nanofiber (purifying agent) composite at high concentration ($2.3 \times 10^4$ ppm) showed a predominant white shadow on the fibers, while in FIG. 32, the SEM image of coagulant clouds appeared on addition of $\sim 9.5 \times 10^4$ ppm cadmium (the highest concentration of cadmium tested) with 0.23 wt % purifying agent, showed the precipitation of cadmium salt. The EDAX graphs for FIG. 32 and FIG. 33 are shown in insight left of the images. Both EDAX graphs represented the presence of *spinifex* nanofiber, purifying agent (as represented by Carbon (C), Oxygen (O) and Sodium (Na) peaks) and cadmium metal ion (as represented by the Cd peak). However, the peak of Cd in the EDAX graph of FIG. 33 was larger than the EDAX graph of FIG. 31 and FIG. 32, which depicted the presence of high concentration of Cd on the fibers surface, probably due to precipitation.

Figure 34:
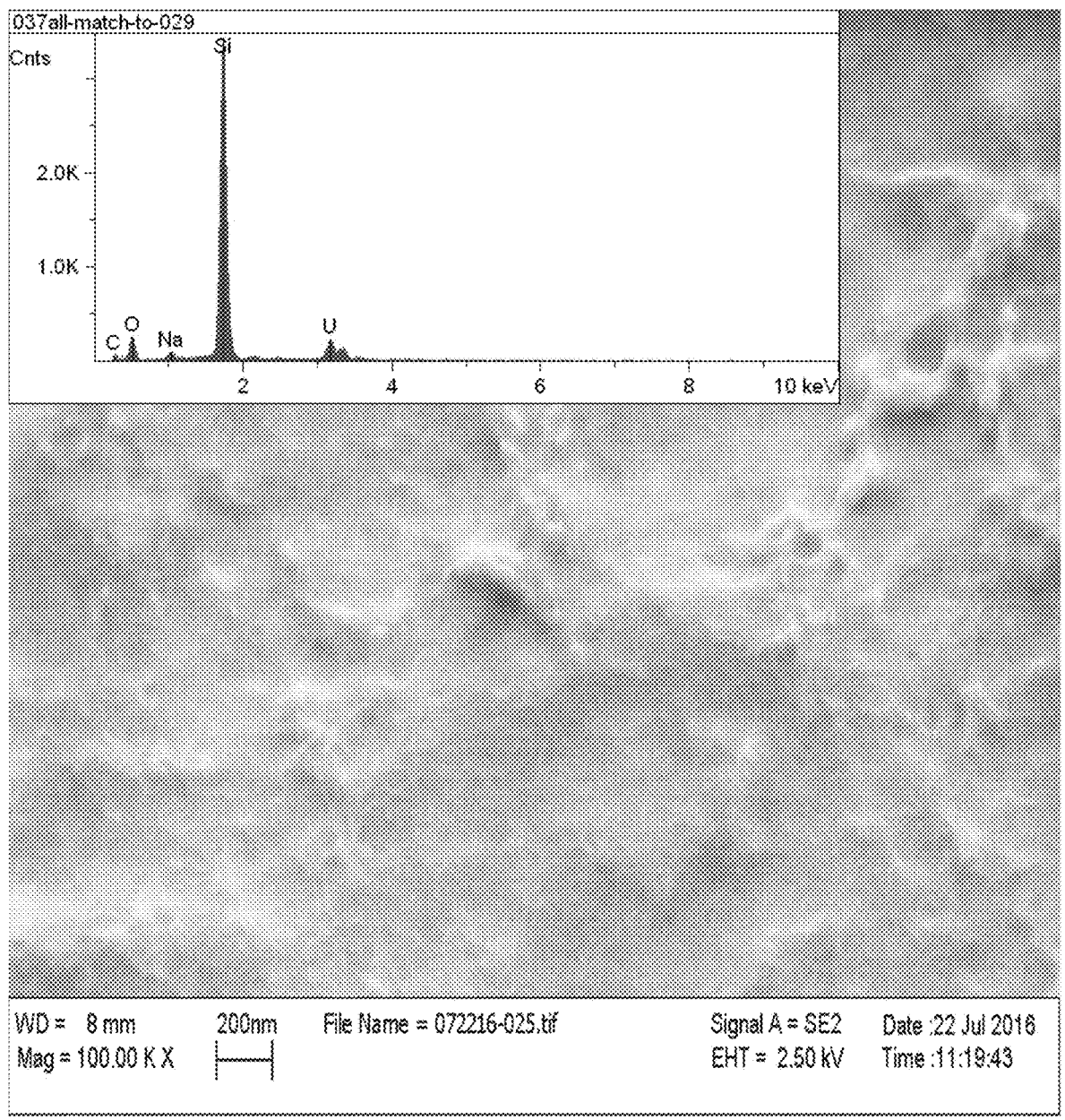
FIG. 34 illustrates an SEM image of coagulant of jute derived purifying agent (2 ml of 0.23 wt %) with low concentration of uranium acetate (2 ml of 840 ppm)
Figure 35:
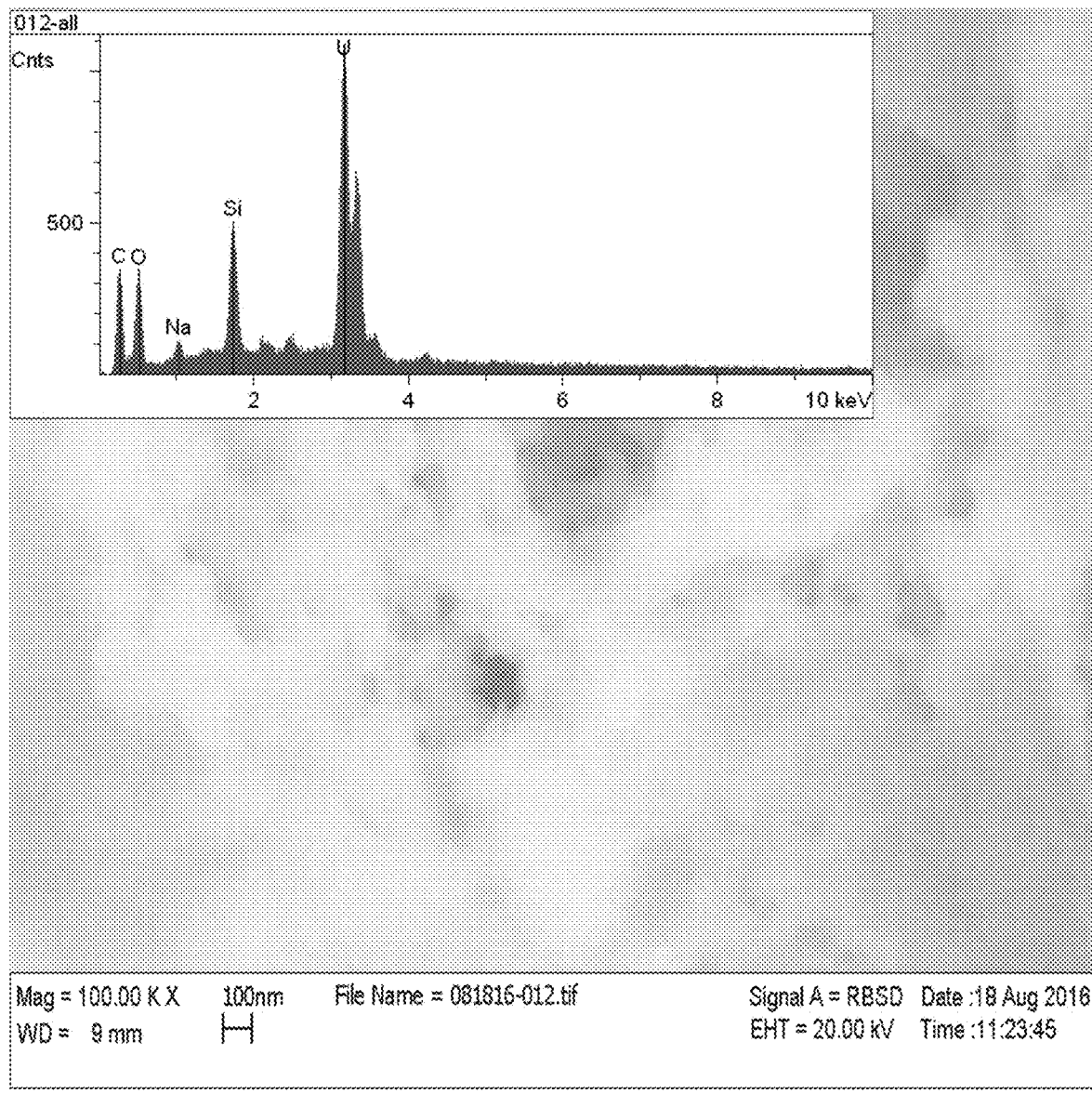
FIG. 35 illustrates an SEM image of composite of jute derived purifying agent (2 ml of 0.23 wt %) with high concentration of uranium acetate (2 ml of $2.4 \times 10^3$ ppm)

FIG. 34 shows the SEM image of coagulant/purifying agent in the forms of jute nanofibers with low concentration of uranium metal ion (840 ppm) depicting the appearance of clusters of nanofibers as well as white shadows on the surface, suggesting the deposition of uranium metal ions on the fiber surface. The EDAX graph of image showed the presence of carboxycellulose nanofibers (as represented by Carbon (C), Oxygen (O) and Sodium (Na)) and uranium metal ion (as represented by the U peak). FIG. 35 shows a SEM image of coagulation of purifying agent in the form of nanofibers at a high concentration ($2.4 \times 10^3$ ppm) of uranium, indicating that metal ions can not only be adsorbed on the surface but also be entered into the spacing in the amorphous regions of nanofibers. The EDAX graph of image indicated the presence of purifying agent in the form of nanofibers (as represented by Carbon (C), Oxygen (O) and Sodium (Na)) and uranium metal ion (as represented by the U peak). The peak of uranium in EDAX graph of FIG. 35 was higher than that of FIG. 34, which could be attributed to high concentrations of uranium on the fiber surface, due probably due to precipitation.

UV—Visible Spectroscopy

The UV-visible spectroscopy of lead acetate suspension in distilled water and the lead acetate at various ppm concentrations with purifying agent were recorded by using the CARY-300 UV-visible spectroscopy instrument.

Figure 36:
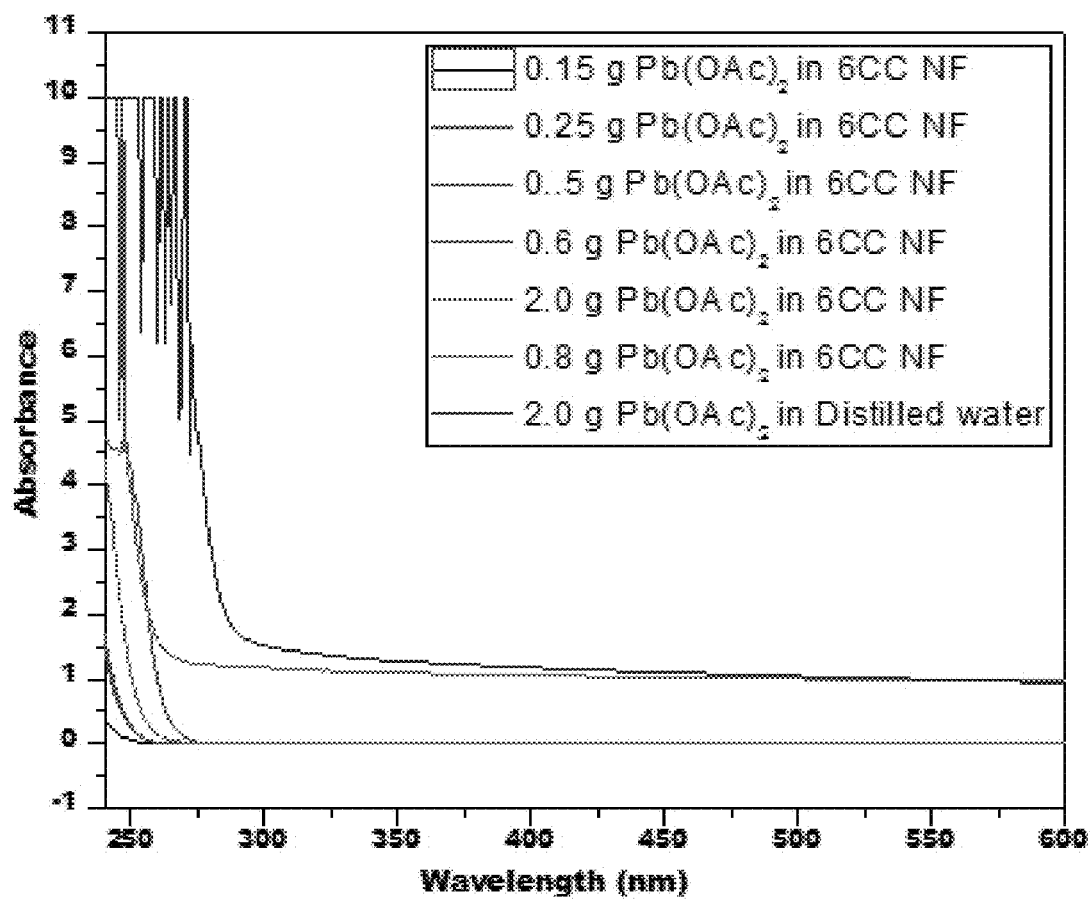
FIG. 36 illustrates an ultraviolet visible spectrum of lead acetate in distilled water and samples from the non-coagulated portion of samples (supernatant) containing various solid additions of lead acetate tetrahydrate to 5 ml of 0.23 wt % jute derived purifying agent (samples were diluted by a factor of one hundred before analysis)

The lead acetate in aqueous suspension (i.e. 2 grams in 5 grams distilled water) did not show any specific peak in the UV-visible region but had an absorbance in the region (250-300 nm). Moreover, the absorbance was reduced with decreasing metal ion concentration, as shown in FIG. 36.

According to reported data, the solubility of lead acetate is 44.31 g/100 ml at 20° C. Therefore, the maximum concentration, we have tested here with newly developed purifying agent (5 grams, 0.23 wt % fiber concentration) was 2 grams of lead acetate in 2 ml distilled water.

Figure 37:
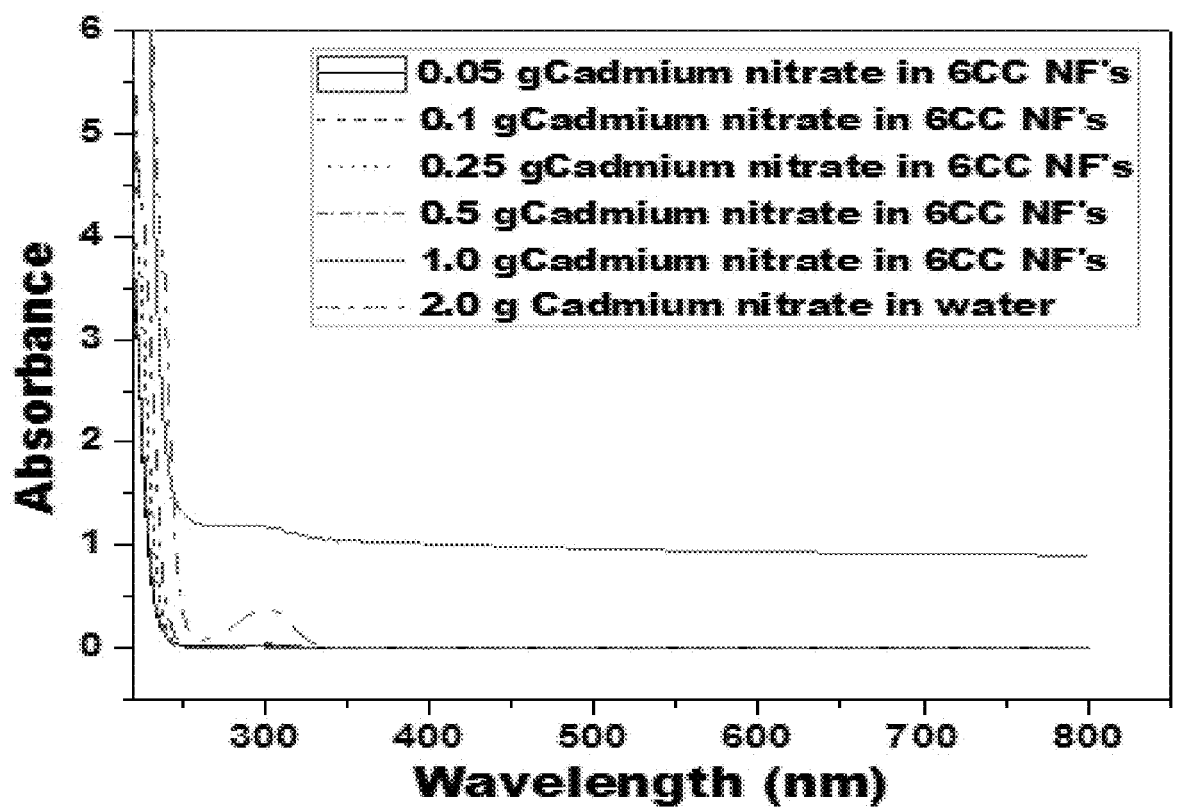
FIG. 37 illustrates an ultraviolet visible spectrum of samples cadmium nitrate in distilled water from the non-coagulated portion of samples (supernatant) containing various solid additions of cadmium nitrate tetrahydrate to 5 ml of 0.02 wt % soft *spinifex* derived purifying agent (samples were diluted by a factor of one hundred before analysis)
Figure 38:
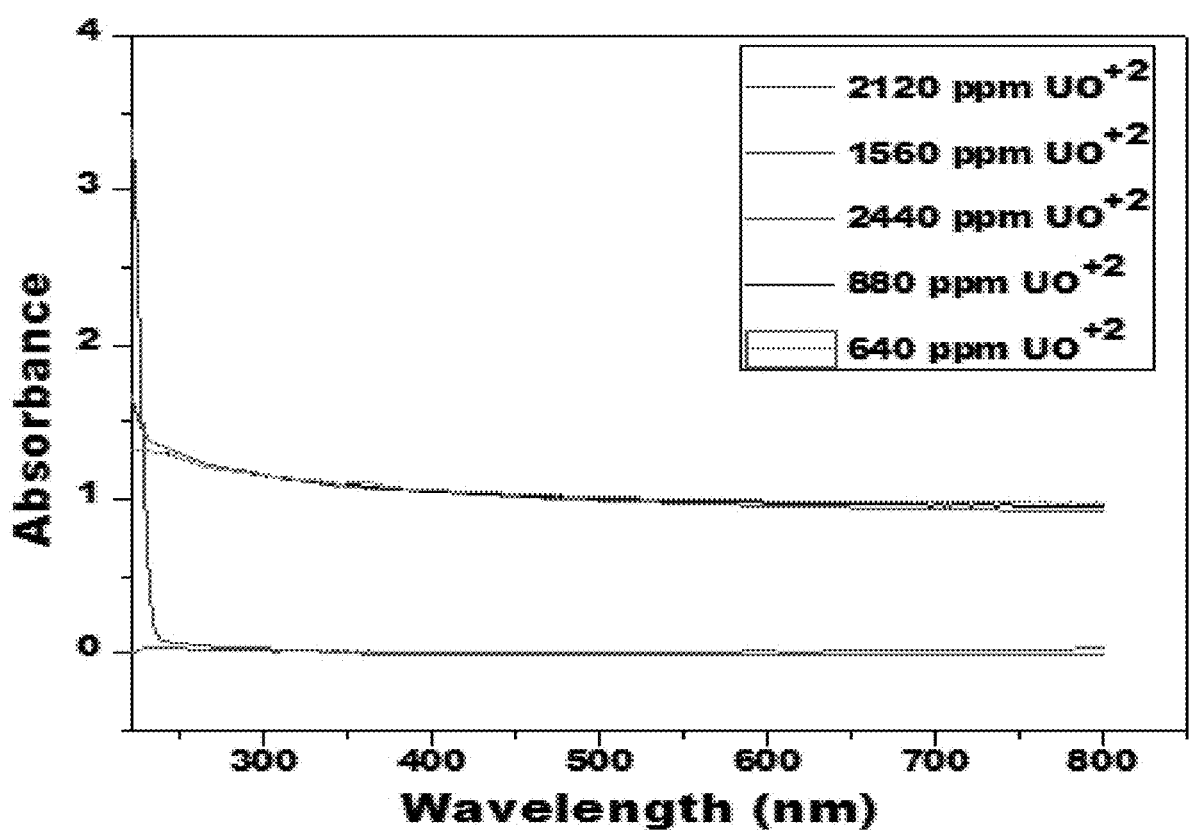
FIG. 38 illustrates an ultraviolet visible spectrum of samples uranium acetate in distilled water and the samples from the non-coagulated portion (supernatant) of samples containing various solid additions of uranium acetate tetrahydrate to 5 ml of 0.23 wt % jute derived purifying agent (samples were diluted by a factor of one hundred before analysis)
Figure 39:
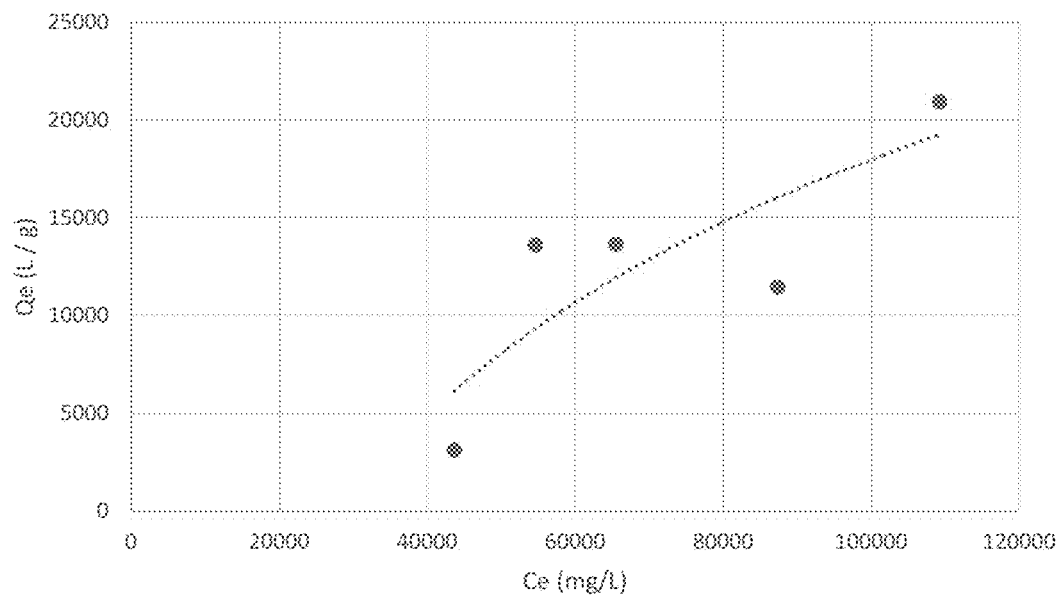
FIG. 39 illustrates a calculation of lead removal by jute derived purifying agent (2 ml of 0.23 wt %) at high concentration ($4.3 \times 10^4$ ppm to $1. \times 10^4$ ppm) of lead (2 ml) based on ICPMS data. (Qe=amount of metal ion being adsorbed by the adsorbent at equilibrium (mg/g); Ce=concentration of metal ion in solution at equilibrium (mg/L)
Figure 40:
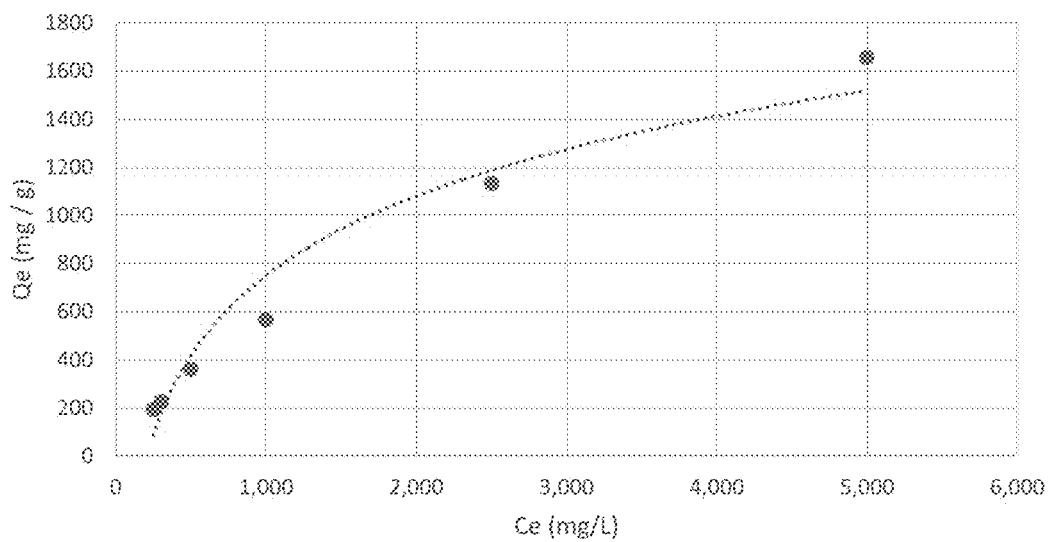
FIG. 40 illustrates a calculation of lead removal by jute derived purifying agent (2 ml of 0.23 wt %) at low concentration (250 ppm to $5 \times 10^3$ ppm) of lead (2 ml) based on ICPMS data (Qe=amount of metal ion adsorbed on the adsorbent at equilibrium (mg/g); Ce=concentration of metal ions in solution at equilibrium (mg/L)

FIGS. 37 and 38 show UV spectra measured for the upper suspension, separately taken after coagulation of newly developed purifying agent with cadmium nitrate and uranium acetate. Cadmium nitrate and uranium acetate solution in water showed UV absorption but had no specific peaks. However, the upper suspensions obtained after coagulation of carboxycellulose nanofibers and metal ions (cadmium and uranium), had almost no absorption (FIGS. 37 and 38), suggesting the efficiency of nanofibers in removing metal ions.

Maximum adsorption capacity of carboxylated nanofibers for lead, cadmium and uranium (FIG. 39, FIG. 40, FIG. 41, FIG. 43, FIG. 44 and FIG. 46) was calculated using a Langmuir isotherm model at equilibrium condition. This model is based on a monolayer adsorption on the active site of adsorbent, which is expressed in equation (ii) below.

$$\frac{Ce}{Qe} = \frac{Ce}{Qm} + \frac{1}{Qmb} \qquad \text{(ii)}$$

Where Ce is the equilibrium concentration of carboxylated nanofibers; Qe is the adsorption capacity of metal ions at equilibrium; Qm and Qmb are the Langmuir constants which can be calculated from the intercept and slope of the linear plot based on Ce/Qe versus Ce.

Figure 41:
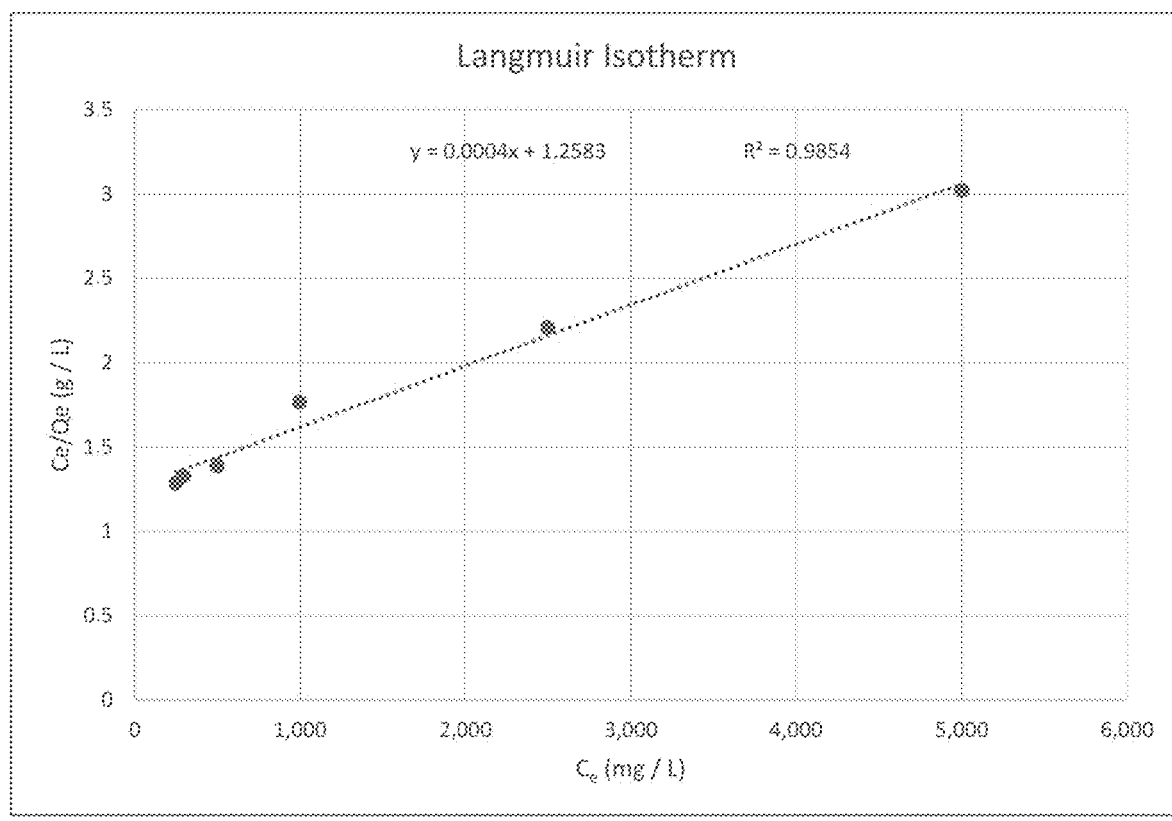
FIG. 41 illustrates a calculation of Langmuir isotherm on lead adsorption (2 ml of 250 ppm to $\times 10^3$ ppm) by jute derived purifying agent (2 ml of 0.23 wt %) at room temperature and pH=7, based on ICPMS data.

At low concentrations of lead (250 to $5 \times 10^3$ ppm) the jute purifying agent, after removing outlier points, conformed to the Langmuir isotherm (FIG. 41). The $R^2$ value of the purifying agent was 0.9854, indicating a clear conformity with the model. Based on the Langmuir model, the inverse of the coefficient of the least squares regression line of concentration over adsorption capacity is equal to the adsorption capacity of the nanofiber (newly developed purifying agent). Thus, the maximum adsorption capacity of the purifying agent is 2,770 mg/g as derived from the LSRL coefficient of $3.61 \times 10^{-4}$ in the Langmuir model However, analysis of adsorption capacity of the *spinifex* nanofibers (purifying agent) at high lead concentrations ($4.3 \times 10^4$ ppm to $1.0 \times 10^4$ ppm) before lead insolubility indicated a capacity exceeding 20,000 mg/g, exhibiting the presence of a non-adsorption based removal mechanism. The high lead concentration demonstrated an $R^2$ below 0.5, showed nonconformity to the Langmuir model. The removal of lead in this concentration region could possibly be attributed to nucleation on the purifying agent surface.

Figure 42:
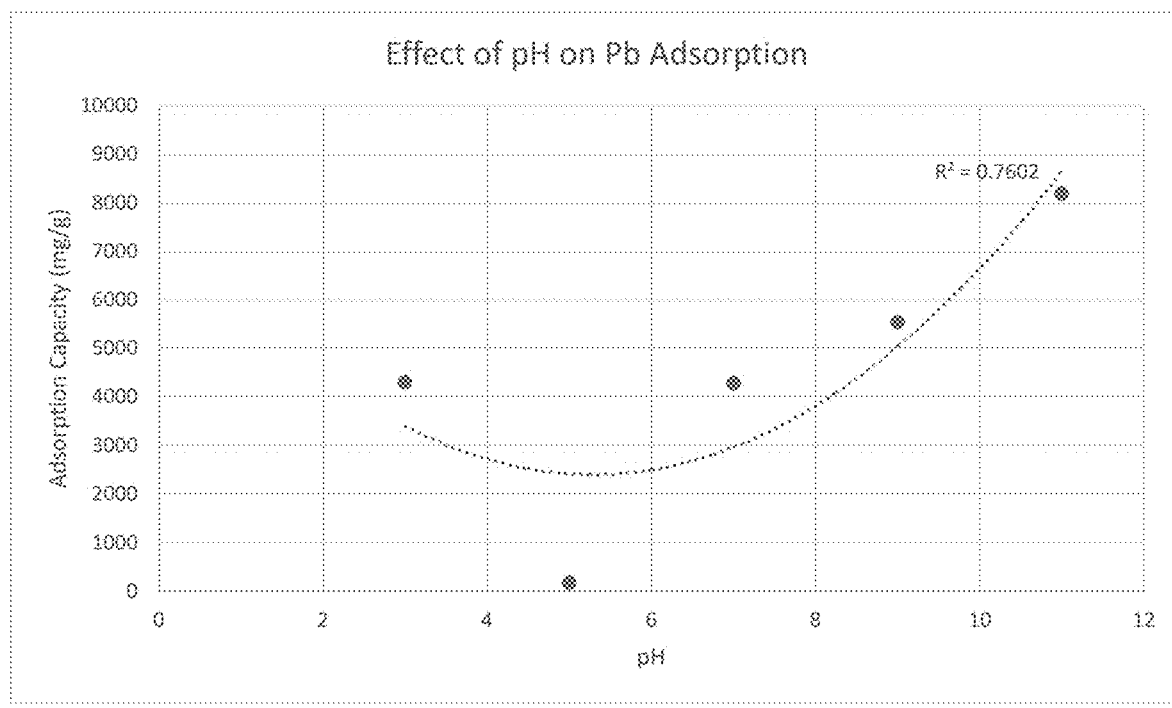
FIG. 42 illustrates a calculation of lead removal (2 ml of $2.5 \times 10^3$ ppm) by jute derived purifying agent (2 ml of 0.23 wt %) at different pH values based on ICPMS data.
Figure 43:
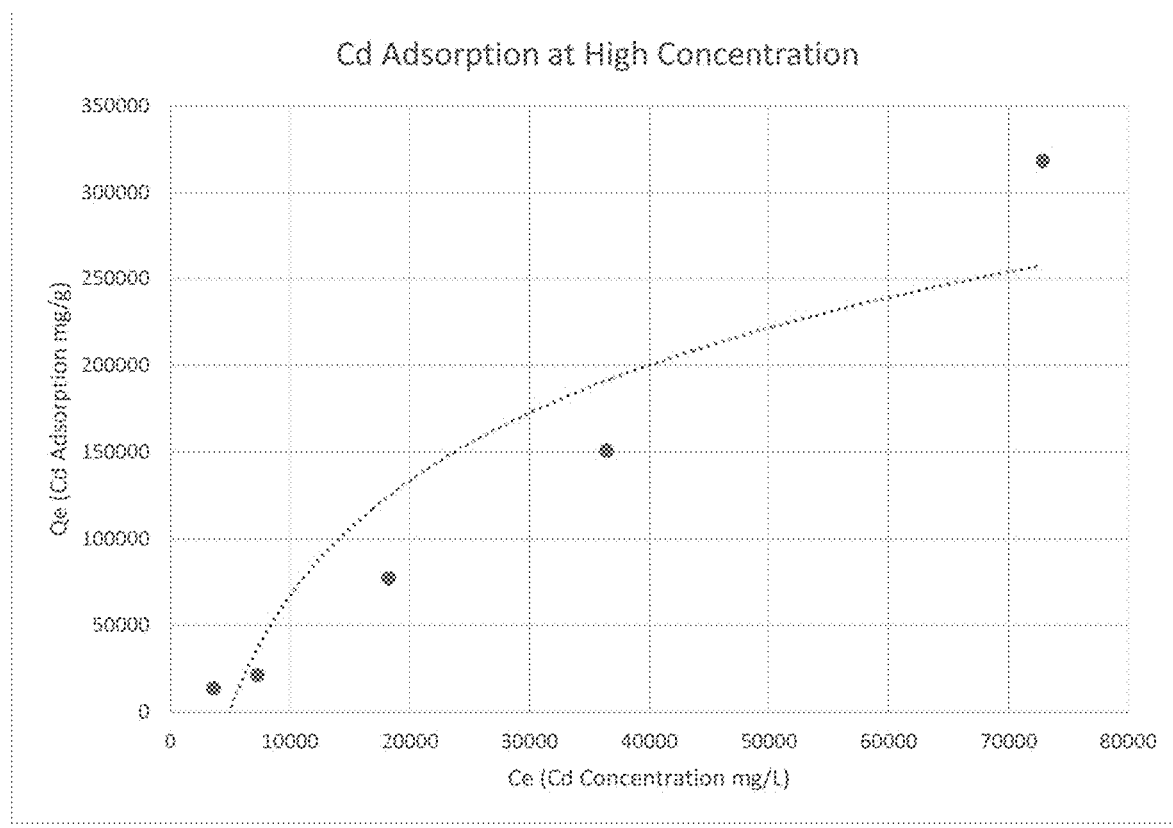
FIG. 43 illustrates calculations of cadmium removal by using *spinifex* derived purifying agent (2 ml of 0.02 wt %) at high concentration (2 ml of $3.6 \times 10^3$ ppm to $7.2 \times 10^4$ ppm) of cadmium at room temperature and pH=7 based on ICPMS data.

The optimal pH range for adsorption is slightly basic, but points toward realistic applications (FIG. 42). Additives to water, such as lime, could enhance the efficiency of the lead adsorption. The jute nanofibers could clearly be adsorbed effectively at moderate pH values (close to seven), indicating applications, especially in neutral conditions without the need for additives.

TABLE 4

Comparative Adsorption Capacity for developed carboxycellulose nanofibers and current adsorbent for lead removal.

| Adsorbent | Adsorption Capacity (mg/g) | Reference |
|---|---|---|
| Jute One Step Modified Carboxy Cellulose | 2,770 | This Disclosure |
| Flower - like Magnesium Oxide | 1,980 | (1) |
| CMC - g - PAA | 990 | (2) |
| CMC - g - PAA/5% APT | 952 | (2) |
| CMC - g - PAA/20% APT | 847 | (2) |
| Hybrid Sorbent HMO - 001 | 395 | (3) |
| Magnesium Silicate Hollow Nanospheres | 300 | (4) |
| Thiol Modified Carboxy - Cellulose | 131 | (5) |
| Ethylenediamine Modified Cellulose | 50.0 | (6) |
| Diethylenetriamine Bacterial Cellulose | 31.41 | (7) |

(Reference Numbers are to Articles Cited at the End of the Specification, Prior to the Claims)

The newly developed purifying agent/coagulant/flocculant/adsorbent are ~40% more efficient than the most effective adsorbent reported in the literature[1] (again, reference numbers are to articles cited at the end of the specification, prior to the claims) and 3 times more efficient than the most effective cellulose-based adsorbent[2] Moreover, the conservative remediation capacity of purifying agent/coagulant/flocculant/adsorbent (at high concentrations of lead), where it does not follow the Langmuir model, is found to be 6 to 8 times more efficient than the currently known most efficient absorbent.

The purifying agent/coagulant/flocculant/adsorbent are also comparatively sustainable. Indeed, various sustainably remediating methods for lead have been developed. Notably, activated charcoal with lead adsorption capacity can be extracted from numerous plant materials[8] such as sugar cane bagasse[9], shells of nuts[10-13], and fruit components[14-15]. However, the sustainable plant derivatives studied have adsorption close to 50 mg/g. However, previous cellulose-based membranes studied are not cost effective and require extensive energy usage. Furthermore, their efficiency is lower than the coagulant synthesized here. Thus, the purifying agent/coagulant/flocculant/adsorbent discussed here have produced the best optimized sustainability and efficiency and have provided the most applicable method of lead remediation.

Figure 44:
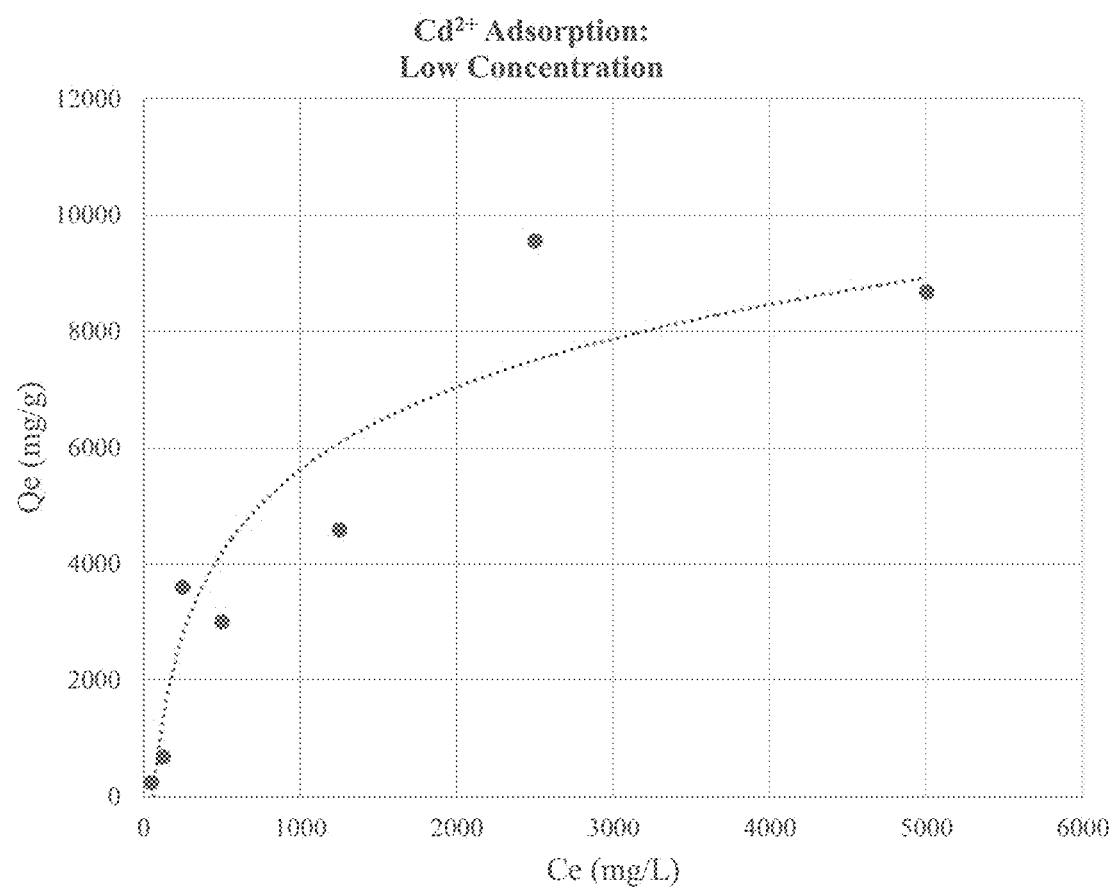
FIG. 44 illustrates calculations of cadmium removal by using *spinifex* derived purifying agent (2 ml of 0.02 wt %) at low concentration (2 ml of 250 ppm to 5000 ppm) of cadmium at room temperature and pH=7, based on ICPMS data.
Figure 46:
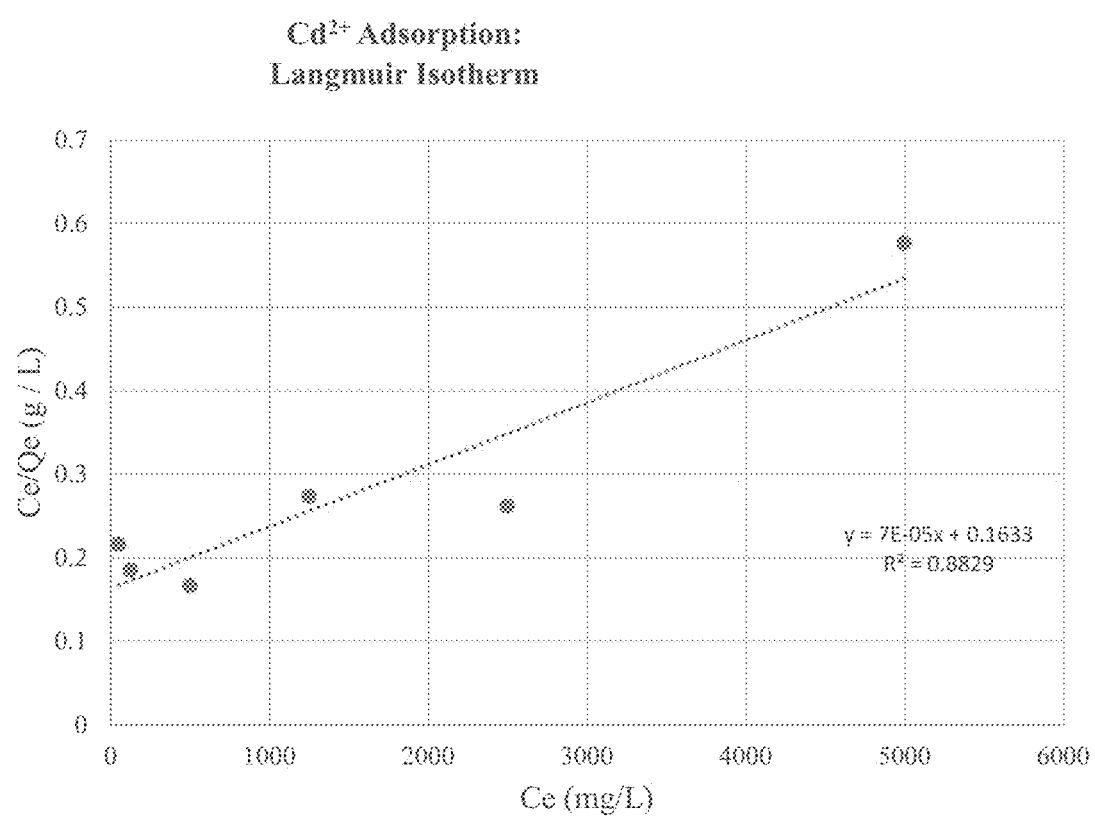
FIG. 46 illustrates a calculation of Langmuir isotherm on cadmium adsorption (2 ml of 250 ppm to 5000 ppm) by *spinifex* derived purifying agent (2 ml of 0.02 wt %) at room temperature and pH=7, based on ICPMS data.

At low concentrations (250 ppm to 5000 ppm) the purifying agent (nanofibers) demonstrate moderate conformity to the Langmuir isotherm as indicated by the $R^2$ value of 0.8829 (FIG. 44; FIG. 46). The LSRL coefficient of $7.426 \times 10^{-5}$, yielding an adsorption capacity of $1.3 \times 10^4$ mg/g.

At higher concentrations ($3.6 \times 10^3$ 43 ppm to $7.2 \times 10^4$ ppm), the metallic removal capacity of the newly developed purifying agent/coagulant/flocculant/adsorbent reached an unprecedented level of up to several hundred thousand milligrams of cadmium per gram. Thus, it could be reasonably concluded that mechanisms, such as nucleation and precipitation, were present at high cadmium concentrations (FIG. 43, which relates to *spinifex* nanofibers). Surface level adsorption would not be capable of such high remediation capacities even during low concentrations because of the limited number of functionalized carboxyl groups. Most probably, the predominant non-crystalline region of purifying agent provided easy accessibility to metal ions into fibers, and hence, the sites where these metal ions entered became the sites of nucleation as a result after certain concentration of metal ions was precipitated out, thereby covering the entire surface area.

Figure 45:
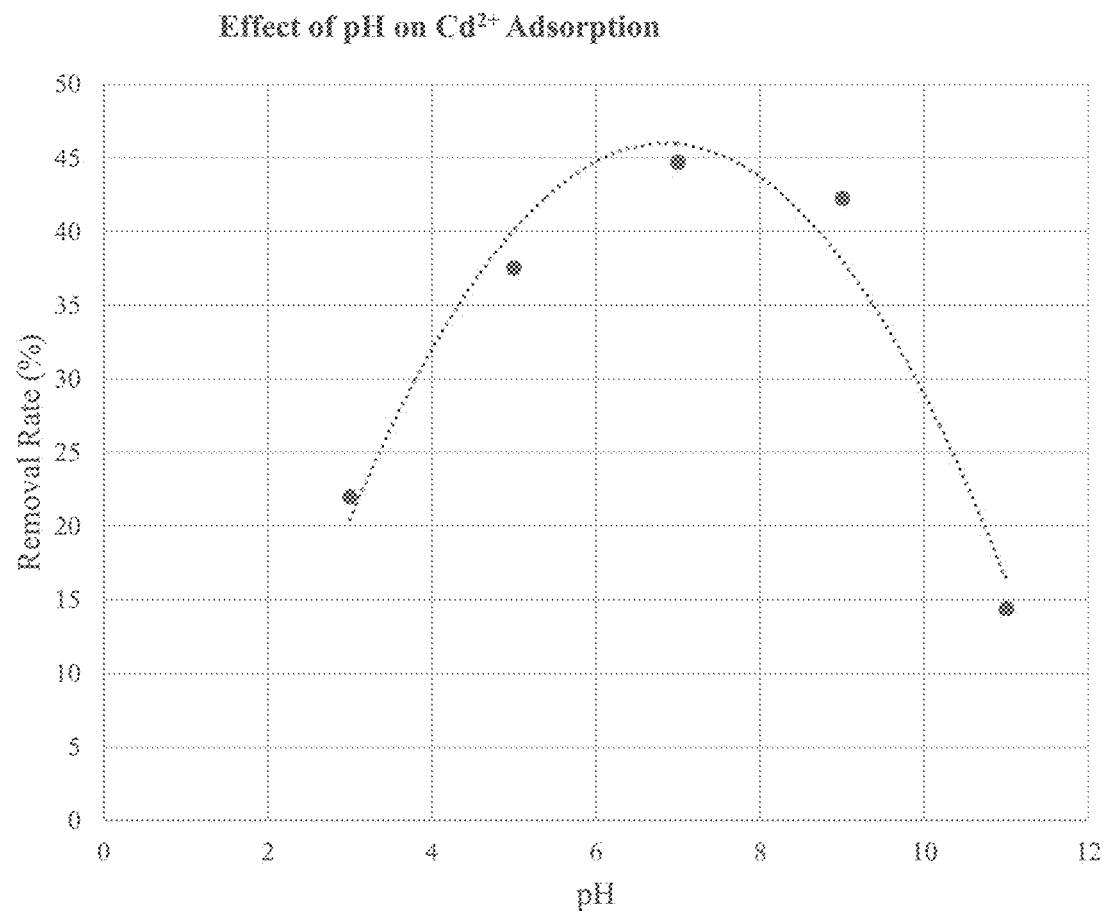
FIG. 45 illustrates a calculation of cadmium removal (2 ml of 2500 ppm) by *spinifex* derived purifying agent (2 ml of 0.02 wt %) at different pH values, based on ICPMS data.

The pH studies indicated highest efficiency at neutral pH which would enable realistic applications (FIG. 45). The inability of *spinifex* nanofibers to remove heavy metals at very high and very low pH values could probably be attributed to pH value based denaturing of the carboxyl cellulose in the two extreme pH regions. This study was done using extremely high concentrations of cadmium to purposefully differentiate the response of nanofibers to changes in pH values. However, the low removal rates should not be of major concern because the efficiency corresponding to extremely high removal capacities over a pH range near the neutral pH values.

TABLE 5

Comparative Adsorption Capacity for lead removal based on literature.

| Adsorbent | Adsorption Capacity at pH = 7 (mg/g) | Reference |
|---|---|---|
| Soft spinifex derived purifying agent | 13,465 | This Disclosure |

TABLE 5-continued

Comparative Adsorption Capacity for lead removal based on literature.

| Adsorbent | Adsorption Capacity at pH = 7 (mg/g) | Reference |
|---|---|---|
| Flower - like Magnesium Oxide | 1,500 | (1) |
| Epichlorohydrin cross-linked carboxymethyl cellulose | 103 | (16) |
| Meranti Wood | 150-175 | (17) |
| Untreated Coffee Grounds | 15-17 | (18) |
| Corn Stalk Cellulose | 21.37 | (19) |

(Reference numbers are to articles cited at the end of the specification, prior to the claims)

In terms of efficiency, the developed purifying agent/coagulant/flocculant/adsorbent are 9 times more effective than the most effective adsorbent[1]. Compared to cellulose based strategies[16-17] the nanofibers are nearly 100 times more effective, making them superbly efficient. Indeed, using raw wood, coffee grounds, and corn stalk[17-19] directly may be less expensive per gram of adsorbent, but in order to remediate by quantity of cadmium in water the developed purifying agent/coagulant/flocculant/adsorbent would be less expensive because of its substantially higher removal capacity. Furthermore, one step modification can be used on biomass sources cheaper than coffee grounds or/and wood, and the fertilizer byproduct from one step modification can make the process equitable. The coagulant synthesized has combined efficiency, sustainability, and cost effectiveness to address cadmium (and other toxic metal) pollution better than all of its current counterparts.

The foregoing Examples confirmed that the method of the present disclosure was effective in both the defibrillation process of 'reducing' cellulose fibers to nanoscale dimensions, and in oxidizing, or carboxylating, the resultant nanofibers. The Examples demonstrate that this dual mechanism may be utilized to prepare carboxycellulose nanofibers for not only cellulose that has already been extracted (bamboo cellulose), but also for raw forms of plant biomass that had not undergone any pretreatments (jute fibers and *spinifex* fibers), thereby drastically decreasing the amount of mechanical energy and harsh chemicals required.

The results of the morphological studies, as evidenced by the TEM images, showed the shapes of the nanofibers and their degree of dispersal. In addition, the average diameters of the bamboo nanofibers and jute nanofibers (about 5 nm to about 10 nm) and the average lengths, 97±33 nm and 214±19 nm, respectively, were estimated. The presence of carboxyl functional groups as a result of oxidation was also confirmed qualitatively through an examination of the peak wavenumbers and their corresponding bonds in the FTIR spectra, but also quantitatively, through the calcium acetate titration method.

The results demonstrate that the proposed acid/oxidizing agent process was effective to produce carboxylated nanocelluloses in a substantially green and environmentally sustainable manner, and this method is feasible for commercialization by using simple tools, available even in developing countries.

The use of raw biomass rather than extracted cellulose (which generally involves extensive pretreatment procedures) will greatly reduce energy consumption, making the process feasible for cost-effective large-scale productions. Unlike prior art methods, the methods of the present disclosure are not limited to the use of native cellulose, i.e., the methods of the present disclosure may be used to produce carboxycellulose nanofibers from any type of plant biomass. Moreover, the method of the present disclosure may reduce consumption of toxic chemicals by 50-60% and may also reduce electrical consumption by 30-40% compared to conventional processes.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

REFERENCES

1. Cao, C.; Qu, J.; Wei, F.; Liu, H.; Song, W. (2012). Superb adsorption capacity and mechanism of flowerlike magnesium oxide nanostructures for lead and cadmium ions. ACS Applied Material. Interfaces, 4, 4283-4287.
2. Liu, Y.; Wang, W.; Wang, A. (2010). Adsorption of lead ions from aqueous solution by using carboxymethyl cellulose-g-poly (acrylic acid)/attapulgite hydrogel composites. Desalination, 259, 258-264.
3. Su, Q.; Pan, B.; Pan, B.; Zhang, Q.; Zhang, W.; Lu, L.; Wang, X.; Wu, X.; Zhang, Q. (2009). Fabrication of polymer-supported nanosized hydrous manganese dioxide (HMO) for enhanced lead removal from waters. Science of the Total Environment, 407, 5471-5477.
4. Cao, C. Y.; Wei, F.; Qu, J.; Song, W. G. (2013). Programmed Synthesis of Magnetic Magnesium Silicates Nanotubes with High Adsorption Capacities for Lead and Cadmium Ions. Chemistry A European Journal, 19, 1558-1562.
5. Yang, R.; Aubrecht, K. B.; Ma, H.; Wang, R.; Grubbs, R. B.; Hsiao, B. S.; Chu, B. (2014). Thiol-modified cellulose nanofibrous composite membranes for chromium(VI) and lead(II) adsorption. Polymer, 55, 1167-1176.
6. Musyoka, S. M.; Ngila, J. C.; Moodley, B.; Petrik, L.; Kindness, L. (2011). Synthesis, characterization, and adsorption kinetic studies of ethylenediamine modified cellulose for removal of Cd and Pb. Analytical Letters, 44 (11), 1925-1936.
7. Shen, W.; Chen, S. Y.; Shi, S. K.; Li, X.; Zhang, X.; Hu, W. L. (2009). Adsorption of Cu(II) and Pb(II) onto diethylenetriamine-bacterial cellulose Carbohydrate Polymers, 75 (1), 110-114.
8. Gergel, O.; Gergel, H. F. (2007). Adsorption of lead(II) ions from aqueous solutions by activated carbon prepared from biomass plant material of *Euphorbia rigida*. Journal of Chemical Engineering, 132, 289-297.
9. Zhang, W. H.; Cheung, M.; Valix. (2005). Roles of physical and chemical properties of activated carbon in the adsorption of lead ions. Chemosphere, 60 (8), 1129-1140
10. Bansode, R. R.; Losso, J. N.; Marshall, W. E.; Rao, R. M.; Portier, R. J. (2003). Adsorption of metal ions by pecan shell-based granular activated carbons. Bioresources. Technology, 89 (2), 115-119.
11. Wilson, K., Yang, H.; Seo, C. W.; Marshall, W. E. (2006). Select metal adsorption by activated carbon made from peanut shells. Bioresources. Technology, 97 (18), 2266-2270.
12. Issabayeva, G.; Aroua, M. K.; Sulaiman, N. M. N. (2006). Removal of lead from aqueous solutions on palm shell activated carbon. Bioresources. Technology, 97 (18), 2350-2355.
13. Ahmedna, M.; Marshall, W. E.; Husseiny, A. A.; Rao, R. M.; Goktepe, I. (2004). The use of nutshell carbons in drinking water filters for removal of trace metals. Water Resources, 38 (4), 1062-1068.
14. Malik, D. J.; Strelko Jr. V.; Streat, M.; Puziy, A. M. (2002). Characterization of novel modified active carbons and marine algal biomass for the selective adsorption of lead. Water Resources, 36 (6, 1527-1538.
15. Ferro-Garcia, M. A.; Rivera-Utrilla, J.; Bautista-Toledo, I.; Mingorance, M. D. (1990). Removal of lead from water by activated carbons. Carbon, 28 (4), 545-552.
16. Bediako, J. K.; Wei, W.; Yun, Y. S. (2015). Sorptive Removal of Cadmium Ions from Solution Phases Using Textile Fiber Waste Coated with Carboxymethyl Cellulose. Advanced Material Research, 1130, 631-634.
17. Rafatullah, M.; Sulaiman, O.; Hashim, R.; Ahmad, A. (2012). Removal of cadmium (II) from aqueous solutions by adsorption using meranti wood. Wood Science and Technology, 46, 221-241.
18. Azouaou, N.; Sadaoui, Z.; Diaafri, A.; Mokaddem, H. (2010). Adsorption of cadmium from aqueous solution onto untreated coffee grounds: Equilibrium, kinetics and thermodynamics. Journal of Hazardous Materials, 184 (1-3), 126-134.
19. Zheng, L.; Zhu, C.; Dang, Z.; Zhang, H., Yi, X.; Liu, C. (2012). Preparation of cellulose derived from corn stalk and its application for cadmium ion adsorption from aqueous solution. Carbohydrate Polymers, 90 (1,2), 1008-1015.

What is claimed is:

1. A method comprising:
    contacting plant biomass with an acid component comprising nitric acid to form a first mixture;
    contacting the first mixture with an oxidizing agent including a nitrate salt selected from potassium nitrate, calcium nitrate, magnesium nitrate, lithium nitrate, ammonium nitrate, nitrate esters, or combinations thereof to form a second mixture;
    holding the second mixture at a temperature from about 40° C. to about 100° C., for a period of time from about 30 minutes to about 72 hours; and
    recovering carboxycellulose nanofibers from the second mixture.

2. The method of claim 1, wherein the plant biomass includes lignocellulose wood, non-lignocellulose wood, lignocellulose, pure cellulose, grasses, phytoplanktons, algal celluloses, tunicate celluloses, and combinations thereof.

3. The method of claim 1, wherein the plant biomass is obtained from non-wood sources selected from the group consisting of jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, eucalyptus, valonia, bacterial celluloses, spinifex, and combinations thereof.

4. The method of claim 1, wherein the acid component further comprises an additional acid selected from the group consisting of hydrochloric acid, sulfuric acid, acetic acid, hydrobromic acid, hydrofluoric acid, and combinations thereof.

5. The method of claim 1, wherein the amount of the acid component is from about 10 mmol to about 300 mmol.

6. The method of claim 1, wherein the amount of the acid component is from about 20 to about 250 mmol.

7. The method of claim 1, wherein the amount of the oxidizing agent is from about 0.1 mmol to about 60 mmol.

8. The method of claim 1, wherein the amount of the oxidizing agent is from about 10 mmol to about 30 mmol.

9. The method of claim 1, wherein the second mixture is at a temperature from about 40° C. to about 100° C., for a period of time from about 3 hours to about 12 hours.

10. The method of claim 1, further comprising subjecting the second mixture to mechanical treatments selected from the group consisting of sonication, homogenization, cryocrushing, grinding, steam explosion, and combinations thereof, wherein the method occurs for a period of from about 1 minute to about 6 hours.

11. The method of claim 1, wherein the carboxycellulose nanofibers have a mean fiber length from about 50 nm to about 1000 nm.

12. The method of claim 1, wherein the carboxycellulose nanofibers have a mean nominal diameter from about 2 nm to about 20 nm.

13. The method of claim 1, wherein the carboxycellulose nanofibers have a lignin content from about 2% by weight to about 10% by weight.

14. A method comprising:
contacting plant biomass with an acid component comprising nitric acid, the acid component at a concentration from about 10 mmol to about 300 mmol, to form a first mixture;
contacting the first mixture with an oxidizing agent including a nitrate salt selected from potassium nitrate, calcium nitrate, magnesium nitrate, lithium nitrate, ammonium nitrate, nitrate esters, or combinations thereof, the oxidizing agent at a concentration from about 0.1 mmol to about 60 mmol, to form a second mixture;
holding the second mixture at a temperature from about 40° C. to about 100° C., for a period of time from about 30 minutes to about 72 hours; and
recovering carboxycellulose nanofibers from the second mixture.

15. The method of claim 14, wherein the plant biomass includes lignocellulose wood, non-lignocellulose wood, lignocellulose, pure cellulose, grasses, and combinations of thereof.

16. The method of claim 14, wherein the plant biomass is obtained from non-wood sources selected from the group consisting of jute, bamboo, cotton, banana rachis, wheat straw, barley, hemp, flax straw, coconut fiber, soy hull, pea hull fiber, rice husk, sugarcane bagasse, pineapple leaf rachis, sisal fiber, tunicates, black spruce, eucalyptus, valonia, bacterial celluloses, spinifex, and combinations thereof.

17. The method of claim 14, wherein the acid component further comprises an additional acid selected from the group consisting of hydrochloric acid, sulfuric acid, acetic acid, hydrobromic acid, hydrofluoric acid, and combinations thereof.

18. The method of claim 14, wherein the amount of the acid component is from about 20 to about 250 mmol.

19. The method of claim 14, wherein the amount of the oxidizing agent is from about 10 mmol to about 30 mmol.

20. The method of claim 14, wherein the second mixture at a temperature from about 40° C. to about 100° C., for a period of time from about 3 hours to about 12 hours.

21. The method of claim 14, further comprising subjecting the second mixture to mechanical treatments selected from the group consisting of sonication, homogenization, cryocrushing, grinding, steam explosion, ball-milling and combinations thereof, wherein the method occurs for a period of from about 1 minute to about 6 hours.

22. The method of claim 14, wherein the carboxycellulose nanofibers have a mean fiber length from about 50 nm to about 1000 nm.

23. The method of claim 14, wherein the carboxycellulose nanofibers have a mean nominal diameter from about 2 nm to about 20 nm.

24. The method of claim 14, wherein the carboxycellulose nanofibers have a lignin content from about 2% by weight to about 10% by weight.

25. A method comprising:
contacting plant biomass with an acid component including nitric acid, the acid component at a concentration from about 10 mmol to about 300 mmol, to form a first mixture;
contacting the first mixture with an oxidizing agent including a nitrate salt selected from potassium nitrate, calcium nitrate, magnesium nitrate, lithium nitrate, ammonium nitrate, nitrate esters, or combinations thereof, the oxidizing agent at a concentration from about 0.1 mmol to about 60 mmol, to form a second mixture;
holding the second mixture at a temperature from about 40° C. to about 70° C., for a period of time from about 30 minutes to about 72 hours; and
recovering carboxycellulose nanofibers from the second mixture.

* * * * *